US008316154B2

United States Patent
Yoneda

(10) Patent No.: US 8,316,154 B2
(45) Date of Patent: Nov. 20, 2012

(54) CONTENT PLAYBACK SYSTEM, PLAYBACK DEVICE, PLAYBACK CONTROL METHOD AND PROGRAM

(75) Inventor: Michiaki Yoneda, Kanagawa (JP)

(73) Assignee: Sony Corporation, Tokyo (JP)

( * ) Notice: Subject to any disclaimer, the term of this patent is extended or adjusted under 35 U.S.C. 154(b) by 104 days.

(21) Appl. No.: 12/002,573

(22) Filed: Dec. 18, 2007

(65) Prior Publication Data

US 2008/0177822 A1    Jul. 24, 2008

(30) Foreign Application Priority Data

Dec. 25, 2006  (JP) ................. 2006-348322

(51) Int. Cl.
*G06F 15/16* (2006.01)
(52) U.S. Cl. ........ 709/248; 709/203; 709/217; 709/218; 709/219
(58) Field of Classification Search .............. 709/203, 709/217–219, 248
See application file for complete search history.

(56) References Cited

U.S. PATENT DOCUMENTS

| 5,808,662 | A  | * | 9/1998 | Kinney et al. ............. 348/14.1 |
|---|---|---|---|---|
| 6,173,329 | B1 | * | 1/2001 | Sasaki et al. ............. 709/231 |
| 6,598,172 | B1 | * | 7/2003 | VanDeusen et al. ......... 713/503 |
| 7,590,997 | B2 | * | 9/2009 | Diaz Perez ............... 725/109 |
| 2002/0118199 | A1 | * | 8/2002 | Mukherjee et al. ........ 345/504 |
| 2003/0091322 | A1 | * | 5/2003 | Van Der Schaar ......... 386/46 |
| 2003/0126211 | A1 |   | 7/2003 | Anttila et al. |
| 2004/0088728 | A1 | * | 5/2004 | Shimizu ................. 725/89 |
| 2005/0097623 | A1 | * | 5/2005 | Tecot et al. .............. 725/136 |
| 2006/0002681 | A1 | * | 1/2006 | Spilo et al. .............. 386/46 |
| 2006/0007479 | A1 |   | 1/2006 | Henry et al. |
| 2006/0112343 | A1 | * | 5/2006 | Ducheneaut et al. ........ 715/758 |
| 2006/0149850 | A1 | * | 7/2006 | Bowman ................. 709/231 |
| 2007/0057808 | A1 |   | 3/2007 | Knespel |
| 2007/0300310 | A1 |   | 12/2007 | Molaro |
| 2008/0133715 | A1 |   | 6/2008 | Yoneda et al. |

FOREIGN PATENT DOCUMENTS

| JP | 2002-218277 | A | 8/2002 |
|---|---|---|---|
| JP | 2004-102415 | A | 4/2004 |
| JP | 2004-104796 |   | 4/2004 |
| JP | 2004-533795 | T | 4/2004 |
| JP | 2005-0242667 |   | 9/2005 |
| JP | 2005-250867 |   | 9/2005 |
| JP | 2005-294941 | A | 10/2005 |

(Continued)

*Primary Examiner* — David Lazaro
*Assistant Examiner* — Farzana Huq
(74) *Attorney, Agent, or Firm* — Wolf, Greenfield & Sacks, P.C.

(57) ABSTRACT

A first playback device, upon receiving a synchronized playback command while content playback is in progress, transmits, to a second playback device, information that pertains to the playback content and a synchronized playback start time obtained by adding a predetermined additional time to an elapsed playback time for the content. The second playback device starts receiving content data that begins from the synchronized playback start time from a server. After the data that is memorized in a memory reaches a specified volume, the second playback device transmits a playback preparation completion notification to the first playback device. Once the elapsed playback time for the content reaches the synchronized playback start time, the first playback device transmits a playback start command to the second playback device. Upon receiving this command, the second playback device starts playing back content data that begins from the synchronized playback start time.

25 Claims, 28 Drawing Sheets

FOREIGN PATENT DOCUMENTS

| | | |
|---|---|---|
| JP | 2005-323268 A | 11/2005 |
| JP | 2006-237918 | 9/2006 |
| JP | 2006-244060 A | 9/2006 |
| JP | 2006-287642 A | 10/2006 |
| JP | 2006-301777 A | 11/2006 |
| WO | WO 03/003732 A1 | 1/2003 |
| WO | WO 2006-090340 A1 | 8/2006 |
| WO | WO 2006/113626 A2 | 10/2006 |

* cited by examiner

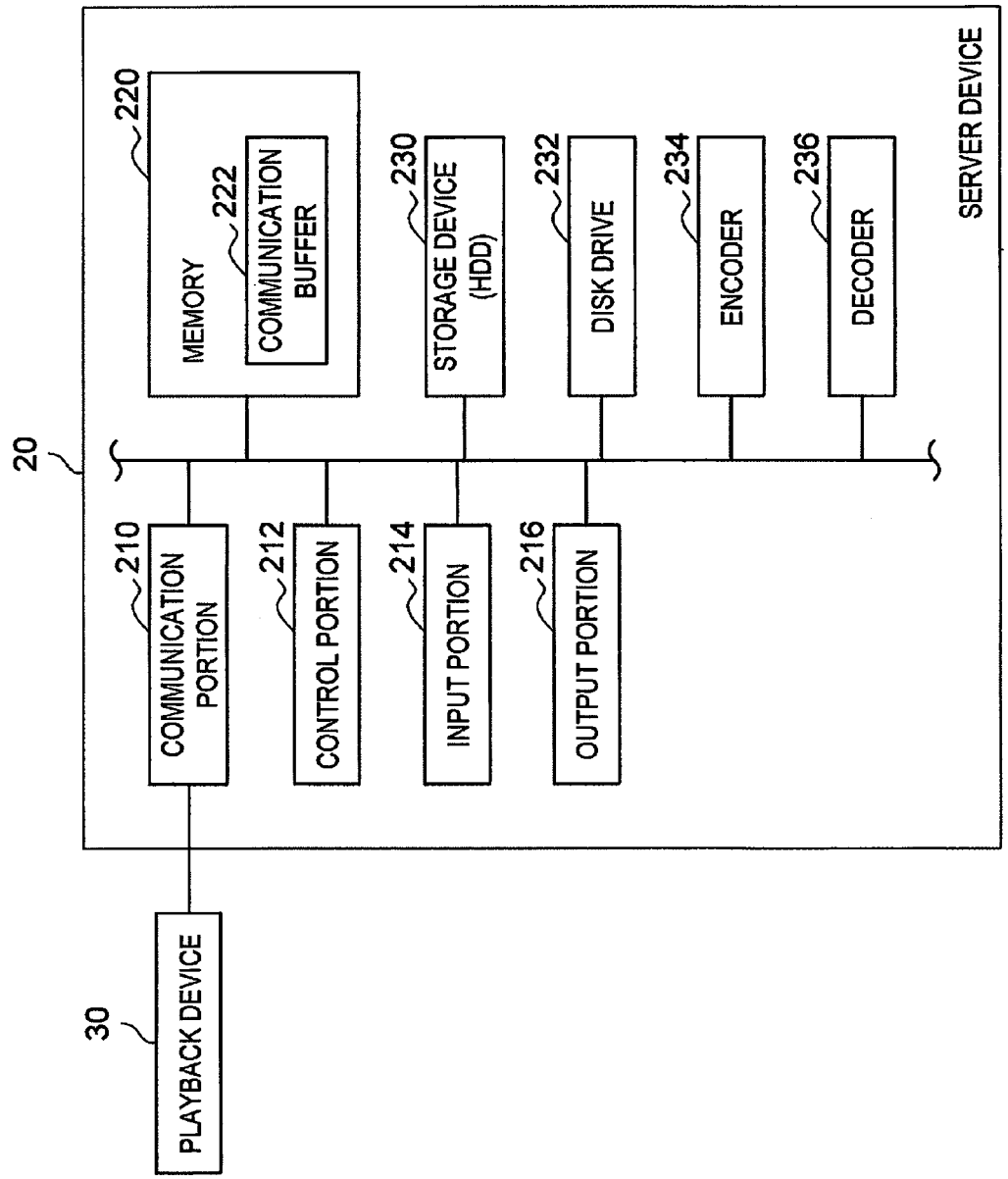

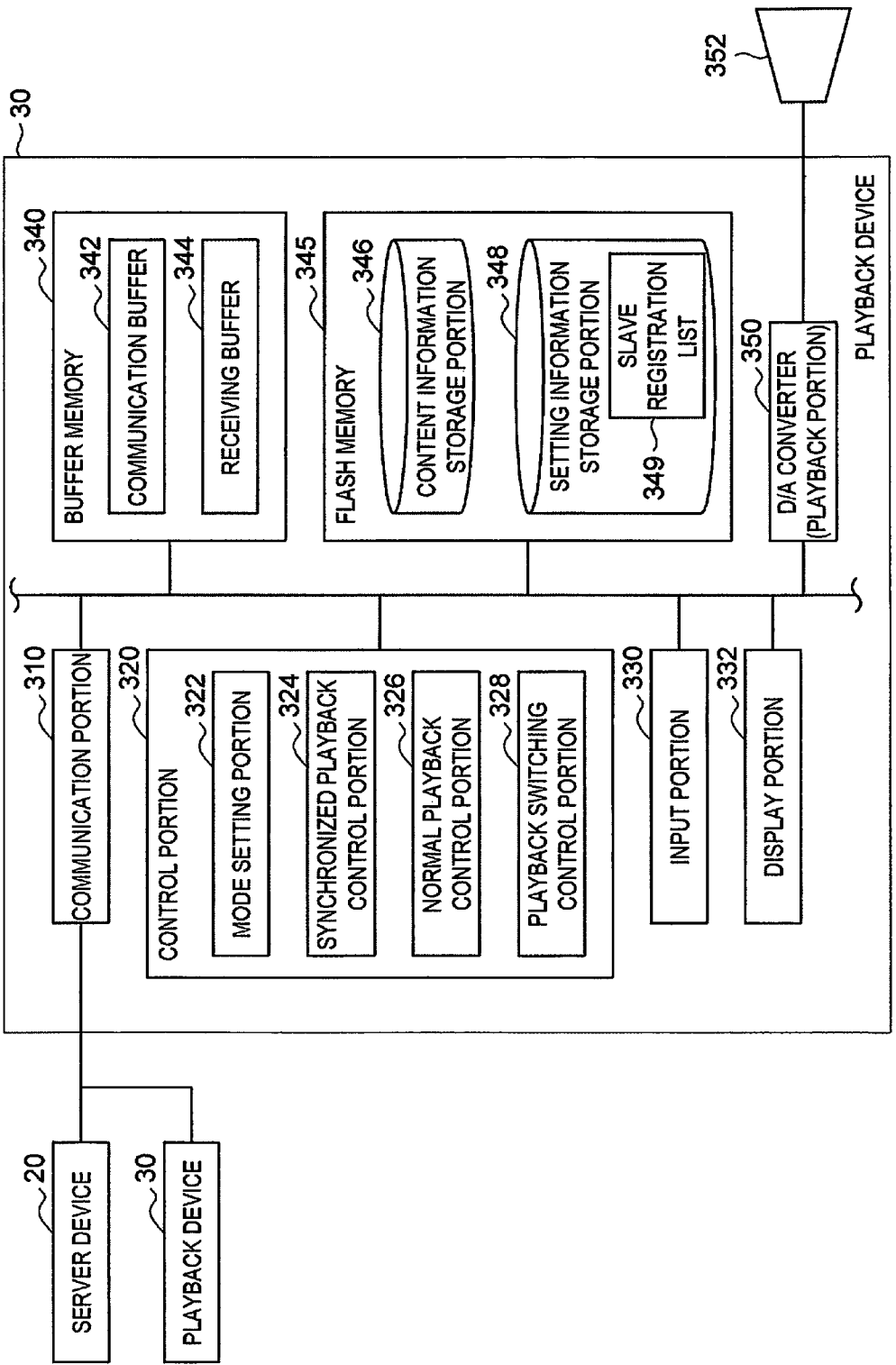

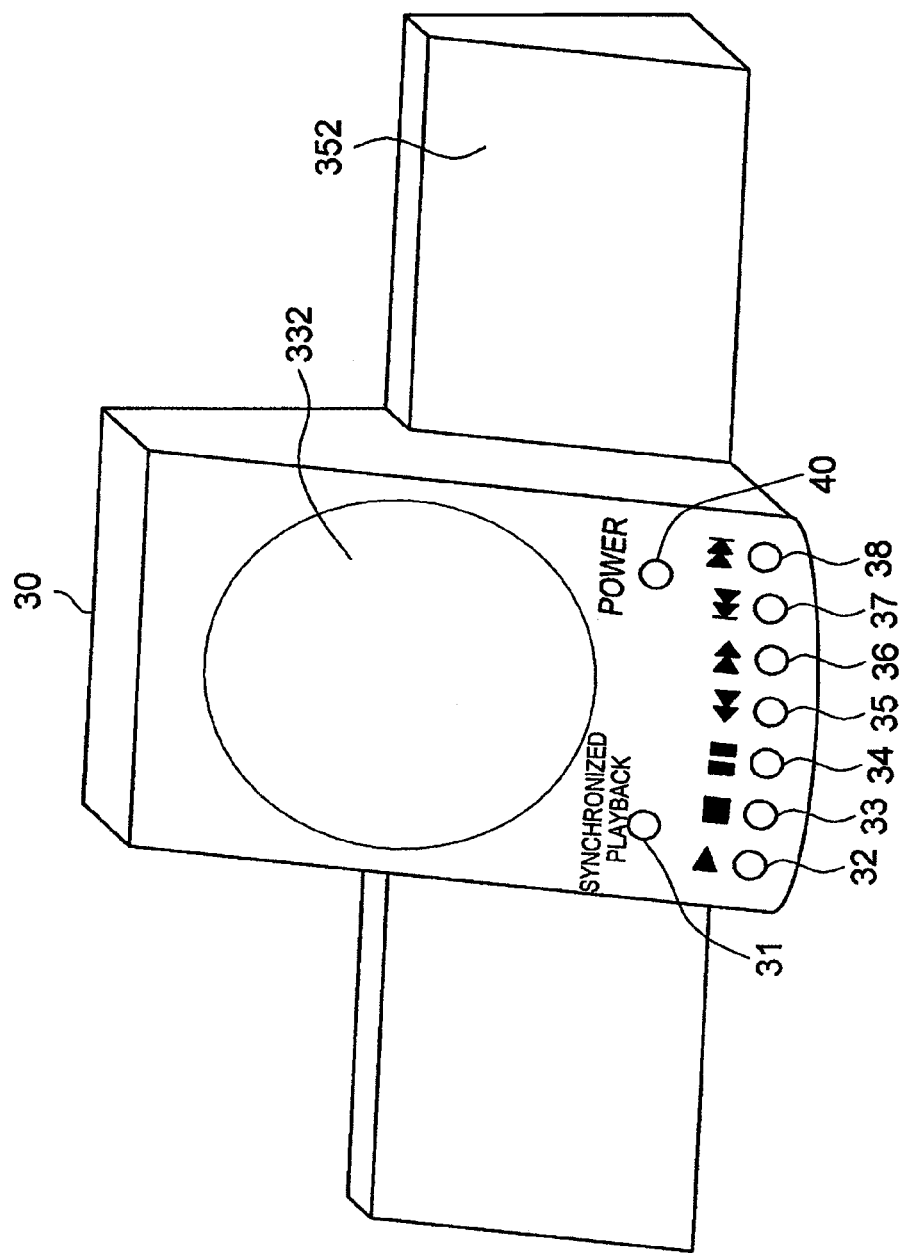

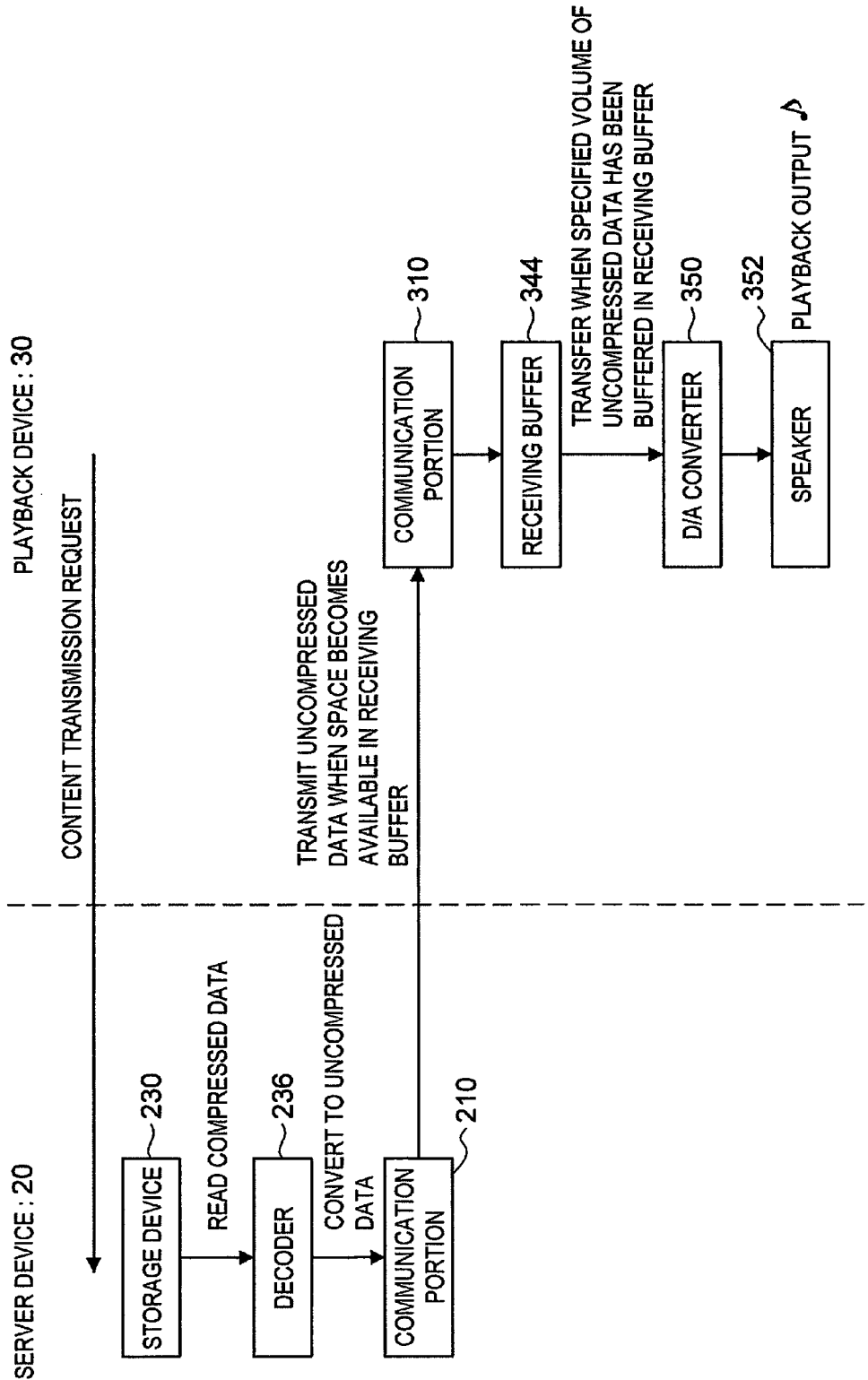

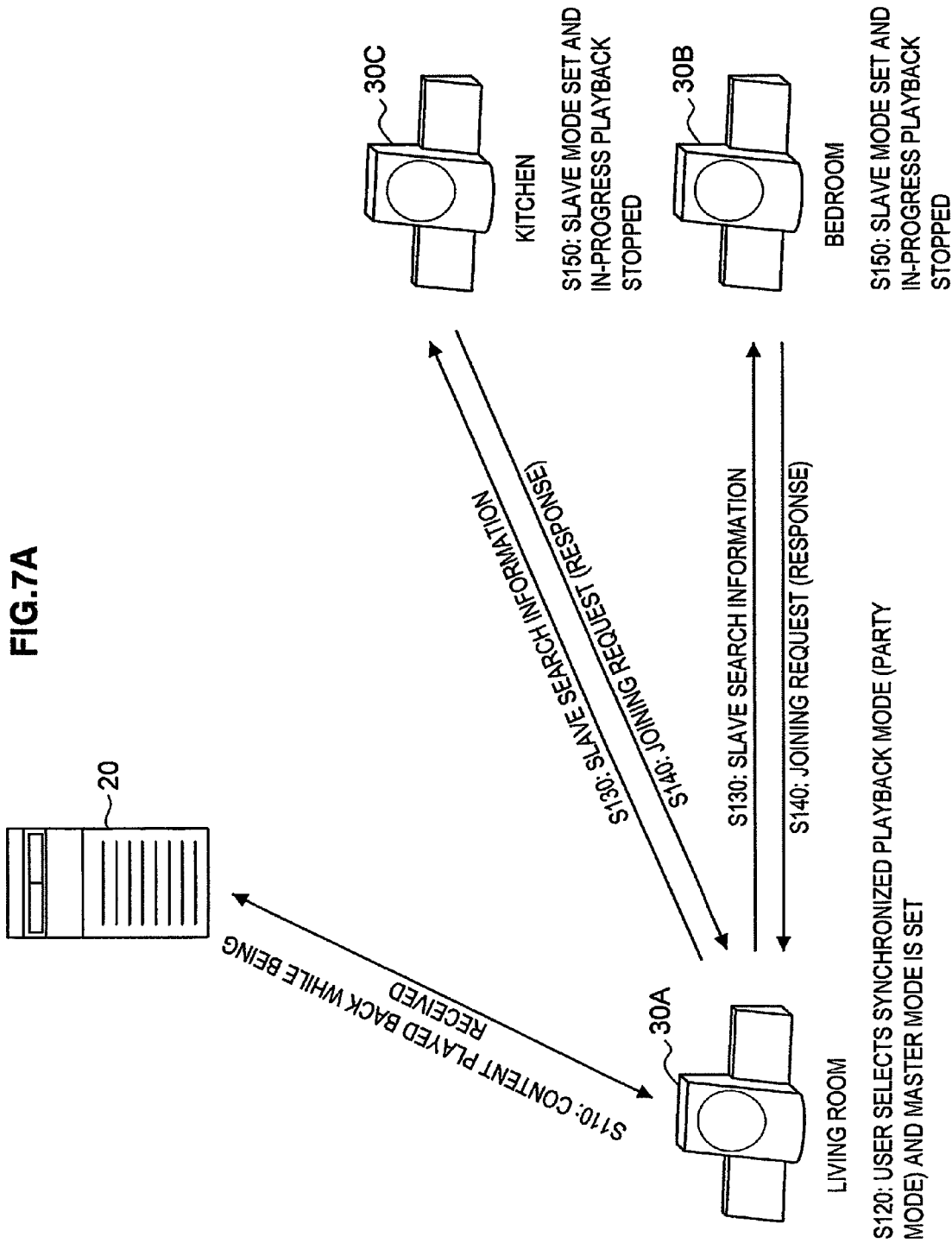

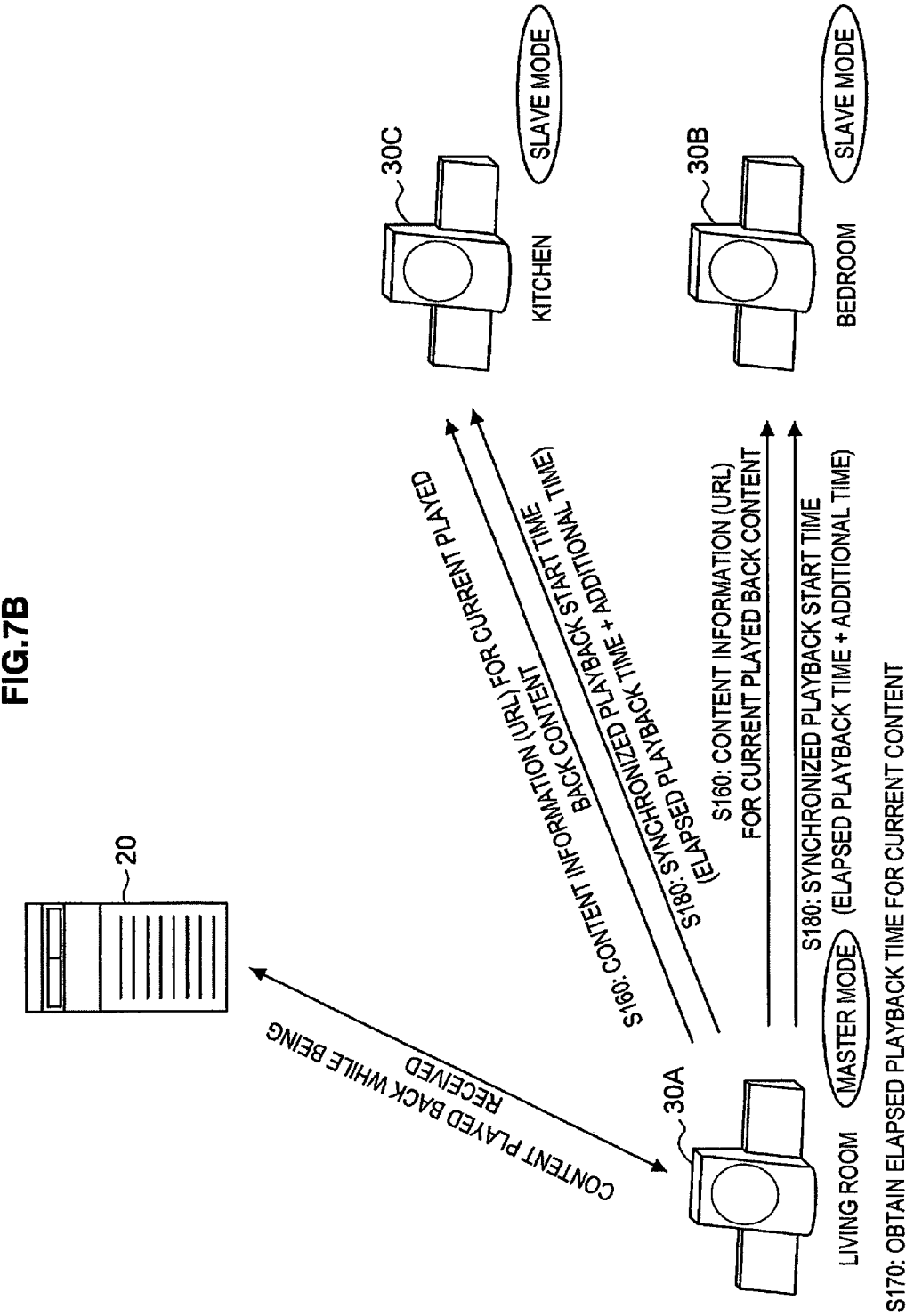

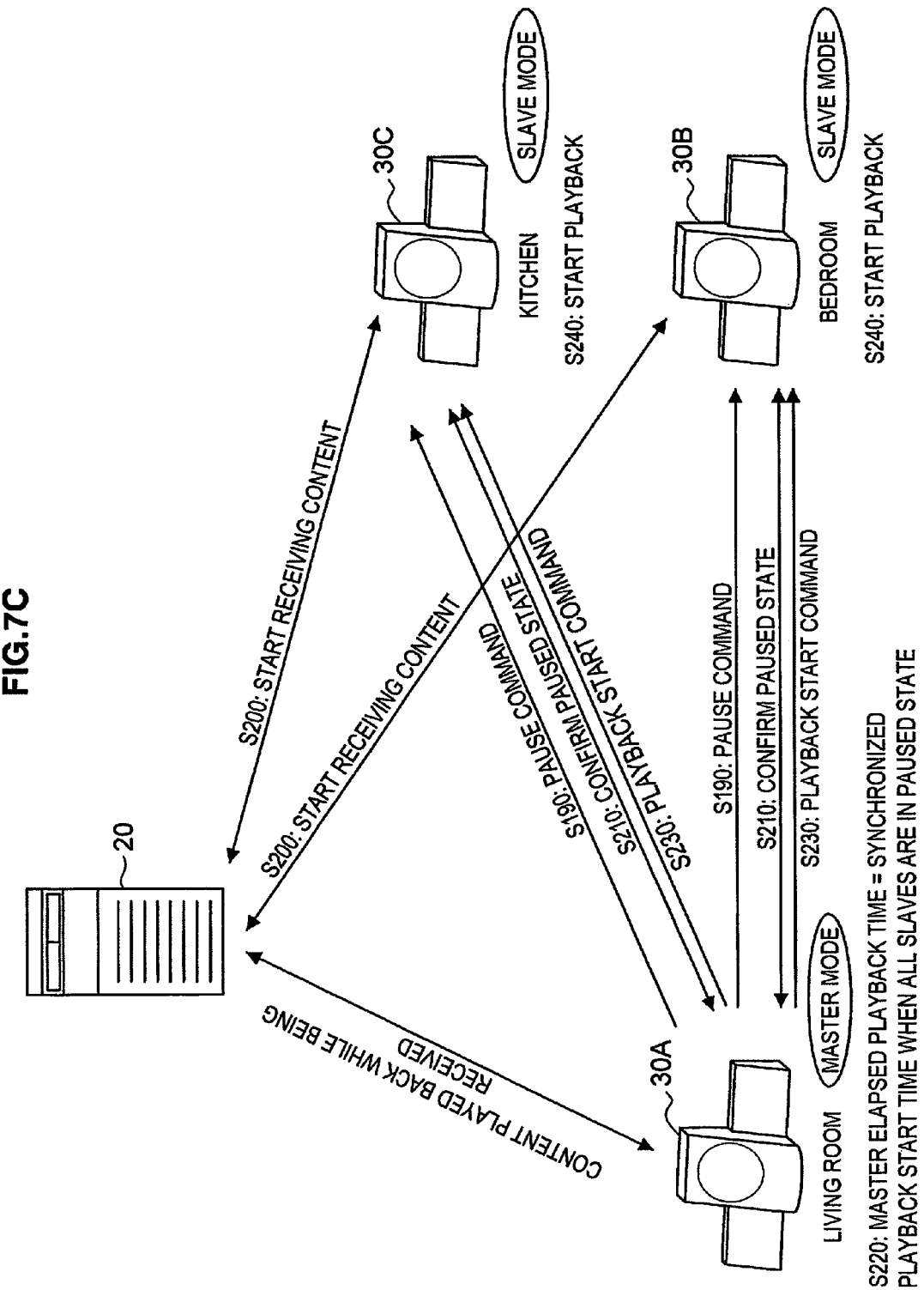

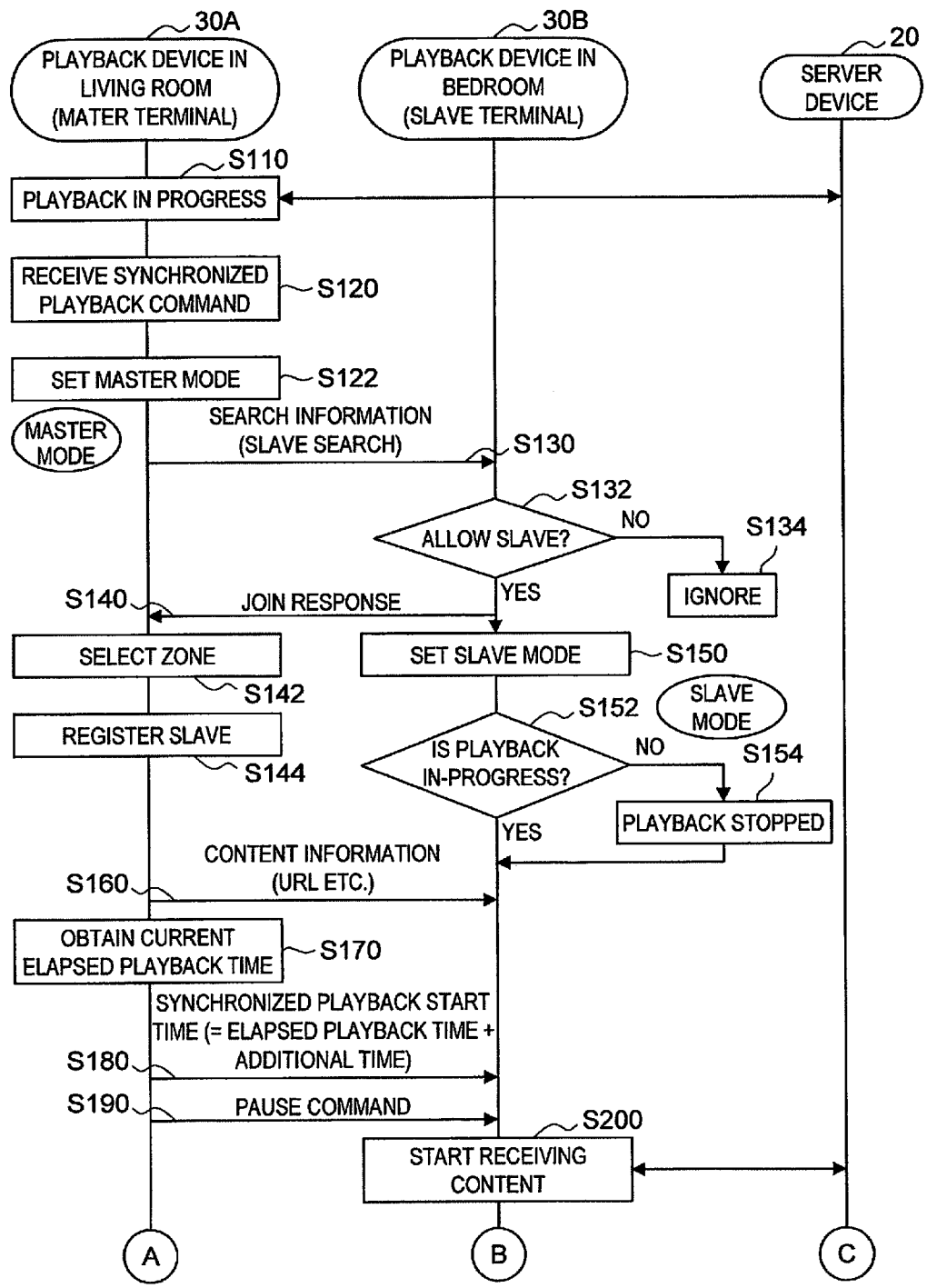

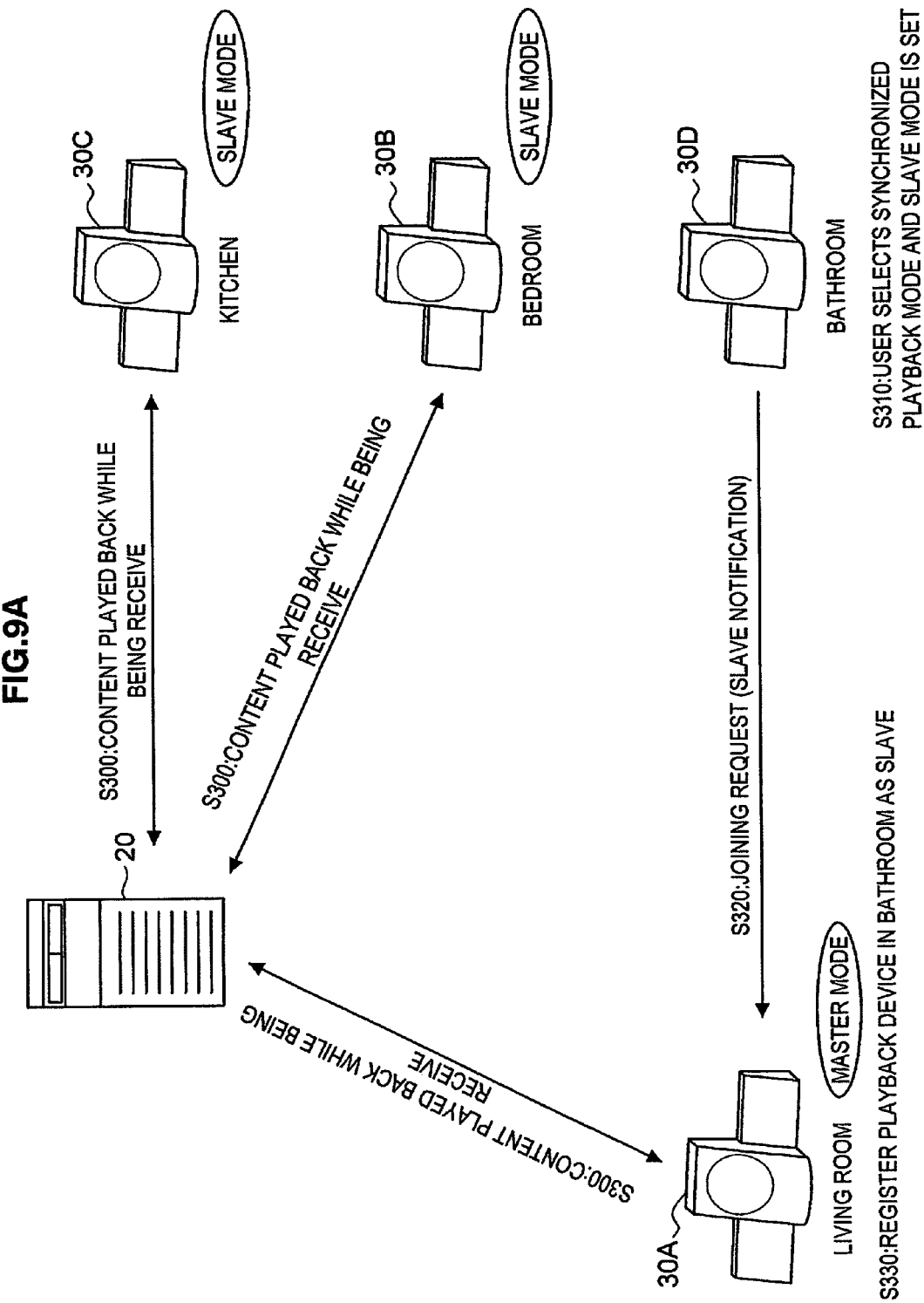

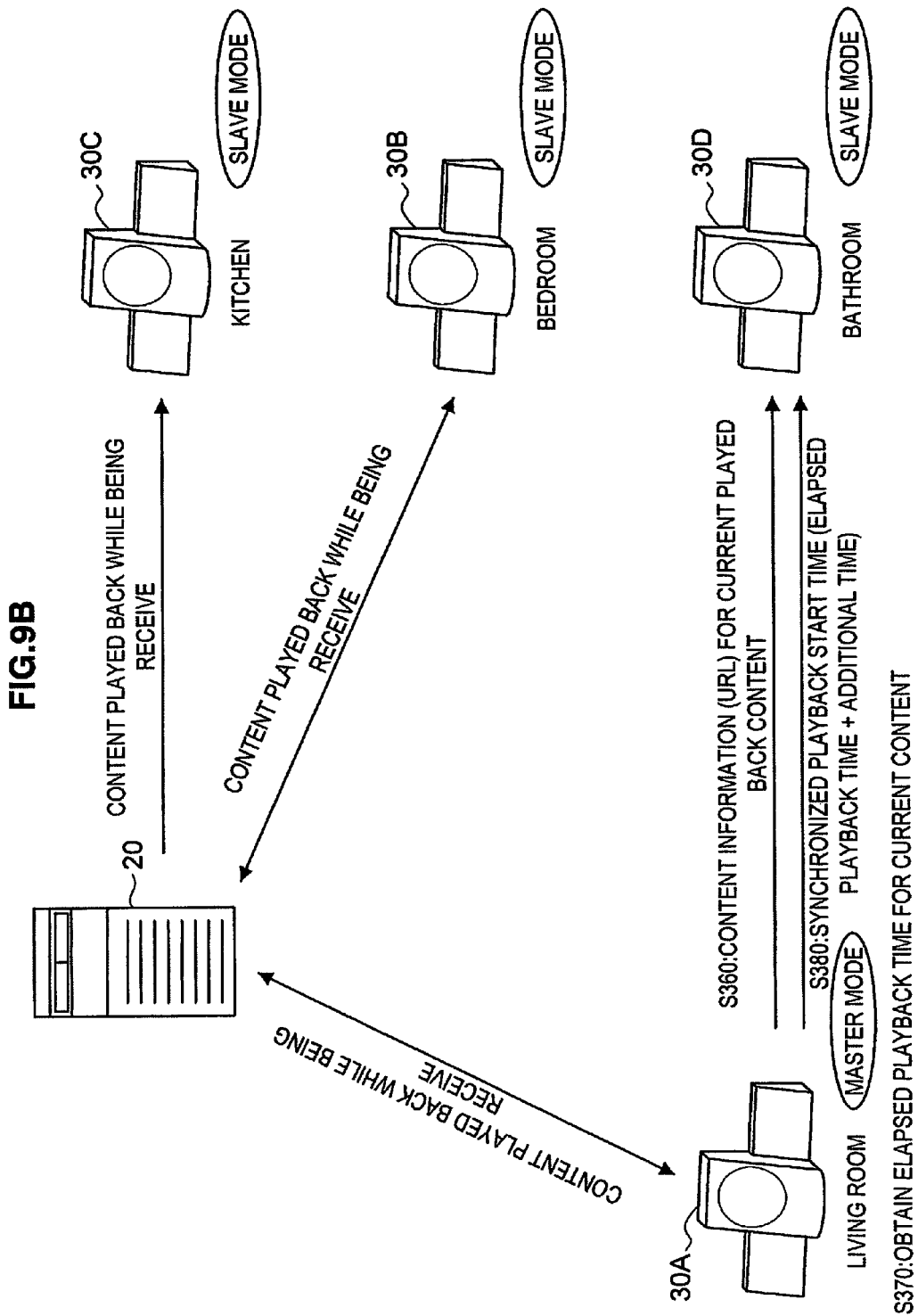

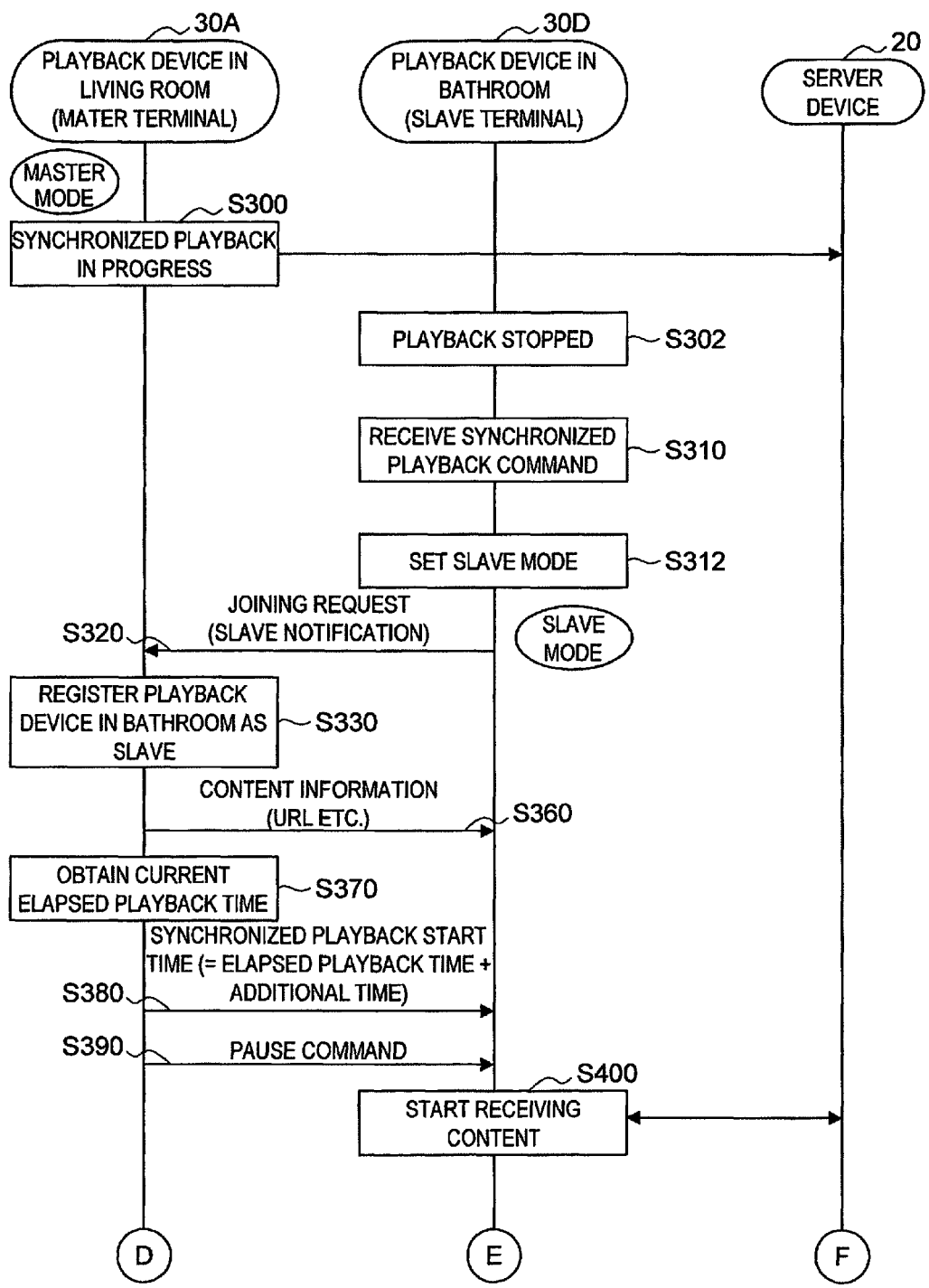

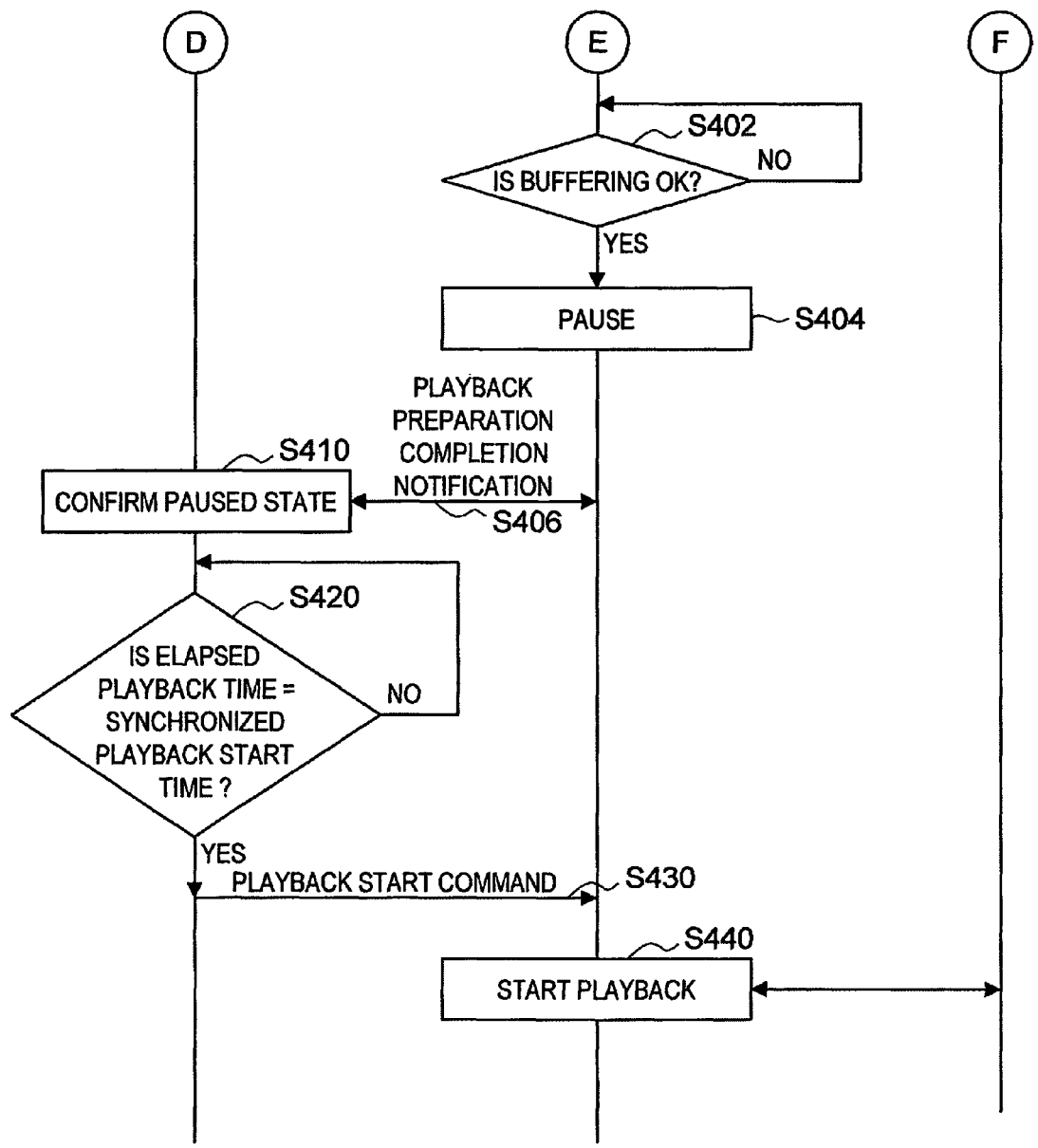

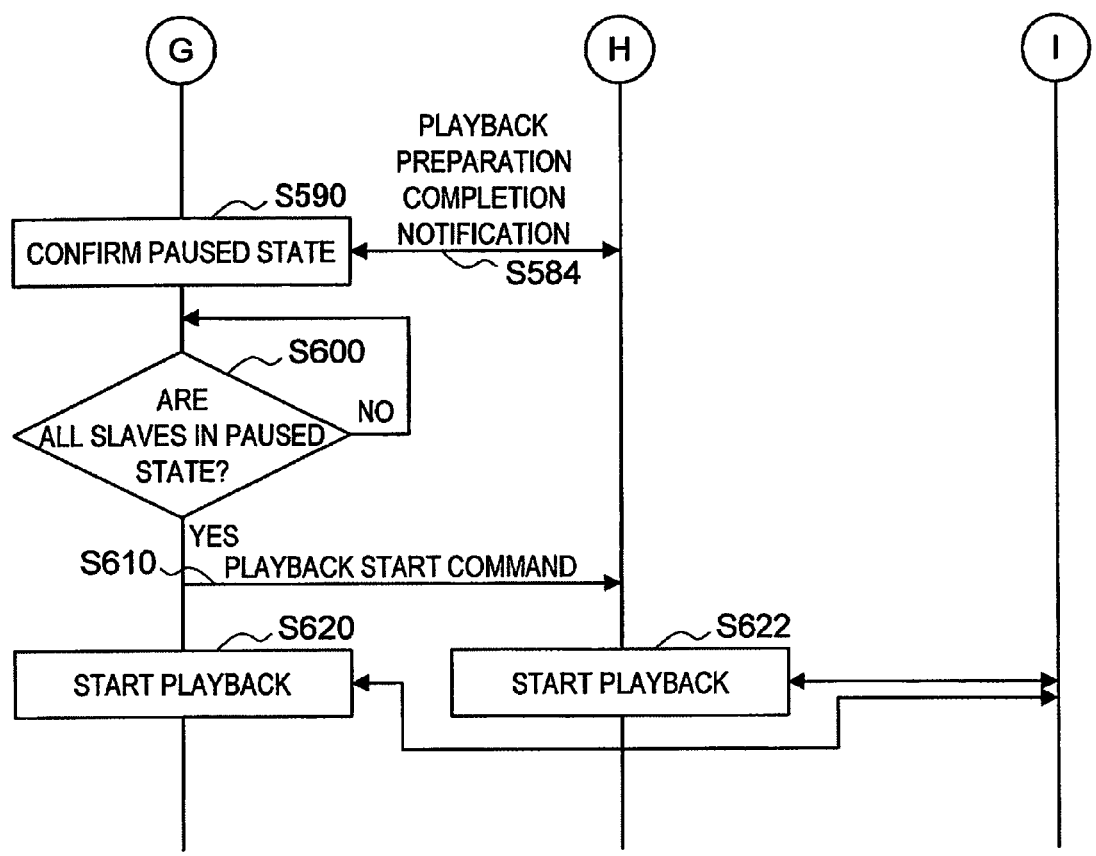

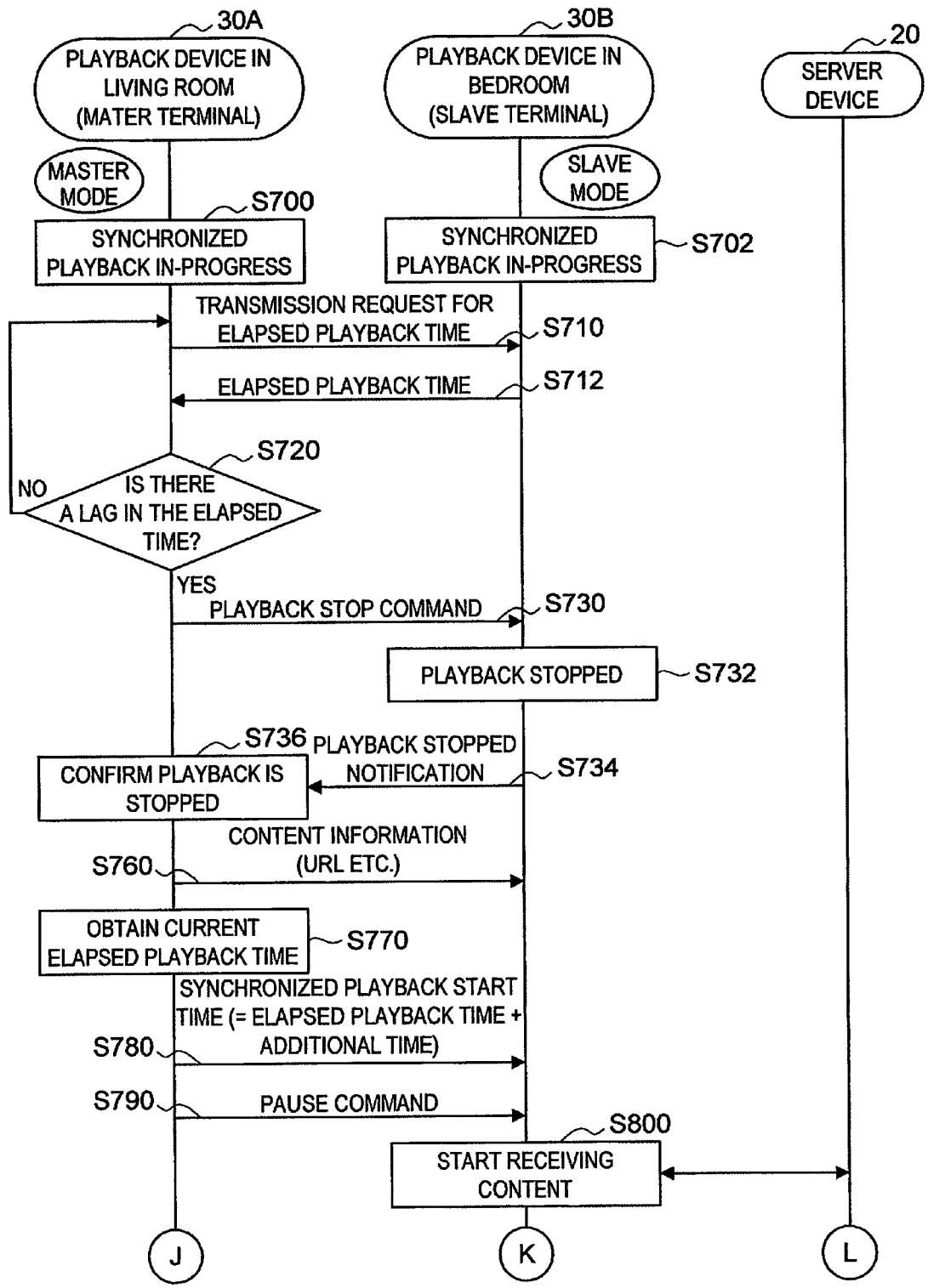

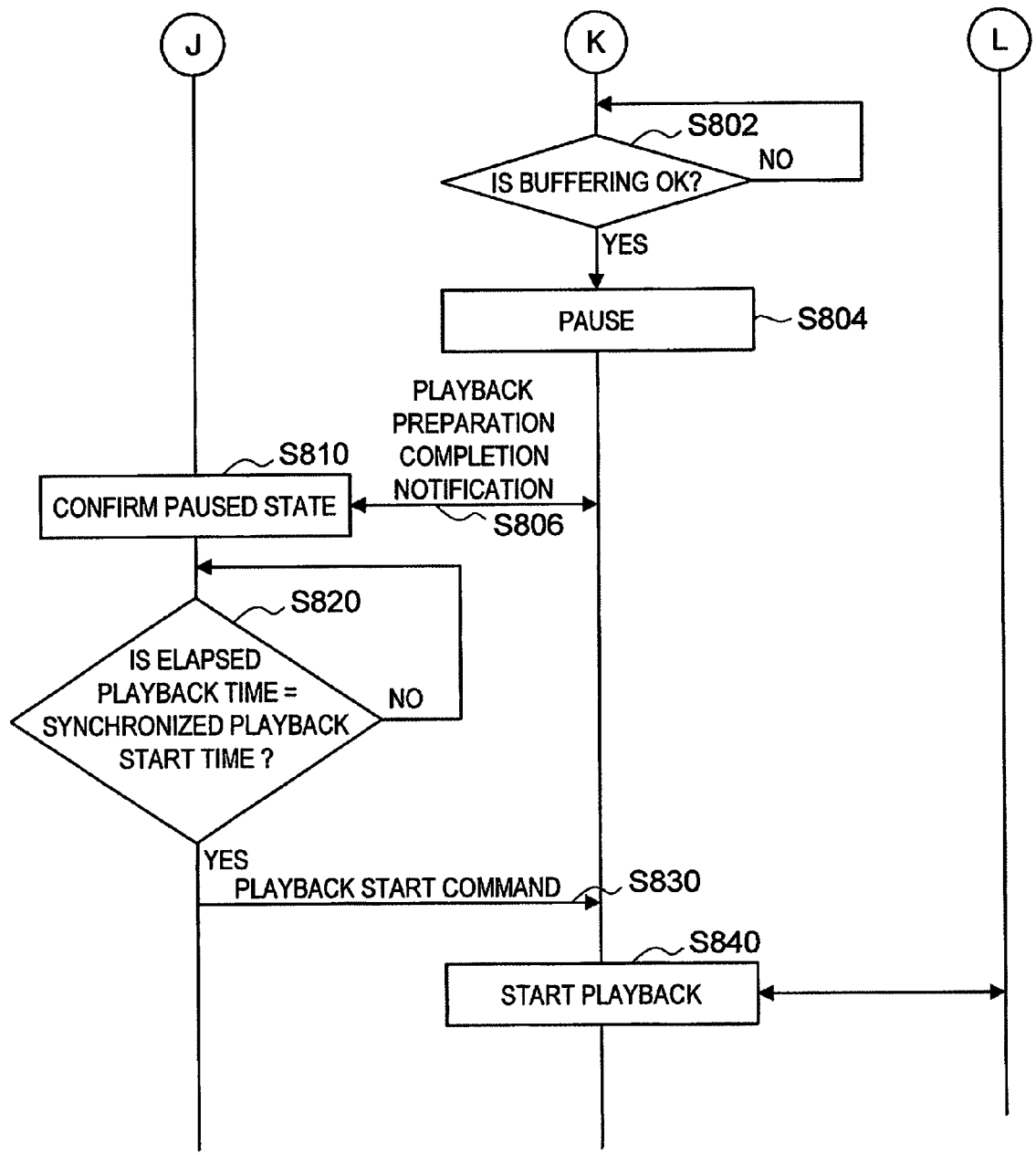

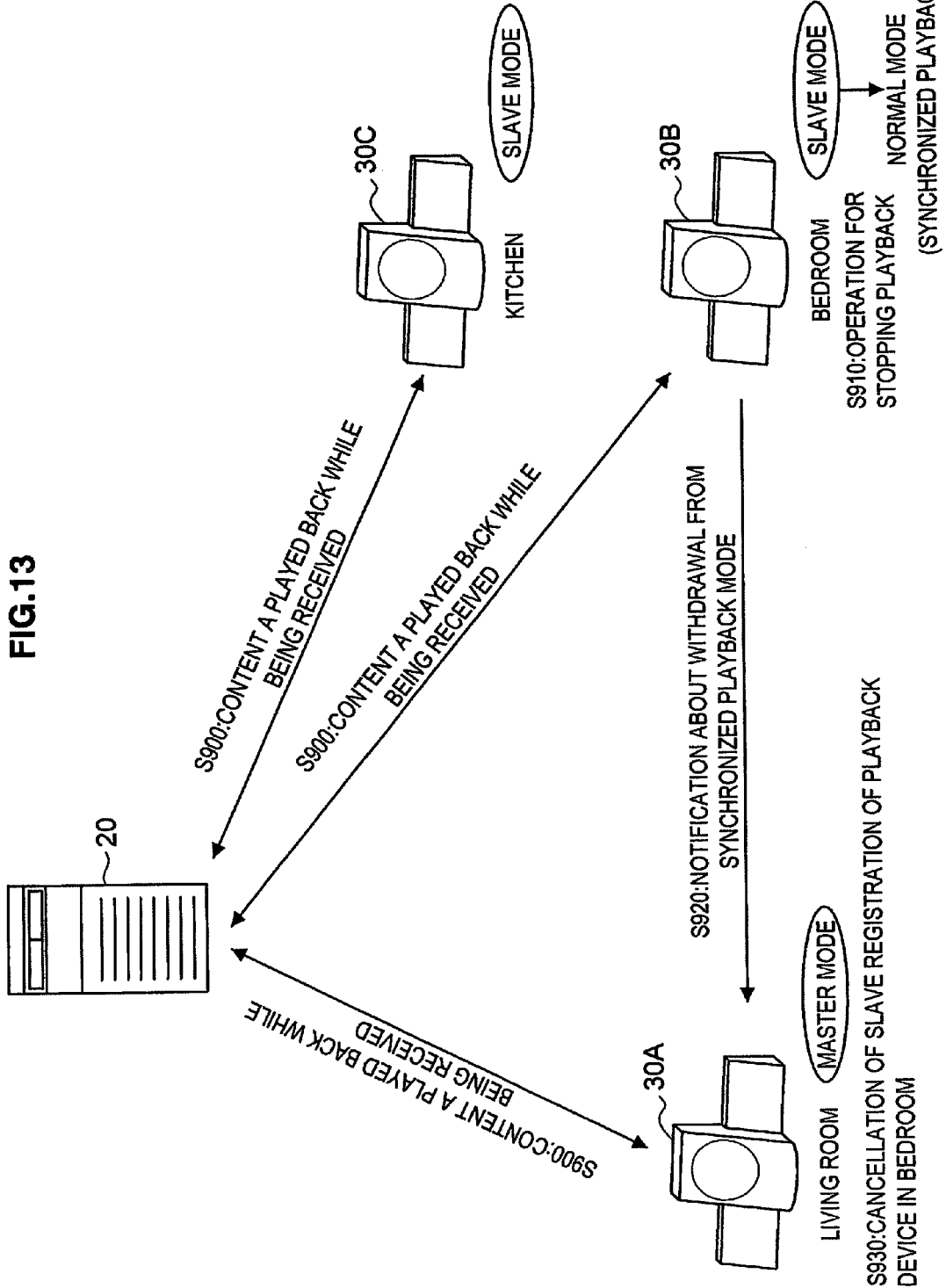

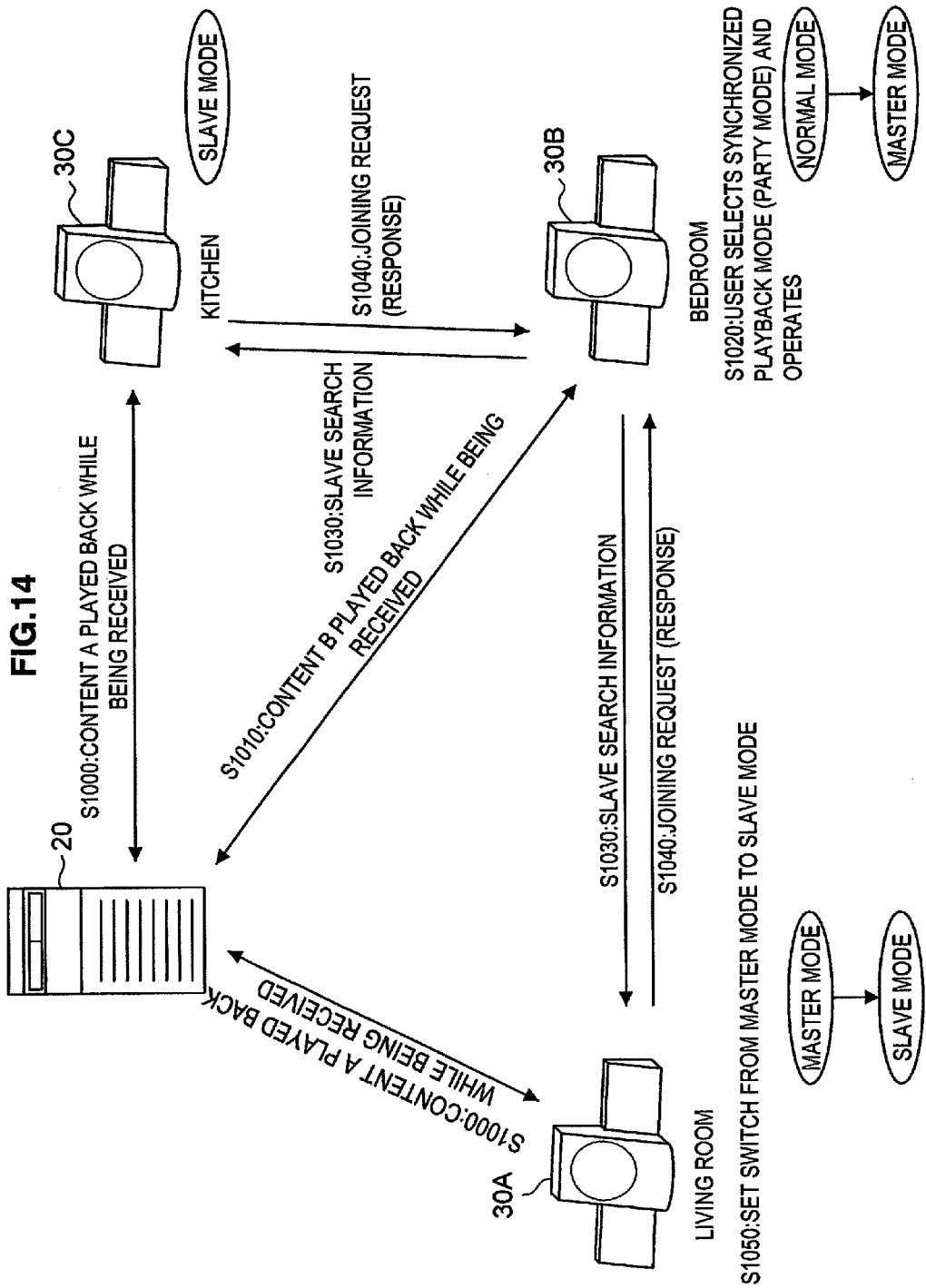

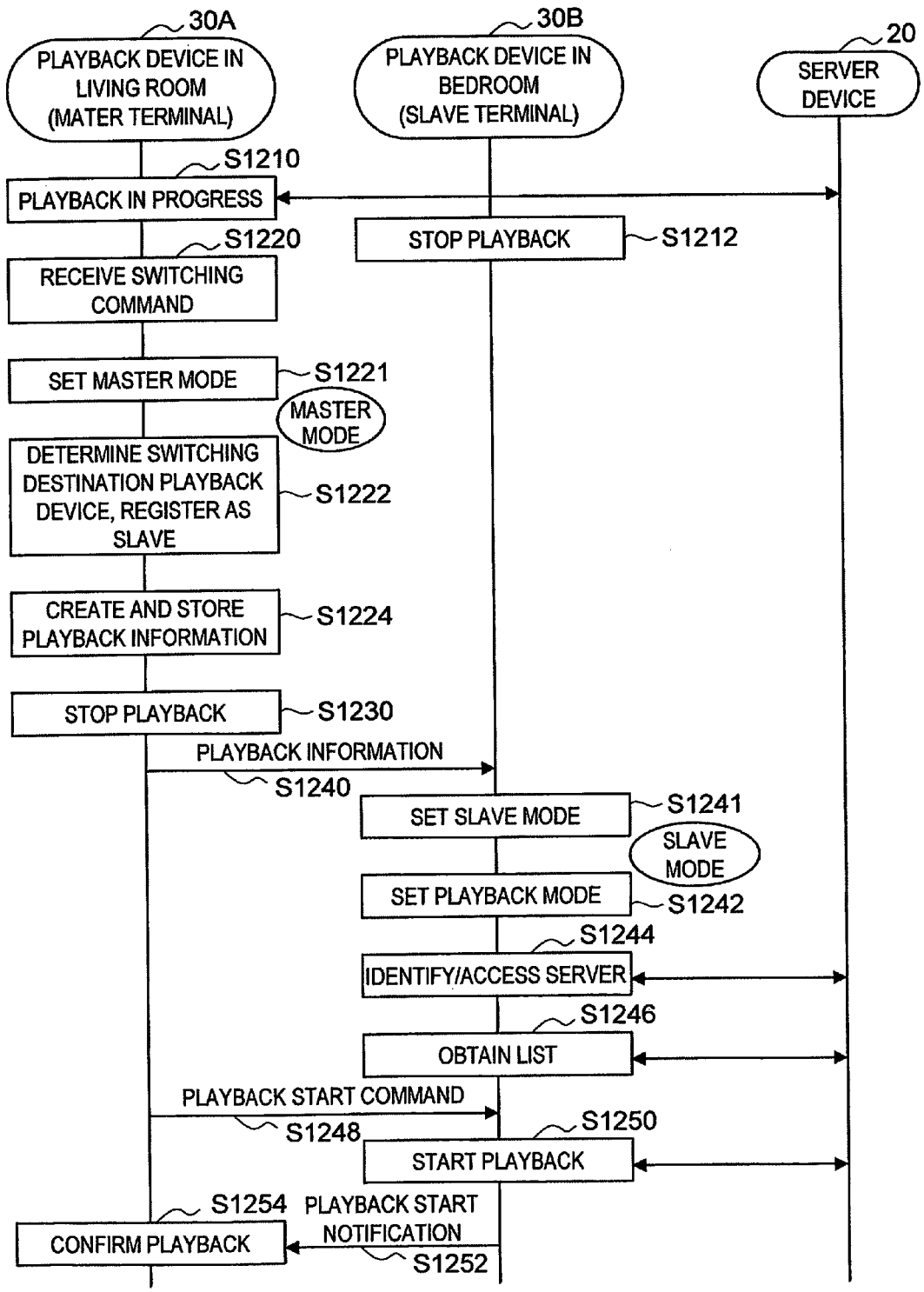

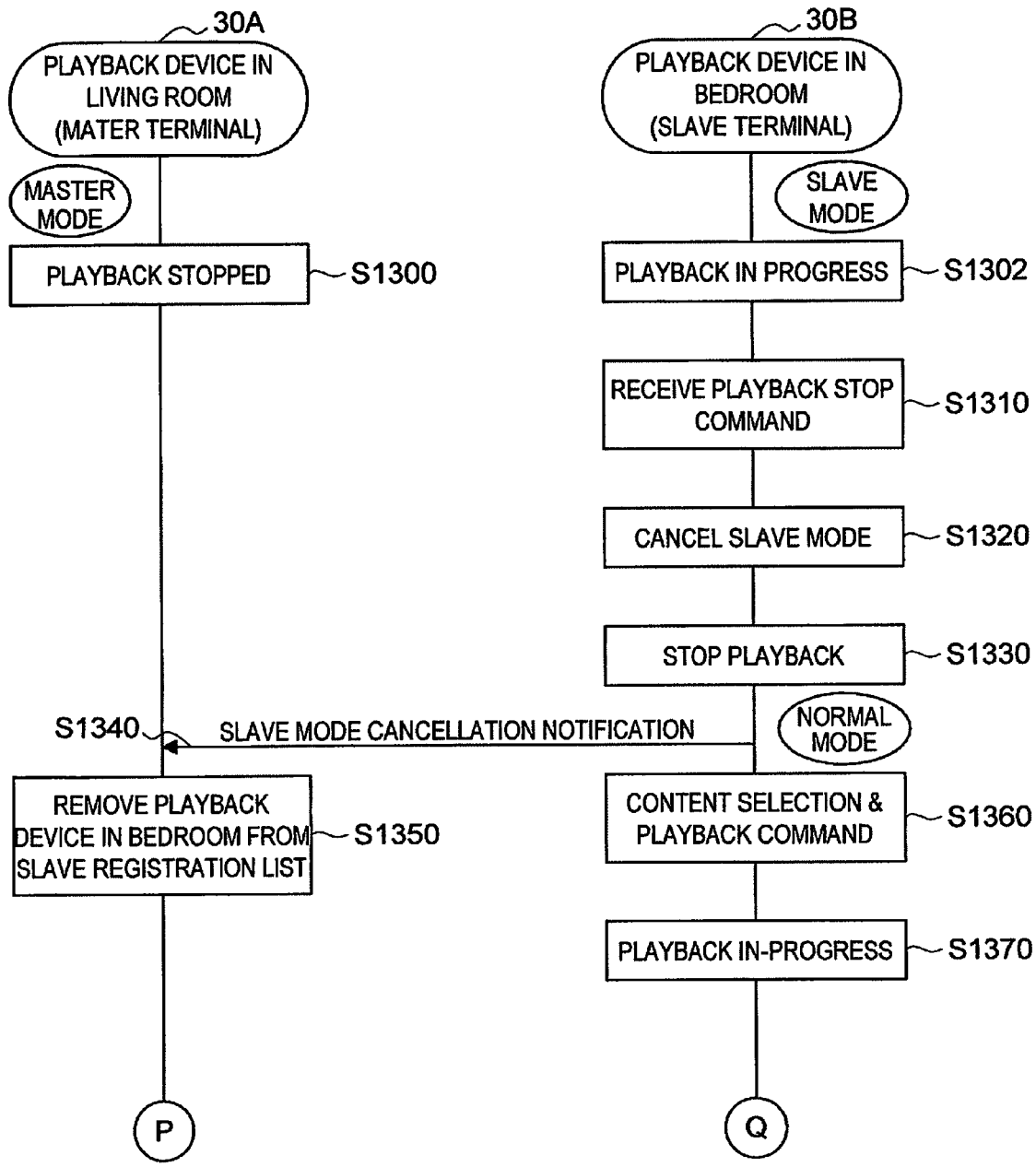

CONTENT PLAYBACK SYSTEM, PLAYBACK DEVICE, PLAYBACK CONTROL METHOD AND PROGRAM

CROSS REFERENCES TO RELATED APPLICATIONS

The present invention contains subject matter related to Japanese Patent Application JP 2006-348322 filed in the Japan Patent Office on Dec. 25, 2006, the entire contents of which being incorporated herein by reference.

BACKGROUND OF THE INVENTION

1. Field of the Invention

The present invention relates to a content playback system, a playback device, a playback control method, and a program.

2. Description of the Related Art

Known related art provides a content playback system which plays back content by transferring audio and image content stored on a server to a client (playback device) through a network between the client and the server that are provided with communication functions, in accordance with the Transmission Control Protocol/Internet Protocol (TCP/IP). In the content playback system, first, the client generally issues a request to the server to search for content that can be played back and to transmit a list of the content that can be played back. In response to the request, the client receives from the server the list of the content that can be played back. The client is also able to request that the server transmit the content that a user selects from the list, and can receive and playback the content that the server transmits in response.

As the content data is transmitted by streaming from the server, the client sequentially stores (buffers) the content data in a buffer memory temporarily. At a point when a specified amount of the data has been stored, the client reads the content data from the buffer and starts playing back the content. In a case where the client can handle only uncompressed digital data, the server decodes (expands) compressed digital data that has been compressed and encoded by an encoding system such as MPEG1 Audio Layer 3 (MP3) or the like, converts the data into uncompressed digital data, such as linear PCM data or the like, and transmits the data to the client.

Note that, in the above-described content playback system, the same content can be received from the server and played back in synchronization by a plurality of the clients that are connected to a network. For example, it is conceivable that when a house party or the like is held at a user's home, a home network system including a client provided in a living room and a client provided in a bedroom could be used to play back the same music in synchronization by the clients in the living room and the bedroom.

According to Japanese Patent Application Publication JP-A-2006-237918, a method for achieving synchronized playback by multiple clients is disclosed. In this method, the same content is simultaneously delivered to multiple clients by a server by using multicast (for example, a user datagram protocol (UDP) multicast), and the multiple clients play back the content in synchronization. In this case, to achieve highly accurate synchronized playback, each client must be informed of a playback timing. According to the technology disclosed in JP-A-2006-237918, time management (such as playback timing calculation and notification) for synchronized playback is performed on the server side (such as an HDD recorder).

SUMMARY OF THE INVENTION

Nevertheless, with the synchronized playback control method using UDP multicast according to the related technology described above, if the server and the client are connected with each other by a wired network (such as the Ethernet®), a special router compatible with UDP multicast must be provided. Furthermore, if the server and the client are connected with each other by a wireless network, the wireless network is incompatible with high-rate multicast transmission, and there is no packet-loss protection. Accordingly, synchronized playback operation may not be performed properly.

In addition, according to the technology disclosed in JP-A-2006-237918, a portable terminal (master terminal) having a synchronization control function transmits to another portable terminal (slave terminal) a synchronized playback timer measurement time and content, such that the slave terminal waits for just the synchronized playback timer measurement time (time management) and then starts playing back the content. However, with this technology, when a plurality of the portable terminals is wirelessly connected, the content needs to be delivered from the master terminal to the slave terminals by multicast transmission. Therefore, in some cases, the synchronized playback operation may not be performed properly. Moreover, this technology requires time management on the slave terminal side, thereby creating an increased burden on the slave terminal's functions and processing. In particular, in a case where the time management does not need to be that precise, such as when the music is played back in synchronization among the terminals provided in different rooms at a house party for example, a technology which allows synchronized playback using an easier method without performing the time management on the slave terminal side is required.

Therefore, it is desirable to provide a new and improved content playback system, playback device, playback control system, and program that do not require a special router for connecting devices, and that allow synchronized playback to be easily achieved while also being compatible with wireless connection, without needing to perform time management on a server side and a slave terminal side.

According to an embodiment of the present invention, there is provided a content playback system in which first and second playback devices that are capable of receiving and playing back content from a server device are connected by one of a wired connection and a wireless connection. In the content playback system, the first playback device includes a first communication portion that communicates data with the server device or the second playback device, and a first memory that memorizes content received from the server device through the first communication portion. Furthermore, the first playback device has a first playback portion that plays back the content that is memorized in the first memory. Moreover, the first playback device includes a first synchronized playback control portion that, upon receiving a synchronized playback command to play back the content in synchronization by the first playback device and the second playback device while the content is being played back by the first playback portion, transmits, to the second playback device through the first communication portion, information that pertains to the content and information that indicates a synchronized playback start time obtained by adding a predetermined additional time to an elapsed playback time for the content. After a playback preparation completion notification that indicates completion of playback preparation of the content is received from the second playback device through the first communication portion, and when the elapsed playback time for the content reaches the synchronized playback start time, the first synchronized playback control portion transmits a playback start command for the content to the second playback device through the first communication portion. The second playback device includes a second communication portion that communicates data with the server device or the first playback device, and a second memory that memorizes content received from the server device through the second communication portion. In addition, the second playback device has a second playback portion that plays back the content that is memorized in the second memory. Moreover, the second playback device includes a second synchronized playback control portion that receives, from the first playback device through the second communication portion, information that pertains to the content that is being played back on the first playback device and information that indicates the synchronized playback start time. Then, the second playback device starts receiving data that begins from the synchronized playback start time for the content from the server device based on the information that pertains to the content and memorizes the data in the second memory. Subsequently, the second playback device transmits the playback preparation completion notification to the first playback device through the second communication portion after the data of the content that is memorized in the second memory reaches or exceeds a specified volume. After transmission of the playback preparation completion notification and when the playback start command is received from the first playback device through the second communication portion, the second playback device starts playing back by the second playback portion the data that begins from the synchronized playback start time for the content, that is memorized in the second memory.

According to the embodiments of the present invention described above, there is provided a playback device that includes a communication portion that communicates data with a server device or an other playback device, and a memory that memorizes content received from the server device through the communication portion. The playback device also has a playback portion that plays back the content that is memorized in the memory. Furthermore, the playback device includes a synchronized playback control portion that, upon receiving a synchronized playback start command to play back the content in synchronization by the playback device and the other playback device while the content is being played back by the playback portion, transmits, to the other playback device through the communication portion, information that pertains to the content and information that indicates a synchronized playback start time obtained by adding a predetermined additional time to an elapsed playback time for the content. After a playback preparation completion notification that indicates completion of playback preparation of the content is received from the other playback device through the communication portion, and when the elapsed playback time for the content reaches the synchronized playback start time, the synchronized playback control portion transmits a playback start command for the content to the other playback device through the communication portion.

Furthermore, in response to the receiving of the synchronized playback command, the synchronized playback control portion may transmit search information for searching for playback devices that are going to join in synchronized playback, through the communication portion, to at least one other playback device that is connected to the playback device. When a joining response that indicates joining in the synchronized playback is received from the other playback device through the communication portion, the synchronized playback control portion may transmit, through the communication portion to the other playback device that transmitted the joining response, information that pertains to the content that is being played back on the playback device and information that indicates the synchronized playback start time.

Moreover, upon receiving a joining request that requests joining in synchronized playback from other second playback device through the communication portion while the playback device and other first playback device are playing back same content in synchronization, the synchronized playback control portion may transmit information that pertains to the content in synchronized playback and information that indicates a synchronized playback start time obtained by adding a predetermined additional time to an elapsed playback time for the content to the other second playback device through the communication portion. Then, the synchronized playback control portion may receive a playback preparation completion notification that indicates completion of playback preparation of the content from the other second playback device through the communication portion. After the playback preparation completion notification is received and when the elapsed playback time for the content reaches the synchronized playback start time, the synchronized playback control portion may transmit a playback start command for the content to the other second playback device through the communication portion.

Furthermore, while the playback device and the other playback device are playing back content that is the same in synchronization and when playback of the content by the playback portion is completed, the synchronized playback control portion may transmit information that pertains to next content that follows the current content to the other playback device through the communication portion. Then, the synchronized playback control portion may start receiving the next content through the communication portion from the server device and memorizes the next content in the memory. After receiving a playback preparation completion notification that indicates completion of playback preparation of the next content from the other playback device through the communication portion, the synchronized playback control portion may transmit a playback start command for the next content to the other playback device through the communication portion, and start playing back the next content that is memorized in the memory by the playback portion.

In addition, when the playback device and the other playback device are playing back content that is the same in synchronization, the synchronized playback control portion may request an elapsed playback time for the content to the other playback device. Then, in response to the request, the synchronized playback control portion may receive information that indicates the elapsed playback time for the other playback device from the other playback device through the communication portion. Thereafter, the synchronized playback control portion may compare the elapsed playback time for the other playback device and the elapsed playback time of the playback device. When the elapsed playback time of the other playback device differs from the elapsed playback time of the playback device by a predetermined time or more, the synchronized playback control portion may transmit a playback stop command for the content to the other playback device by the communication portion. After transmission of the playback stop command, the synchronized playback control portion may newly obtain the elapsed playback time for the content at the playback device, and transmit information that indicates a synchronized playback start time obtained by adding the predetermined additional time to the elapsed playback time, to the other playback device through the communication portion. After a playback preparation completion notification that indicates completion of playback preparation of the content is received from the other playback device through the communication portion, and when the elapsed playback time for the content at the playback device reaches the synchronized playback start time, the synchronized playback control portion may transmit the playback start command for the content to the other playback device through the communication portion.

Furthermore, the playback device may include a mode setting portion that sets, in response to the receiving of the synchronized playback command, a playback control mode of the playback device to a master mode that controls content playback by the other playback device.

According to another embodiment of the present invention, there is provided a playback device that includes a communication portion that communicates data with a server device or an other playback device, and a memory that memorizes content received from the server device through the communication portion. The playback device further includes a playback portion that plays back the content that is memorized in the memory. In addition, the playback device has a synchronized playback control portion that receives, from the other playback device through the communication portion, information that pertains to content that is being played back on the other playback device and information that indicates a synchronized playback start time obtained by adding a predetermined additional time to an elapsed playback time for the content. Then, the synchronized playback control portion starts receiving data that begins from the synchronized playback start time for the content from the server device based on the information that pertains to the content, and memorizes the data in the memory. After the data of the content that is memorized in the memory reaches or exceeds a specified volume, the synchronized playback control portion transmits a playback preparation completion notification that indicates completion of playback preparation of the content to the other playback device through the communication portion. Upon receiving a playback start command for the content from the other playback device after transmission of the playback preparation completion notification, the synchronized playback control portion starts playback of the data that begins from the synchronized playback start time for the content that is memorized in the memory.

Furthermore, the synchronized playback control portion may receive search information to search for playback devices that are going to join in synchronized playback from the other playback device through the communication portion. Then, the synchronized playback control portion may determine whether or not to allow synchronized playback with the other playback device based on setting information that is set in advance. If the synchronized playback is allowed, the synchronized playback control portion may transmit a joining response that indicates that the playback device is going to join in the synchronized playback with the other playback device to the other playback device through the communication portion.

Moreover, when two or more other playback devices are playing back content that is the same in synchronization and playback by the playback device is stopped, the synchronized playback control portion may, upon receiving a synchronized playback command for synchronized playback of the content between the playback device and the other playback devices, transmit a joining request to request that the playback device join in synchronized playback to the other playback devices through the communication portion.

Moreover, while content that is the same is being played back in synchronization by the playback device and the other playback device and when playback of the content is completed, the synchronized playback control portion may receive from the other playback device through the communication portion, information that pertains to next content that follows the current content. Then, the synchronized playback control portion may start receiving the next content from the server device through the communication portion and memorizes the data in the memory, and transmits a playback preparation completion notification that indicates completion of playback preparation of the next content to the other playback device through the communication portion after the data of the next content that is memorized in the memory reaches or exceeds a specified volume. Upon receiving a playback start command from the other playback device after transmission of the playback preparation completion notification, the synchronized playback control portion may start playing back the next content that is memorized in the memory by the playback portion.

Furthermore, while content that is the same is being played back in synchronization by the playback device and the other playback device, the synchronized playback control portion may transmit, in response to a request from the other playback device, information that indicates a synchronized elapsed time of the content at the playback device to the other playback device through the communication portion. When an elapsed playback time of the other playback device differs from the elapsed playback time of the playback device by a predetermined time or more, the synchronized playback control portion may receive a playback stop command for the content from the other playback device through the communication portion. Upon receiving the playback stop command, the synchronized playback control portion may stop playback of the content, and receive from the other playback device through the communication portion, information that indicates a synchronized playback start time obtained by adding the predetermined additional time to the elapsed playback time for the content that is being played back on the other playback device. Then, the synchronized playback control portion may start receiving data that begins from the synchronized playback start time for the content from the server device through the communication portion and memorizes the data in the memory. After the data of the content that is memorized in the memory reaches or exceeds a specified volume, the synchronized playback control portion may transmit to the other playback device through the communication portion, a playback preparation completion notification that indicates completion of playback preparation of the content. Upon receiving a playback start command from the other playback device through the communication portion after transmission of the playback preparation completion notification, the synchronized playback control portion may start playing back, by the playback portion, the data that begins from the synchronized playback start time for the content that is memorized in the memory.

In addition, the playback device may further include a mode setting portion that sets, when the synchronized playback is allowed, a playback control mode of the playback device to a slave mode by which content playback is controlled by the other playback device.

According to another embodiment of the present invention, there is provided a playback control method for a playback device that plays back content received from a server device in synchronization with at least one or more playback devices. The playback control method includes a playback step for playing back, while receiving, content from the server device. Furthermore, the playback control method includes a first synchronized playback start time transmission step for transmitting to the other playback device, information that pertains to the content and information that indicates a synchronized playback start time obtained by adding a predetermined additional time to an elapsed playback time for the content, upon receiving a synchronized playback command to play back the content in synchronization by the playback device and the other playback device while the content playback is in progress. In addition, the playback control method includes a first playback preparation completion notification receiving step for receiving, from the other playback device, a playback preparation completion notification that indicates completion of playback preparation of the content. Finally, the playback control method includes a first playback start command transmission step for transmitting a playback start command for the content to the other playback device when the elapsed playback time for the content reaches the synchronized playback start time after receiving of the playback preparation completion notification.

Furthermore, the playback control method may further include a search information transmission step for transmitting, in response to the receiving of the synchronized playback command, search information to search a playback device that joins synchronized playback, to at least one other playback device that is connected to the playback device. Moreover, the playback control method may further include a joining response receiving step for receiving a joining response that indicates joining in synchronized playback as a response to the search information from the other playback device. At the first synchronized playback start time transmission step, the information that pertains to the content and the information that indicates the synchronized playback start time are transmitted to the other playback device that transmitted the joining response.

In addition, the playback control method may further include a joining request receiving step for receiving a joining request that requests joining in synchronized playback from the other second playback device, when content that is the same is played back in synchronization by the playback device and the other first playback device. Furthermore, the playback control method may further include a second synchronized playback start time transmission step for transmitting, to the other second playback device in response to the receiving of the joining request, information that pertains to the content that is being played back in synchronization and information that indicates a synchronized playback start time obtained by adding a predetermined additional time to an elapsed playback time for the content. Moreover, the playback control method may further include a second playback preparation completion notification receiving step for receiving a playback preparation completion notification that indicates completion of playback preparation of the content from the other second playback device. Finally, the playback control method may further include a second playback start command step for transmitting a playback start command for the content to the other second playback device when the elapsed playback time for the content reaches the synchronized playback start time after receiving of the playback preparation completion notification.

Furthermore, the playback control method may further include a content information transmission step for transmitting, when content that is the same is played back in synchronization by the playback device and the other playback device and the content playback is completed, information that pertains to next content that follows the current content. In addition, the playback control method may further include a content receiving step for starting receiving of the next content from the other playback device and memorizes the content in the memory. Moreover, the playback control method may further include a second playback preparation completion notification step for receiving, from the other playback device, a playback preparation completion notification that indicates completion of playback preparation of the next content. Finally, the playback control method may further include a playback start step for transmitting the playback start command for the next content to the other playback device after receiving of the playback preparation completion notification, and starting playback of the next content that is memorized in the memory.

Furthermore, the playback control method may further include a step for requesting, when content that is the same is played back in synchronization by the playback device and the other playback device, an elapsed playback time for the content to the other playback device. In addition, the playback control method may further include an elapsed playback time receiving step for receiving, in response to the request, information that indicates an elapsed playback time of the other playback device from the other playback device. Moreover, the playback control method may further include a comparison step for comparing the elapsed playback time of the other playback device and the elapsed playback time of the playback device, and a playback stop command transmission step for transmitting a playback stop command for the content to the other playback device when the elapsed playback time of the other playback device differs from the elapsed playback time of the playback device by a predetermined time or more. Also, the playback control method may further include a second synchronized playback start time transmission step for newly obtaining the elapsed playback time for the content at the playback device after transmission of the playback stop command, and transmitting, to the other playback device, information that indicates the synchronized playback start time obtained by adding the predetermined additional time to the elapsed playback time. Further, the playback control method may further include a second playback preparation completion notification receiving step for receiving, from the other playback device, a playback preparation completion notification that indicates completion of playback preparation of the content. Finally, the playback control method may further include a second playback start command transmission step for transmitting a playback start command for the content to the other playback device when the elapsed playback time for the content at the playback device reaches the synchronized playback start time after receiving of the playback preparation completion notification.

Furthermore, the playback control method may further include a mode setting step for setting, in response to the receiving of the synchronized playback start command, the playback control mode of the playback device to a master mode that controls playback of content by the other playback device.

According to another embodiment of the present invention, there is provided a playback control method for a playback device that plays back content received from a server device in synchronization with at least one or more other playback devices. The playback control method includes a first synchronized playback start time receiving step for receiving, from the other playback device, information that pertains to content that is being played back on the other playback device and information that indicates a synchronized playback start time obtained by adding a predetermined additional time to an elapsed playback time for the content. Also included in the playback control method is a first content receiving step for, based on the information that pertains to the content, starting to receive data that begins from the synchronized playback start time for the content from the server device and memorizing the data in a memory. In addition, the playback control method includes a first playback preparation completion notification transmission step for transmitting to the other playback device a playback preparation completion notification that indicates completion of playback preparation of the content after the data of the content that is memorized in the memory reaches or exceeds a specified volume. Furthermore, the playback control method includes a first playback start step for starting playback of the data that begins from the synchronized playback start time for the content that is memorized in the memory, upon receiving a playback start command for the content from the other playback device after transmission of the playback preparation completion notification.

Moreover, the playback control method may further include a search information receiving step for receiving, from the other playback device, search information to search for playback devices that are going to join in synchronized playback. Additionally, the playback control method may further include a synchronized playback permitting step for determining whether or not to allow synchronized playback with the other playback device based on setting information that is set in advance. Finally, the playback control method may further include a joining response transmission step for, when the synchronized playback is allowed, transmitting to the other playback device a joining response that indicates that the playback device is going to join in the synchronized playback with the other playback device.

Furthermore, the playback control method may further include a joining request transmission step for, when two or more other playback devices are playing back content that is the same in synchronization and playback by the playback device is stopped, and upon receiving a synchronized playback command to play back the content in synchronization by the playback device and the other playback devices, transmitting to the other playback devices a joining request that requests joining in the synchronized playback.

In addition, the playback control method may further include a content information receiving step for, when content that is the same is played back in synchronization by the playback device and the other playback device and upon completion of playback of the content, receiving, from the other playback device, information that pertains to next content that follows the current content. Moreover, the playback control method may further include a second content receiving step for starting receiving of the next content from the server device and memorizing the next content in the memory. Furthermore, the playback control method may further include a second playback preparation completion notification transmission step for transmitting to the other playback device a playback preparation completion notification that indicates completion of playback preparation of the next content, after data of the next content that is memorized in the memory reaches or exceeds a specified volume. Finally, the playback control method may further include a second playback start step for starting playback of the next content that is memorized in the memory, upon receiving a playback start command from the other playback device after transmission of the playback preparation completion notification.

Furthermore, the playback control method may further include an elapsed playback time transmission step for, when content that is the same is played back in synchronization by the playback device and the other playback device, transmitting information that indicates the elapsed playback time for the content at the playback device to the other playback device in response to a request from the other playback device. Additionally, the playback control method may further include a playback stop command receiving step for receiving a playback stop command for the content from the other playback device when the elapsed playback time of the other playback device differs from the elapsed playback time of the playback device by a predetermined time or more. Moreover, the playback control method may further include a playback stop step for stopping playback of the content in response to the receiving of the playback stop command. Also, the playback control method may further include a second synchronized playback start time receiving step for receiving, from the other playback device, information that indicates a synchronized playback start time obtained by adding the predetermined additional time to the elapsed playback time for the content that is being played back on the other playback device. Furthermore, the playback control method may further include a second content receiving step for starting receiving of data that begins from the synchronized playback start time for the content from the server device and memorizing the data in the memory. Additionally, the playback control method may further include a second playback preparation completion notification transmission step for transmitting, to the other playback device, a playback preparation completion notification that indicates completion of playback preparation of the content after the data of the content that is memorized in the memory reaches or exceeds the specified volume. Finally, the playback control method may further include a second playback start step for starting playback of the data that begins from the synchronized playback start time for the content that is memorized in the memory, upon receiving a playback start command from the other playback device after transmission of the playback preparation completion notification.

Moreover, the playback control method may further include a mode setting step for setting, when synchronized playback is allowed at the synchronized playback permitting step, a playback control mode of the playback device to a slave mode by which content is controlled by the other playback device.

According to another embodiment of the present invention, there is provided a program that comprises commands that command a computer system that controls a playback device that plays back content received from a server device in synchronization with at least one or more other playback devices, to perform a playback step for playing back, while receiving, content from the server device. Furthermore, the program commands the computer system to perform a first synchronized playback start time transmission step for transmitting to the other playback device, information that pertains to the content and information that indicates a synchronized playback start time obtained by adding a predetermined additional time to an elapsed playback time for the content, upon receiving a synchronized playback command to play back the content in synchronization by the playback device and the other playback device while the content playback is in progress. The program further commands performance of a first playback preparation completion notification receiving step for receiving, from the other playback device, a playback preparation completion notification that indicates completion of playback preparation of the content. Moreover, the program commands performance of a first playback start command transmission step for transmitting a playback start command for the content to the other playback device when the elapsed playback time for the content reaches the synchronized playback start time after receiving of the playback preparation completion notification.

According to another embodiment of the present invention, there is provided a program that comprises commands that command a computer system that controls a playback device that plays back content received from a server device in synchronization with at least one or more other playback devices, to perform a first synchronized playback start time receiving step for receiving, from the other playback device, information that pertains to content that is being played back on the other playback device and information that indicates a synchronized playback start time obtained by adding a predetermined additional time to an elapsed playback time for the content. Furthermore, the program commands performance of a first content receiving step for, based on the information that pertains to the content, starting to receive data that begins from the synchronized playback start time for the content from the server device and memorizing the data in a memory. Moreover, the program commands performance of a first playback preparation completion notification transmission step for transmitting to the other playback device a playback preparation completion notification that indicates completion of playback preparation of the content after the data of the content that is memorized in the memory reaches or exceeds a specified volume. Finally, the program commands performance of a first playback start step for starting playback of the data that begins from the synchronized playback start time for the content that is memorized in the memory, upon receiving a playback start command for the content from the other playback device after transmission of the playback preparation completion notification.

In the content playback system above, while content is being played back by the first playback device, and when the first playback device receives the synchronized playback command to play back the content by the first playback device and the second playback device, the first playback device transmits to the second playback device information that pertains to the content and information that indicates the synchronized playback start time obtained by adding the predetermined additional time to the elapsed playback time for the content. Subsequently, the second playback device receives the information that pertains to the content and the information that indicates the synchronized playback start time. Then, based on the information that pertains to the content, the second playback device starts receiving the data that begins from the synchronized playback start time for the content from the server device, and memorizes the data in the second memory. Once the data of the content memorized in the second memory reaches or exceeds a specified volume, the playback preparation completion notification that indicates completion of playback preparation of the content in the second playback device is transmitted to the first playback device. Furthermore, after the first playback system receives the playback preparation completion notification, and when an elapsed playback time for the content in the first playback device reaches the synchronized playback start time, the first playback device transmits the content playback start command to the second playback device. Thereafter, upon receiving the playback start command from the first playback device, the second playback device starts playing back the data that begins from the synchronized playback start time of the content that is memorized in the second memory.

Moreover, with a playback device corresponding to the first playback device, the playback control method for the playback device, and the program, when the synchronized playback command for playing back the content in synchronization by the playback device and an other playback device is received while the content is being played back by the playback device, the information that pertains to the content and the information that indicates the synchronized playback start time obtained by adding the predetermined additional time to an elapsed playback time for the content are transmitted to the other playback device. After receiving, from the other playback device, the playback preparation completion notification that indicates completion of playback preparation of the content in the other playback device, and when the elapsed playback time for the content in the playback device reaches the synchronized playback start time, the playback start command for the content is transmitted to the other playback device.

Furthermore, with a playback device corresponding to the second playback device, the playback control method for the playback device, and the program, the information that pertains to the content that is being played back on the other playback device and the information that indicates the synchronized playback start time obtained by adding the predetermined additional time to an elapsed playback time for the content are received from the other playback device. Then, based on the information that pertains to the content, receiving of the data that begins from the synchronized playback start time of the content from the server device is started, and the data is memorized in the memory. Once the data of the content memorized in the memory reaches or exceeds the specified volume, the playback preparation completion notification that indicates completion of playback preparation of the content is transmitted to the other playback device. Furthermore, after transmission of the playback preparation completion notification, when the content playback start command is received from the other playback device, playback of the data that begins from the synchronized playback start time of the content that is memorized in the memory is started.

As described above, the playback device in the content system executes time management for synchronized playback and sets the synchronized playback start time of content that is being played back on the playback device. Furthermore, when the elapsed playback time reaches the synchronized playback start time, the playback start command is transmitted to another playback device, thereby controlling receiving and playback of the content from the server device on the other playback device. Consequently, synchronized playback of content that is the same by a plurality of playback device can be easily realized without a need to distribute the content from the server device to each playback device by multicast transmission.

According to the embodiments of the present invention described above, there is no need to provide an exclusive router to connect between devices, and synchronized playback that is compatible with wireless connection can be achieved easily without performing time management on the server side and the slave terminal side.

BRIEF DESCRIPTION OF THE DRAWINGS

FIG. 2 is a block diagram that shows a configuration of a server device according to the embodiment;

FIG. 3 is a block diagram that shows a configuration of a playback device according to the embodiment;

FIG. 4 is an explanatory figure that shows specific examples of operation buttons provided on a main body of the playback device according to the embodiment;

FIG. 6 is an explanatory figure that shows an overview of a streaming transmission process and a streaming playback process according to the embodiment;

FIG. 7A is an explanatory figure that shows a playback control method that is performed when synchronized playback starts according to the embodiment;

FIG. 7B is an explanatory figure that shows the playback control method that is performed when synchronized playback starts according to the embodiment;

FIG. 7C is an explanatory figure that shows the playback control method that is performed when synchronized playback starts according to the present embodiment;

FIG. 8A is a flow chart that shows the playback control method that is performed when synchronized playback starts according to the present embodiment;

FIG. 9A is an explanatory figure that shows a playback control method that is used when a new playback device joins playback devices that are already performing synchronized playback according to the present embodiment;

FIG. 9 B is an explanatory figure that shows the playback control method that is used when the new playback device joins the playback devices that are already performing synchronized playback according to the present embodiment;

FIG. 10A is a flow chart that shows the playback control method that is used when the new playback device joins the playback devices that are already performing synchronized playback according to the present embodiment;

FIG. 10B is a flow chart that shows the playback control method that is used when the new playback device joins the playback devices that are already performing synchronized playback according to the present embodiment;

FIG. 11B is a flow chart that shows the playback control method that is used when content switching is performed during synchronized playback according to the present embodiment;

FIG. 12A is a flow chart that shows a playback control method that is used when a master terminal adjusts time lag of an elapsed playback times of a slave terminal according to the present embodiment;

FIG. 12B is a flow chart that shows the playback control method that is used when the master terminal adjusts time lag of the elapsed playback times of the slave terminal according to the present embodiment;

FIG. 13 is an explanatory figure that shows a playback control method that is used when a playback device withdraws from a slave mode according to the present embodiment;

FIG. 14 is an explanatory figure that shows a playback control method that is used when switching a master terminal and a slave terminal according to the present embodiment;

FIG. 17 is a flow chart that shows a playback switching control method that is used for switching between playback devices according to the present embodiment;

FIG. 18A is a flow chart that shows the playback control method that is used when switching the master terminal and the slave terminal according to the present embodiment.

DETAILED DESCRIPTION OF THE PREFERRED EMBODIMENTS

Figure 1:
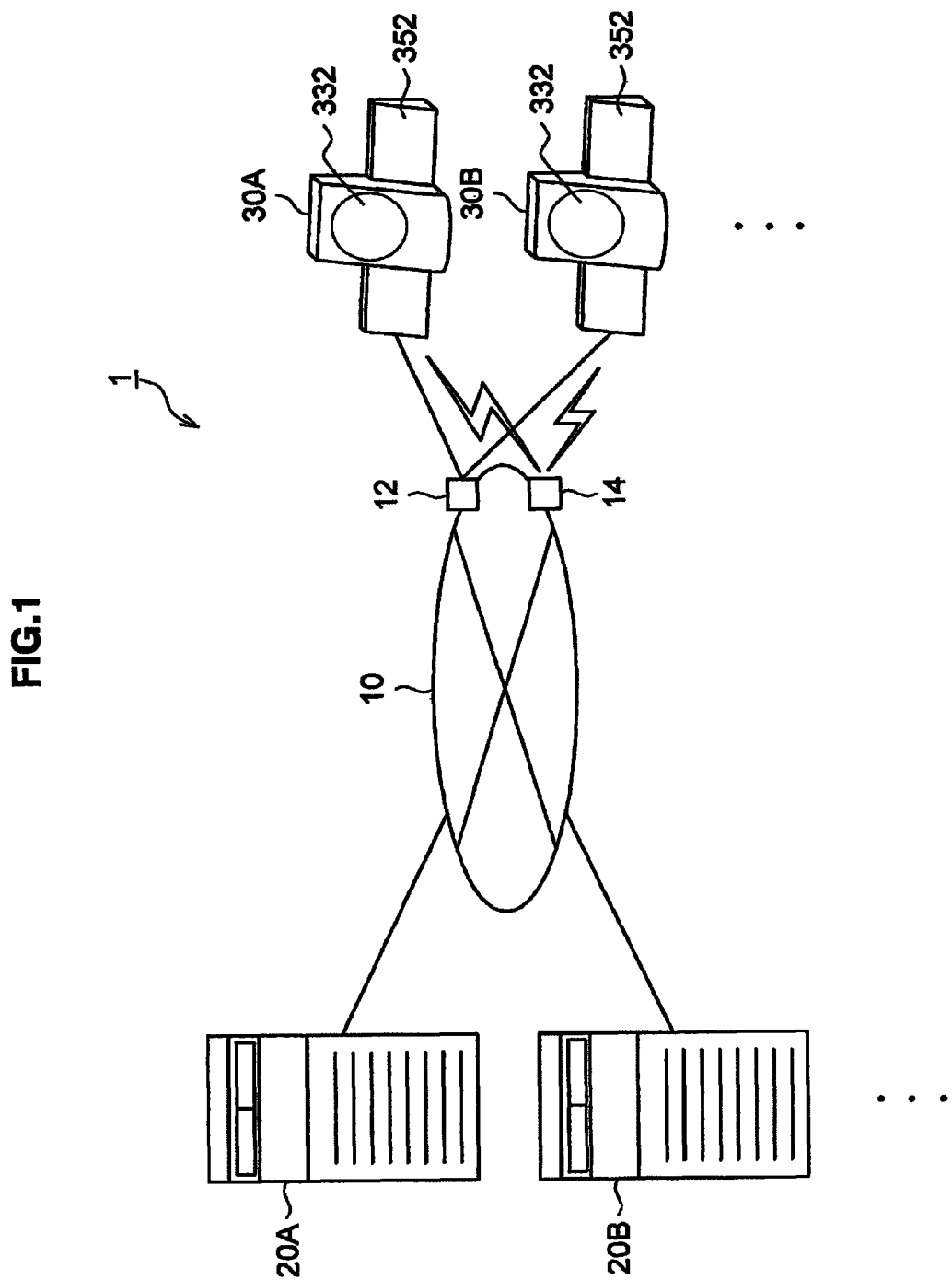
FIG. 1 is an explanatory figure that shows a configuration of a home network system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

System Configuration

First, a home network system 1 according to a first embodiment of the present invention will be explained with reference to FIG. 1. FIG. 1 is an explanatory figure that shows a configuration of the home network system 1 according to the present embodiment. Note that the home network system 1 according to the present embodiment corresponds to an example of a content playback system.

As shown in FIG. 1, the home network system 1 is a network system that is provided inside a user's home or the like, for example, and that is configured by interconnecting a plurality of devices. In the home network system 1, a plurality of server devices 20A, 20B, and the like (hereinafter sometimes generically called "the server device(s) 20") and a plurality of playback devices 30A, 30B, and the like (hereinafter sometimes generically called "the playback device(s) 30"), for example, are connected such that they are capable of mutual data communication through a switching hub, 12, an access point 14, and a household local area network (LAN) 10, which is an example of a network. The server devices 20 are configured as home servers in the home network system 1 and function as content provider servers that provide content to each of the playback devices 30. The playback devices 30 are equivalent to clients (playback terminal devices) of the server devices 20 and have a function to play back the content that is transmitted from the server devices 20 while receiving the content.

In the present embodiment, the content may be any form of content, such as audio content like music, lectures, radio programs, and the like, video content like motion pictures, television programs, video programs, and the like that are made up of image data and/or audio data, game content, and the like. The present invention will be explained below using the audio content, particularly the music content, as an example of the content, but the content of the present invention is not limited by this example.

The LAN 10 is a communication network that connects, for example, a plurality of devices (the server devices 20, the playback devices 30) that are used within a household. The LAN 10, regardless of whether it is wired or wireless, may take the form of a wired Ethernet® such as 10base2, 1000baseT, or the like, for example. The LAN 10 may also take the form of a wireless LAN that is specified by the 802.11

Working Group of the Institute of Electrical and Electronics Engineers, Inc. (IEEE), for example.

The switching hub router 12 and the access point 14 are relay devices for mutually connecting, by either a wired connection or a wireless connection, a group of devices such as a plurality of the server devices 20 and a plurality of the playback devices 30.

When data is transmitted and received between the server devices 20 and the playback devices 30 through the LAN 10, which is wired, the switching hub 12 serves as a relay device and is configured from an Internet switch or the like, for example. The switching hub 12 has a hub function that connects the devices on the LAN 10, analyzing the data that is sent from the transmission source device to detect the destination, then transmitting the data only to the destination device. The load on the entire home network system 1 can thus be lightened, and security can be improved. Note that a broadband router (not shown in the figures) that has a router function that relays data between the LAN 10 and an external public circuit network may also be provided on the LAN 10 instead of or in addition to the switching hub 12. In addition, in this embodiment, the switching hub and the router are configured by a single device, but the invention is not limited to this structure. The switching hub and the router may be separate devices.

Furthermore, the switching hub router 12 functions as a router which performs transmission by analyzing, for example, some protocols of a network layer (third layer) and transport layer (fourth layer) of the open systems interconnection (OSI) reference model. According to related technologies, the server device 20 and the plurality of playback devices 30 are connected by wire through a router. When the content is played back in synchronization by the plurality of the playback devices, UDP multicast is used to deliver the content simultaneously from the server device to the plurality of the playback devices. In the case of multicast transmission, a special router that is compatible with UDP multicast must be provided. However, with the home network system 1 according to the embodiment, even when the same content is delivered to the plurality of playback devices 30 from the server device 20 for synchronized playback, unicast transmission can be utilized in place of the multicast transmission. Accordingly, in addition to the router compatible with the multicast, a router incompatible with the multicast can also be used as the router for the switching hub router 12. In consequence, according to the embodiment, synchronized playback can be achieved among the plurality of playback devices 30 without any constraint related to selection of the type of the wire-connected router.

The access point 14 is a radio relay device for wireless communication that connects devices to achieve a wireless LAN function in the LAN 10. For example, the access point 14 (wireless parent unit) and the server devices 20 are connected by wire in an Ethernet®, and the playback devices 30 are connected wirelessly to the access point 14 by wireless child units. Using the access point 14 makes it possible for the server devices 20 and the playback devices 30 to perform wireless communications simultaneously with a plurality of other devices, for example.

Note that the form in which the plurality of devices in the network are interconnected is not limited by the examples described above, and any form of connection may be used in which data communication among the devices is possible. In addition, the plurality of devices may also perform wireless communications directly using an ad hoc mode Bluetooth or ultra wide band (WXB), without going through the access point 14.

The server device 20 (home server) is configured, for example, as a Digital Media Server (DMS) that can record, store, and distribute content. For the server device 20, it is possible, for example, to use DLNA-compatible devices that conform to the Digital Living Network Alliance (DLNA) guidelines and that transmit and receive data. The server devices 20 are configured from laptop and desktop personal computers, for example, but it is also possible to configure the server devices 20 from various types of information processing devices, such as network memory devices, home network server devices, data recording devices (DVD and HDD recorders and the like), game devices, intelligent electrical appliances, and the like.

The server device 20 acquires and stores a plurality of music content files. For example, through a public circuit network such as the Internet, a wide area network (WAN), or the like, the server device 20 receives the distribution of content from a content distribution server (not shown in the figures) that provides a content distribution service, then stores the distributed content in a memory device such as a hard disk drive (HDD) or the like. The server device 20 can also create new content by self-recording (of sounds, images, and the like), ripping, and the like and store the new content in the memory device, a removable recording medium, and the like. Note that self-recording means the recording as digital data of images and sounds that are photographed and collected by a photographic device and a sound collecting device that are ancillary to the server device 20. Ripping means extracting digital content that is recorded in a recording medium such as a music CD, a video DVD, or the like, converting the content into a file format that can be processed on a computer, and recording the content in the memory device or the removable recording medium.

Thus the content that is stored on the server device 20 may be uncompressed digital data (hereinafter called "uncompressed data") such as linear pulse code modulation (PCM) data or the like, for example, and it may be compressed digital data (hereinafter called simply "compressed data") that was compressed by any one of various types of compression encoding methods. In the case of music content, examples of compression encoding methods include Adaptive Transform Acoustic Coding (ATRAC), ATRAC3, MPEG1 Audio Layer 3 (MP3), Advanced Audio Coding (AAC), Windows Media Audio (WMA), and the like.

From among the plurality of the content files that the server device 20 stores, such as music content that is stored in the memory device, music content that is stored in a removable recording medium such as a CD, a DVD, and the like, Web radio music content that is received through the Internet, and the like, the server device 20 uses a streaming method (hereinafter called "streaming transmission") to transmit to the playback device 30 through the LAN 10 the content for which a transmission request was received from the playback device 30. Here, the streaming method is a method for transmitting the data in synchronization with the content processing speed (for example, the playback speed) of the device that receives the data (the playback device 30). The playback device 30 can thus play back the content that is streamed from the server device 20 while receiving the content. In a case where the content is compressed data, the server device 20 first expands the compressed data and converts it into the uncompressed data (for example, the linear PCM data), then transmits it to the playback device 30.

The server device 20 can also transmit to the playback device 30 a content list that lists information that pertains to the plurality of the music content files (for example, a track title, an album title, an artist name, address information (Uniform Resource Locator (URL) or the like), a sampling frequency, a number of channels, a number of bits, codec information, and the like) using a determined unit (for example, album units, artist units, genre units, play list units.

The playback device 30 is a Digital Media Player (DMP) that is capable of playing back the content. The playback device 30 can, for example, be a DLNA-compatible device that conforms to the DLNA guidelines and transmits and receives data, in the same manner as the server device 20. In the present embodiment, the playback device 30 is a playback terminal device that outputs sound that is played back from content distributed by the server device 20, and is configured as, for example, a network audio client device, for example. The playback device 30 that is configured as a network audio client device is provided with, for example, a display portion 332 (an LCD panel or the like) that is a user interface and an audio output portion to output the sound of the music content that is played back. The audio output portion may be an externally mounted speaker 352, for example. However, the playback device according to the present invention is not limited by this example and may also be configured by various types of terminal device such as a laptop personal computer, a mobile music player, an audio-visual component, a personal digital assistant (PDA), a home game device, a mobile game device, a mobile telephone, a PHS, a data playback device (a DVD/HDD player or the like), an intelligent electrical appliance such as a television receiver or the like, for example.

The playback device 30 has a function that selects the server device 20, a function that acquires the content list from the server device 20, a function that selects the content to be played back, a function that receives the content to be played back from the server device 20, and a function that plays back and outputs the content. Specifically, the playback device 30 searches for one, two, or more of the server devices 20 that are connected to the LAN 10 and are in operation, then selects from among the server devices 20 that it has found, automatically or based on a user operation or the like, the server device 20 from which it will receive the provision of the content. The playback device 30 also acquires from the selected server device 20 information (the content list) that pertains to the plurality of the content files that are stored on the server device 20, then displays the information on the display portion 332. The user can examine the content list, set the content desired for playback, and set the playback mode. In response to the content selection and the like, the playback device 30 issues a request to the server device 20 to transmit the selected content in accordance with the set playback mode. In response to the content transmission request, the server device 20 streams the content to the playback device. The playback device 30, temporarily stores the received content in a buffer (not shown in the figures), and the then reads the content from the buffer and performs a digital-to-analog conversion of the content and outputs the converted content.

As described above, the server device 20 and the playback device 30 according to the present embodiment are both DLNA-compatible devices, for example, and mutually transmit and receive data according to a communications protocol, such as the Transmission Control Protocol/Internet Protocol (TCP/IP), for example, through a LAN 10 that consists of an Ethernet® and/or a wireless LAN. The server device 20 and the playback device 30 become usable simply by connecting them to the LAN 10. The playback device 30 (DMP) searches for the server devices 20 (DMS) that are present within the home network system 1 and automatically acquires from the server devices 20 the lists of the content that can be played back. If the user simply selects the content that he wants to see/hear from the lists acquired from the server devices 20, the content is automatically provided from the server device 20 to the playback device 30 and played back. Note that the server device 20 may also have a content playback function like that of the playback device 30.

Server Device 20 Configuration

Next, the configuration of the server device 20 (home server) according to the present embodiment will be explained with reference to FIG. 2. FIG. 2 is a block diagram that shows the configuration of the server device 20 according to the present embodiment.

As shown in FIG. 2, the server device 20 is provided with a communication portion 210, a control portion 212, an input portion 214, an output portion 216, a memory 220 that has a communication buffer 222, a storage device 230, a disk drive 232, an encoder 234, and a decoder 236.

The communication portion 210 is a communications interface that is configured from a communications device or the like that performs data communications with an external device through the network. The communication portion 210 transmits and receives various types of data to and from the playback devices 30 and other external devices through the LAN 10, based on control by the control portion 212. The communication portion 210 can be compatible with Ethernet® and Giga Ethernet®, for example. In an environment where direct communication is possible with the access point 14 for wireless communications, the communication portion 210 can also be compatible with wireless communications such as IEEE 802.11a/b/g, and the like. When transmitting and receiving various types of information, the communication portion 210 can control the volume of data communicated by storing the communicated data temporarily in the communication buffer 222.

The communication portion 210 transmits and receives various types of information, such as the content that the storage device 230 stores, the content list, content attribute information, the content transmission request, a content list request, a control signal, and the like. The communication portion 210 can also transmit and receive various types of information, such as the content, a content distribution request, and the like, to and from the content distribution server (not shown in the figures) through a public circuit network (not shown in the figures).

The control portion 212 is configured from a central processing unit (CPU), a read-only memory (ROM), a random access memory (RAM), and the like, for example. The control portion 212 operates according to various types of programs that are stored in the ROM and the storage device 230 and controls the overall operation of the server device 20. For example, the control portion 212 controls the transmission and receiving of the various types of data to and from the playback devices 30 through the communication portion 210. Specifically, the control portion 212 controls the processing by which, in response to the content transmission request from the playback device 30, the compressed data for the content is read out from the storage device 230, the compressed data is converted to the uncompressed data by the decoder 236, and the uncompressed data is streamed to the playback device 30 by the communication portion 210. The streaming processing will be described in detail later. The control portion 212 also functions as a ripping portion that can use the disk drive 232 and the encoder 234 to rip music content (tracks) and video content from a removable storage medium such as a music CD, a video DVD, or the like that is loaded into the disk drive 232, and store the content in the storage device 230.

The input portion 214 is configured from an operation portion, an input control circuit, and the like. The operation portion is, for example, a mouse, a keyboard, a touch panel, a button, a switch, a lever, or the like. The input control circuit generates an input signal in accordance with an input operation of the operation portion, and outputs it to the control portion 212. By operating the input portion 214, the user of the server device 20 can input various types of data into the server device 20 and command the processing operations of the server device 20.

The output portion 216 is configured from a cathode ray tube (CRT) display device, a liquid crystal display (LCD) device, an audio output device, and the like. The audio output device is a speaker or the like. The content that is played back on the server device 20 is displayed/output as audio through the output portion 216.

The memory 220 is configured from a static random access memory (SRAM), a dynamic random access memory (DRAM), a synchronous DRAM (SDRAM), a Rambus DRAM (RDRAM), or the like, for example. The memory 220 temporarily stores (buffers) various types of data. During communications between the server device 20 and the playback device 30, for example, the memory 220 functions as the communication buffer 222 to transmit and receive the data smoothly. Note that the memory portion 220 can also function as a receiving buffer (not shown in the figures) that temporarily stores the compressed content data that is distributed from the external content distribution server and transfers the compressed data to the decoder 236 in a stable manner.

The storage device 230 is a device for storing data and is configured from an HDD, for example. The storage device 230 drives a hard disk and stores various types of data, such as the programs that operate the control portion 212, and the compressed data for the ripped content, the distributed content, and the like. The storage device 230 functions as a content storage portion that stores a plurality of the content files and as a content information storage portion that stores attribute information for the content.

Note that in the storage device 230 according to the present embodiment, the hard disk serves as a storage medium, but the storage device 230 according to the present embodiment is not limited to this example. The storage medium may also be, for example, a non-volatile memory such as an electrically erasable programmable read-only memory (EEPROM), an erasable programmable read-only memory (EPROM), or the like, a magnetic disk such as a flexible disk or the like, an optical disk such as a compact disc recordable (CD-R), a compact disc rewritable (CD-RW), a digital versatile disc recordable (DVD-R), a digital versatile disc rewritable (DVD-RW), a dual-layer digital versatile disc recordable (DVD+R), a dual-layer digital versatile disc rewritable (DVD+RW), a digital versatile disc random access memory (DVD-RAM), a Blu-ray® disc recordable (BD-R), a dual-layer Blu-ray® disc recordable (BD-RE), or the like, or a magneto-optical (MO) disk or the like. The storage medium can also be a removable storage medium that can be loaded into and removed from the server device 20.

The disk drive 232 is an example of a recording and playback device for the removable storage medium. The disk drive 232 is built into or mounted externally on the server device 20. The disk drive 232 reads and writes various types of data, such as the content and the like, to and from the removable storage medium that is loaded into the disk drive 232. The removable storage medium is a magnetic disk, an optical disk, a magneto-optical disk, a semiconductor memory, or the like. Providing the disk drive 232 makes it possible, when a music CD, a video DVD, or the like is loaded into the server device 20, to rip the music content that is recorded on the music CD and the video content that is recorded on the video DVD.

The encoder 234, during the ripping and the self-recording, uses a specified compression encoding method (for example, MP3, ACC, ATRAC, ATRAC3, or the like) to compression encode the video/audio digital data to generate the compressed data for the music content, the video content, and the like. At this time, the encoder 234 compression encodes the content in specified encoding units, such as frame units, for example. Specifically, during the compression encoding, the control portion 212, based on a sample data string from the music content (track) that is to be compression encoded, sets the value of one frame to a specified number of samples n (for example, 1152 samples), then outputs each frame to the encoder 234. The compressed frames (for example, MP3 frames) that are produced by the encoder 234 are then recorded in the storage device 230 as the compressed data for the music content.

The decoder 236 decodes (expands) the compressed data for the music content or the like that is read out from the storage device 230 and converts it to the uncompressed data (for example, the linear PCM data). Under the control of the control portion 212, the uncompressed content data that is thus generated is then temporarily stored in the communication buffer 222 and transmitted to the playback device 30 through the LAN 10.

Playback Device Configuration

Next, the configuration of the playback device 30 (client) according to the present embodiment will be explained with reference to FIG. 3. FIG. 3 is a block diagram that shows the configuration of the playback device 30 according to the present embodiment.

As shown in FIG. 3, the playback device 30 is provided with a communication portion 310, a control portion 320, an input portion 330, the display portion 332, a buffer memory 340 that is one example of a storage medium that temporarily stores data, a flash memory 345 that is one example of a storage medium that permanently stores data, and a D/A converter 350 that is one example of a playback portion that plays back content. Note, in this embodiment, a speaker 352 that is an audio output device is mounted externally on the playback device 30. However, the playback device 30 is not limited by this example, and the audio output device, such as the speaker or the like, may also be built into the playback device 30.

The communication portion 310 is a communications interface that is configured from a communications device or the like that performs data communications with an external device through the network. The communication portion 310 transmits and receives various types of data to and from the server devices 20 and the other playback devices 30 through the LAN 10, based on control by the control portion 320. The communication portion 310 can be compatible with Ethernet® and Giga Ethernet®, for example. In an environment where direct communication is possible with the access point 14 for wireless communications, the communication portion 310 can also be compatible with wireless communications such as IEEE 802.11a/b/g, and the like. When transmitting and receiving various types of information, the communication portion 310 can control the volume of data communicated by storing the communicated data temporarily in the communication buffer 342.

The communication portion 310 receives from the server device 20 the content list that lists the content that the server device 20 can provide, as well as the content attribute information. The communication portion 310 transmits to the server device 20 a request to transmit the content that the user selects from the content in the content list, then receives the uncompressed content data that is streamed from the server device 20. The communication portion 310 can also transmit to and receive from the other playback devices 30 various types of information that pertain to controlling playback of the content (for example, synchronized playback control) among the plurality of the playback devices 30. This will be described in detail later.

The control portion 320 is configured from a central processing unit (CPU), a ROM, a RAM, and the like, for example. The control portion 320 operates according to various types of programs that are stored in the ROM and controls the overall operation of the playback device 30. For example, the control portion 320 controls the communication portion 310 transmit and receive various types of data to and from external devices such as the server device 20 and other playback devices 30 through the LAN 10. The control portion 320 also controls the communication portion 310, the D/A converter 350, and the speaker 352 to receive the content that is transmitted from the server device 20, store the content temporarily in the receiving buffer 344, read the content out of the receiving buffer 344, play back (D/A convert) the content, output the audio, and the like.

The control portion 320 operates according to a program that is installed in the playback device 30. As shown in FIG. 3, the control portion 320 functions, for example, as a mode setting portion 322, a synchronized playback control portion 324, a normal playback control portion 326, and a playback switching control portion 328.

The mode setting portion 322 sets the playback control mode of the content of the playback control portion of the playback device 30. The playback control mode may include, for instance, a normal mode and a synchronized playback mode (party mode). The mode setting portion 322 selectively sets the content playback control mode of the playback control portion to the normal mode or the synchronized playback mode.

The normal mode is a normal playback control mode in which the content playback control is performed independently by just the given playback device 30, without depending on other playback devices 30. When the playback device 30 is set to the normal mode, the normal playback control portion 326 of the playback device 30 controls playback of the content by the D/A converter 350 which is the playback portion of the playback device 30, based on playback control commands (such as a playback start command or a playback stop command) of the content given by a user.

The synchronized playback mode is a mode (party mode) in which the content is played back in synchronization by a plurality of the playback devices 30. The synchronized playback mode is a playback control mode in which a master-servant relationship is defined among the plurality of playback devices 30, and one master terminal (control subject) and one or more slave terminals (control objects) are set. Furthermore, in this mode, the master terminal controls content playback in the slave terminals. That is, in the synchronized playback mode, one playback device 30 (master terminal) that possesses playback control authority controls the content playback in one or more other playback devises 30 (slave terminals). Consequently, the same content can be played back in synchronization between the master terminals and the slave terminals.

Therefore, the given playback device 30 that is set to the synchronized playback mode is set to either one of a master mode, in which the given playback device 30 becomes a master terminal of the synchronized playback control, or a slave mode, in which the given playback device 30 becomes a slave terminal of the synchronized playback control. If the given playback device 30 is set to the master mode, the given playback device 30 controls the content playback of one or more other playback devices 30 which are the slave terminals. On the other hand, if the given playback device 30 is set to the slave mode, the given playback device 30 follows commands from the other playback device 30 that is the master terminal and that controls the content playback of the given playback device 30.

The mode setting portion 322 selectively sets the normal mode and the synchronized playback mode. In addition, when the synchronized playback mode is set, the master mode and slave mode are selectively set. The playback device 30 according to the embodiment is, for instance, set to the normal mode in a normal state. When a synchronized playback command based on a specific input operation by the user is received, the playback device 30 is set to the synchronized playback mode. In the case that the user instructs the synchronized playback mode to be used, the mode of the given playback device 30, that is, the master mode or the slave mode, may be determined based on a selection that is input (such as menu selection operation) by the user to the input portion 330. Alternatively, the mode can be automatically determined in accordance with mode setting conditions that are set in advance. In the present embodiment, for example, the playback device 30 which is currently playing back the content and which was the last to receive the synchronized playback command is automatically set to the master mode. However, the present invention is not restricted by this example.

Examples of the specific input operation that the user may perform to set the playback device 30 to the synchronized playback mode (master mode or slave mode) include:

(1) an input operation using a specific operation key to input the synchronized playback command (for example, pressing a synchronized playback button), and (2) a menu selecting operation that is performed to input the synchronized playback command.

Furthermore, examples of the specific input operation that the user may perform to cancel the synchronized playback mode (canceling the master mode or the slave mode) include:

(1) an input operation using a specific operation key to input a synchronized playback cancellation command (for example, re-pressing the synchronized playback button, or pressing a synchronized playback cancellation button which is different from the aforementioned synchronized playback button), (2) a menu selecting operation that is performed to input the synchronized playback cancellation command, and (3) an input operation using one or more specific operation keys among a plurality of operation keys related to the playback control (such as pressing a playback stop button). The mode setting portion 322 sets the synchronized playback mode to ON or OFF in response to the receiving of the synchronized playback command/synchronized playback cancellation command as a result of the user performing an operation like those described above.

Additionally, the mode setting portion 322 may set or cancel the slave mode in response to the receiving of a specific synchronized playback command among various synchronized playback commands. For example, when the slave mode is set, among the various types of operation keys for inputting various playback control commands (for instance, operation keys for playback, stop, pause, forward, rewind, skip, back, and the like), when a playback stop key for instructing playback to be stopped is operated and the playback stop command is received, the mode setting portion 322 cancels the slave mode and sets the normal mode. Furthermore, when the synchronized playback key for inputting the synchronized playback command is operated and the synchronized playback command (equivalent to a command for setting the playback device 30 to the master mode) is received, the mode setting portion 322 can cancel the normal mode and set the master mode.

In addition, the mode setting portion 322 sets the synchronized playback function of the playback device 30 to ON/OFF based on, for instance, a user input. The setting information that indicates whether the synchronized playback function is set to ON or OFF is then stored in a setting information storage portion 348. The setting information is equivalent to information that indicates whether or not the playback device 30 allows synchronized playback with other playback devices 30. Furthermore, when the playback device 30 receives the synchronized playback command based on the specific input operation mentioned above, or when the playback device 30 is requested by other playback devices 30 to become the slave terminal of the synchronized playback mode, the mode setting portion 322 reads out the setting information pre-stored in the setting information storage portion 348. Then, based on the setting information, the mode setting portion 322 determines whether to set the synchronized playback mode of the playback device 30 to the master mode or the slave mode (that is, determines whether or not to allow the synchronized playback with other playback devices 30).

Therefore, when the synchronized playback function is set to OFF by the setting information that is set in advance and the synchronized playback mode is prohibited, the mode setting portion 322 prohibits the setting of the synchronized playback mode. As a result, the synchronized playback of the given playback device 30 and other playback devises 30 is not performed. Consequently, the user is able to limit the playback devices 30 that are allowed to perform the synchronized playback, thereby preventing performance of the synchronized playback on the playback devices 30 that the user does not wish to perform the synchronized playback. Moreover, the mode setting portion 322 can automatically set the ON/OFF setting of the synchronized playback function based on a connection condition with other playback devices 30, attributes of the content to be played back, and the like. In addition, the determination of whether or not to allow the synchronized playback may be made by the synchronized playback control portion 324 that is described later.

Furthermore, the mode setting portion 322 can set, in addition to setting the above-described synchronized mode and normal mode, the playback mode of the content of the playback device 30. Many different types of the playback mode can be set, according to whether or not repeat playback is used, whether or not shuffle or random playback is used, the range of the content to be played back (for example, a content group in which a plurality of related content files are grouped by the album, the artist, the genre, or the like), and the like. Examples of the playback mode include a one-track repeat playback mode, an album repeat playback mode, an all-content continuous playback mode, a shuffle playback mode, a random playback mode, and the like.

The one-track repeat playback mode is a playback mode in which one music content file (track) is played back repeatedly.

The album repeat playback mode is a playback mode in which a plurality of the music content files that belong to the same album are played back repeatedly in a specified order (for example, in track number order).

The all-content continuous playback mode (continue mode) is a playback mode in which all of the content in all of the albums is played back continuously.

The shuffle playback mode is a playback mode in which a plurality of the content files within a specified range (for example, the same album, the same artist, the same genre, the same playlist, or the like) are played back in an arbitrary order without duplication.

The random playback mode is a playback mode in which a plurality of the content files within a specified range are selected randomly and played back in an arbitrary order.

When setting the playback modes like those described above, the mode setting portion 322 may set the mode based on a user input, or may automatically set the mode based on the mode setting information that is set in advance. The mode setting portion 322 writes and stores the playback mode setting information, indicating the set playback mode, in a storage medium in the playback device 30, for instance, the setting information storage portion 348 that is configured by a nonvolatile memory such as a flash memory. The synchronized playback control portion 324, the normal playback control portion 326, and the playback switching control portion 328 which will be explained later recognize a playback sequence of the music content in a certain playback range such as an album or a playlist based on the playback mode setting information that is stored in the setting information storage portion 348. Then, a request for music content delivery is made to the server device 20 in accordance with the playback sequence.

The synchronized playback control portion 324 controls the synchronized playback of the content between the given playback device 30 and other playback devices 30. In the content synchronized playback processing, information that pertains to the currently-played back content and the playback control command are exchanged among multiple playback devices 30 connected to the network such as the LAN 10, thereby playing back the same content by the multiple playback devices 30 at substantially the same timing. In the synchronized playback processing, when the synchronized playback command is received while content playback is in progress by one of the playback devices 30 (master terminal), the same content can be played back in synchronization by the other playback devices 30 (slave terminals). In the synchronized playback processing, when the user performs the synchronized playback command operation on the input portion 330 of the playback device 30, and this synchronized playback command is received by the playback device 30, the synchronized playback is performed. The synchronized playback control portion 324 controls the content playback on the playback device 30 that is set to the master mode or the slave mode of the synchronized playback mode.

The details of the processing of the synchronized playback control portion 324 depend on the setting of the synchronized playback mode (i.e. the master mode or the slave mode) of the given playback device 30 (that is, if the given playback device 30 is the master terminal or the slave terminal). Hereafter, a description will be given of (a) the processing of the synchronized playback control portion 324 when the master mode is set, and (b) the processing of the synchronized playback control portion 324 when the slave mode is set.

Note that the synchronized playback control portion 324 can, by controlling the communication portion 310, transmit and receive various types of information including control signals with other playback devices 30 and the server device 20 through the LAN 10. Also, the synchronized playback control portion 324 can receive the content from the server device 20 and play back and output the content by controlling the communication portion 310, the buffer memory 340, and the D/A converter 350, and the speaker 352.

(a) Processing in the Synchronized Playback Control Portion 324 when the Master Mode is Set When the playback device 30 is set to the master mode, the synchronized playback control portion 324 controls, in addition to the playback of content by the given playback device 30 (master terminal), the playback of content by other playback devices 30 (slave terminals) that are set to the slave mode. In this case, the synchronized playback control portion 324 of the master terminal executes time management necessary for the synchronized playback, and transmits each playback control command (such as a pause command and a playback start command) to the slave terminals. Consequently, the slave terminals play back and control the content in response to the playback control commands from the synchronized playback control portion 324 of the master terminal without performing the time management.

Specifically, upon receiving of the synchronized playback command, the playback device 30 is first set to the master mode by the mode setting portion 322 and thus becomes the master terminal. Then, the synchronized playback control portion 324 of the master terminal determines which other playback device 30 (slave terminal) will be the partner device for the synchronized playback, based on, for example, a selection input by the user, information that indicates which other playback device 30 is the partner device for the synchronized playback which is included in the pre-registered setting information, or slave search results. For instance, when performing a slave search, the synchronized playback control portion 324 transmits search information to search for a playback device that is going to join the synchronized playback (equivalent to 'the information that indicates that the playback device 30 is set to the master mode") to other playback devices 30 which are active and connected to the LAN 10. In response to the search information, the synchronized playback control portion 324 receives a joining response that indicates that the other playback devices 30 are going to join in the synchronized playback (equivalent to "the information that indicates that other playback devices 30 are set to the slave mode) from the playback devices 30 (slave terminals) that are allowed to join the synchronized playback. Then, one or more playback devices 30 which transmitted the joining response are determined as the slave terminals.

Once the slave terminals are determined, the synchronized playback control portion 324 registers the slave terminals in a slave registration list 349. In this processing, the information that pertains to the playback devices 30 which are the slave terminals (such as identification information and network address information of the playback devices 30) are registered in the slave registration list 349 as registered information.

Each one of the synchronized playback control portion 324, the normal playback control portion 326, and the playback switching control portion 328 is an example of the playback control portion that controls playback of content by the playback portion of the playback device 30. The synchronized playback control portion 324 controls synchronized playback by a plurality of the playback devices 30 that are set to the master mode or the slave mode of the synchronized playback mode. The normal playback control portion 326 controls playback of content on an individual one of the playback devices 30 that is set to the normal mode. The playback switching control portion 328 controls switching of the content playback operation between the plurality of the playback devices 30 that are set to the master mode or the slave mode of the playback switching mode.

The synchronized playback control portion 324 transmits, through the communication portion 310, information that pertains to the content that is currently being played back on the given playback device 30 (master terminal) (hereafter called the 'content information') to the other playback devices 30 that are registered as the slave terminals. The content information includes the URL of the content and the like. Consequently, the slave terminals can receive the content from the server device 20 based on the URL of the content received from the master terminal.

Furthermore, the synchronized playback control portion 324 obtains the elapsed playback time (for instance, 3 minutes and 30 seconds) of the content that is currently being played back on the master device. Then, the synchronized playback control portion 324 calculates the synchronized playback start time (for instance, 3 minutes and 40 seconds) by adding a preset additional time (for instance, 10 seconds) to the elapsed playback time. Finally, the synchronized playback control portion 324 transmits information that indicates the synchronized playback start time to the slave terminals. The synchronized playback start time is equivalent to the elapsed playback time for the content in the master terminal when the slave terminal starts synchronized playback of the content with the master terminal. The elapsed playback time is the time period that the content has been played back on the master terminal from the beginning of the content. At a certain time point after receiving of the synchronized playback command (for instance, the time point when the synchronized playback command is received or the time point immediately after the content information is transmitted to the slave terminals), the synchronized playback control portion 324 obtains the elapsed playback time information of the content being played back on the master terminal, and calculates the synchronized playback start time by adding the additional time to the elapsed playback time.

The additional time is set to a time (for instance, 10 seconds) that is equal to or more than the time required for the slave terminals to complete playback preparation. More specifically, the additional time can be set by further adding a certain extra time to the time required for completion of the playback preparation. In this case, the time required for completion of the playback preparation is the time required for the slave terminals to receive the elapsed playback time for the content from the server device 20 (for instance, data that is more than 3 minutes 40 seconds from the beginning of the track) through data communication with the server device 20, and store just an adequate volume of the received data in a receiving buffer 344. The additional time is set to a length of time that is not unnecessarily long and that allows the synchronized playback to be performed suitably in accordance with the speed of data communication between the playback device 30 and the server device 20, the processing speed and the like of the playback device 30 and the server device 20, and the like.

As described above, the synchronized playback control portion 324 sets the synchronized playback start time obtained by adding the additional time to the current elapsed playback time, and notifies the slave terminals of the synchronized playback start time. Accordingly, the slave terminals receive data beginning from the synchronized playback start time for the content from the server device 20 before the elapsed playback time of the master terminal reaches the synchronized playback start time. Then, the slave terminals buffer a specified volume of data in the receiving buffer 344 to complete the playback preparation. Accordingly, the slave terminals are able to start playback of the content as soon as the playback start command is received from the master terminal when the synchronized playback start time is reached.

Furthermore, the synchronized playback control portion 324 transmits a pause command to the slave terminals before or after transmission of the elapsed playback time. The pause command is a command to place the slave terminals in a paused state (a state in which the slave terminals can start playback of the content as soon as the playback start command is received from the master terminal) after the playback preparation is completed.

Moreover, the synchronized playback control portion 324 can confirm if each of the slave terminals has been placed in the paused state. For example, the synchronized playback control portion 324 transmits to each of the slave terminals a confirmation signal to confirm if the slave terminal is in the paused state. In response to the confirmation signal, the synchronized playback control portion 324 receives from the slave terminals a playback preparation completion notification which indicates that the content playback preparation is complete. Consequently, the paused state can be confirmed.

In addition, the synchronized playback control portion 324 uses a timer included in the playback device 30 to measure the current elapsed playback time for the content that is being played back on the master terminal. Therefore, the synchronized playback control portion 324 can determine if the elapsed playback time has reached the synchronized playback start time. Accordingly, the synchronized playback control portion 324 confirms if the playback preparation completion notification is received from all slave terminals. If the notification is received, the playback start command for the content is transmitted to all slave terminals when the current elapsed playback time for the content at the master terminal has reached the synchronized playback start time (for instance, 3 minutes and 40 seconds). In consequence, the content playback is started almost at the same time by each of the slave terminals, thereby achieving the synchronized playback by the master terminal and the slave terminals. Note that the timing of the transmission of the playback start command to the slave terminals from the master terminal may be immediately before the elapsed playback time reaches the synchronized playback start time (for instance, a point of time that is earlier by just enough time to take in to consideration the transmission processing delay of the playback start command in the master terminal).

Furthermore, the synchronized playback control portion 324 of the master terminal can accept the joining of a new one of the other playback devices 30 in the synchronized playback while the synchronized playback is in progress. More specifically, when a new request to join the synchronized playback is received from another playback device 30 during performance of the synchronized playback mode with the slave terminals, the synchronized playback control portion 324 adds the playback device 30 to the slave registration list 349 as a slave terminal. In addition, in the same manner as described above, the synchronized playback control portion 324 transmits, to the additionally registered slave terminal, content information that pertains to the content being played back on the master terminal, a synchronized playback start time, a pause command, a playback start command, and the like, and adds the slave terminal to the synchronized playback.

Moreover, when a plurality of content files are played back continuously, the synchronized playback control portion 324 of the master terminal can align, between the master terminal and the slave terminals, a playback start timing of the next content to be played back after the current content playback is completed. More specifically, when detecting the completion of the content playback (or that the playback is immediately before completion) while the master terminal and the slave terminals are playing back the same content in synchronization, the synchronized playback control portion 324 transmits to the slave terminals the information (such as the URL) related to the next content (for example, the next track in a music album) to be played back after the current content. Then, the master terminal starts receiving the next content from the beginning thereof from the server device 20, and temporarily stores (buffers) the content in the receiving buffer 344 to perform the playback preparation of the next content. Further, when the playback preparation of the next content is completed in the master terminal and a playback preparation completion notification for the next content is received from the slave terminals, the synchronized playback control portion 324 transmits a playback start command for the next content to the slave terminals to start the playback of the next content by the slave terminals. Also, the synchronized playback control portion 324 controls the D/A converter 350 to start the playback of the next content that is temporarily stored in the receiving buffer 344 of the master terminal. Consequently, the timing at which the playback of the next content is started can be synchronized between the master terminal and the slave terminals.

Moreover, the synchronized playback control portion 324 can adjust an elapsed playback time lag between the master terminal and the slave terminals during synchronized playback. More specifically, the synchronized playback control portion 324 transmits to the slave terminals a transmission request for the elapsed playback time for the content at the slave terminals while the master terminal and the slave terminals are playing back the same content in synchronization. In response to the transmission request, the synchronized playback control portion 324 receives, from the slave terminals, information that indicates the elapsed playback time of the slave terminals. Then, the synchronized playback control portion 324 obtains the elapsed playback time of the master terminal, and compares the elapsed playback time at the master terminal and the received elapsed playback time of the slave terminals. As a result of the comparison, if the time lag between the master terminal and the slave terminals is a specified time or longer, the synchronized playback control portion 324 determines that a significant lag exists in the elapsed playback time between the master terminal and the slave terminals, and transmits a content playback stop command to the slave terminals. Then, the synchronized playback control portion 324 newly obtains the elapsed playback time for the content in the master terminal, and transmits to the slave terminals the information that indicates the synchronized playback start time obtained by adding the predetermined additional time to the newly obtained elapsed playback time. Thereafter, in the same manner as above, a pause command, a playback start command and the like are transmitted to correct the elapsed playback time lag at the slave terminals.

Furthermore, the synchronized playback control portion 324 of the master terminal controls the playback of the content that is being played back on the master terminal in synchronization, in response to a content playback control command (such as playback start, playback stop, pause, rewind, forward, and the like (hereafter called the 'playback control command') based on the input operation by the user. In addition to this, the synchronized playback control portion 324 transmits the information that indicates the playback control command to the slave terminals to also control the playback of the content that is being played back on the slave terminals in synchronization. For example, when a playback stop button of the master terminal is pressed, the synchronized playback control portion 324 stops the playback of the content that is being played back on the master terminal in synchronization, and transmits a playback stop command to the slave terminals to stop the playback of the content that is being played back on the slave terminals in synchronization. Consequently, the user can comprehensively control the playback by the master terminal and the other slave terminals during synchronized playback by simply inputting the playback control command to the master terminal.

(b) Processing in the Synchronized Playback Control Portion 324 when the Slave Mode is Set When the playback device 30 is set to the slave mode, the synchronized playback control portion 324 controls the content playback by the given playback device 30 (slave terminal) in response to the playback control command by another playback device 30 (master terminal) that is set to the master mode. In this case, the synchronized playback control portion 324 does not perform the time management for the synchronized playback with the master terminal, and simply performs the playback control of the slave terminal in response to each playback control command (a pause command and a playback start command) received from the master terminal. In this manner, the master terminal controls the synchronized playback between the master terminal and the slave terminal.

Specifically, the synchronized playback control portion 324 receives, for example, the search information that is searching for playback devices which are going to join the synchronized playback, from another playback device 30 (master terminal) through the communication portion 310. Then, the mode setting portion 322 determines whether or not to allow the synchronized playback with the other playback devices 30 based on the setting information (information that indicates whether or not to allow the synchronized playback) pre-stored in the setting information storage portion 348. If the synchronized playback is allowed, the given playback device 30 is set to the slave mode. In this case, in response to the aforementioned search information, the synchronized playback control portion 324 transmits a joining response in reply that indicates that the given playback device 30 is going to join in the synchronized playback to the master terminal, which is the transmission source of the search information. Also, the synchronized playback control portion 324 stops playback of content if content is being played back on the playback device 30.

In response to the transmission of the joining response, the synchronized playback control portion 324 receives from the master terminal the information (such as the URL) of the content that is currently being played back on the master terminal, the information that indicates the synchronized playback start time for the content, and the pause command. Then, based on the content information received from the master terminal, the synchronized playback control portion 324 starts sequentially receiving data that begins from the synchronized playback start time of the content from the server device 20, and temporarily stores (buffers) the data in the receiving buffer 344. Thereafter, once the content data buffered in the receiving buffer 344 reaches or exceeds a specified volume, the synchronized playback control portion 324 transmits to the master terminal a playback preparation completion notification that indicates that the content playback preparation is completed. In this case, the specified data volume refers to an adequate volume of data to ensure operation without interrupting output when the data read from the receiving buffer 344 is output after being D/A converted by the D/A converter 350.

Furthermore, after transmission of the playback preparation completion notification, the synchronized playback control portion 324 performs control such that the slave terminal is placed in the paused state waiting for the content playback. In the paused state, even if all the data of the content has not been received, processing of receiving the content from the server device 20 and processing for buffering the content in the receiving buffer 344 are interrupted.

Subsequently, the synchronized playback control portion 324 receives the content playback start command from the master terminal, and then starts playing back the data that begins from the synchronized playback start time for the content that is buffered in the receiving buffer 344. That is, the synchronized playback control portion 324 reads out the data that begins from the synchronized playback start time for the content that is buffered in the receiving buffer 344 and sends the data to the D/A converter 350. Then, the synchronized playback control portion 324 D/A converts the data by the D/A converter 350 and outputs the data as audio from the speaker 352.

Moreover, the synchronized playback control portion 324 can join the synchronized playback while the synchronized playback is in progress when a plurality of the playback devices 30 other than the given playback device 30 are performing the synchronized playback. More specifically, when the synchronized playback command is received as a result of the synchronized playback button being pressed or the like while the content playback is stopped, the synchronized playback control portion 324 transmits a joining request which requests that the given playback device 30 joins in the synchronized playback, to the master terminal of the playback devices 30 that are currently performing the synchronized playback. Also, the synchronized playback control portion 324 sets the given playback device 30 to the slave mode so as to make the given playback device 30 one of the slave terminals. Then, in response to the joining request, the synchronized playback control portion 324 receives, from the master terminal in the same manner described above, the content information that pertains to the content that is being played back on the master terminal, the synchronized playback start time, the pause command, the playback start timing, and the like, thereby allowing the given playback device 30 to join in the synchronized playback while the synchronized playback is in progress.

In addition, when a plurality of content files are played back continuously, the synchronized playback control portion 324 of the slave terminal can align the playback start timing of the next content to be played back after completion of playback of a certain content, with the playback start timing of the master terminal in response to the command of the master terminal. More specifically, when the master terminal and the slave terminals are playing back the same content in synchronization, the synchronized playback control portion 324 receives the content information (such as the URL) of the next content from the master terminal after completion of the content playback. Then, the synchronized playback control portion 324 starts receiving the next content from the beginning thereof from the server device 20 based on the content information, and temporarily stores the content in the receiving buffer 344 to perform the playback preparation of the next content. In addition, the synchronized playback control portion 324 transmits the playback preparation completion notification to the master terminal upon completion of the playback preparation. In response to this, when the playback start command is received from the master terminal, the synchronized playback control portion 324 starts playback of the next content that is temporarily stored in the receiving buffer 344.

Further, the synchronized playback control portion 324 of the slave terminal can adjust an elapsed playback time lag between the master terminal and the slave terminals based on the command from the master terminal. More specifically, when the master terminal and the slave terminals are playing back the same content in synchronization, and the synchronized playback control portion 324 receives from the master terminal a transmission request for the elapsed playback time for the content at the slave terminals, the synchronized playback control portion 324 transmits to the master terminal the information that indicates the current elapsed playback time in its slave terminal. As a result, if the master terminal determines that a significant lag exists in the elapsed playback time between the master terminal and the slave terminals, the synchronized playback control portion 324 of each of the slave terminals receives, from the master terminal, the content playback stop command, the information that indicates the synchronized playback start time obtained by adding the predetermined additional time to the elapsed playback time which is newly obtained by the master terminal, and the pause command. Thereafter, in the same manner as above, the synchronized playback control portion 324 starts receiving data that begins from the synchronized playback start time from the server 20 and then enters a paused state. Then, the synchronized playback control portion 324 starts playback of the data upon receiving the playback start command from the master terminal. As a result of this processing, the elapsed playback time lag of the slave terminals can be corrected.

Furthermore, for instance, once a specific playback control command for the various types of playback control commands is received, the synchronized playback control portion 324 of each of the slave terminals cancels the slave mode and performs the playback control in correspondence with the specific playback control command. On the other hand, when a playback control command other than specific playback control command is received, the synchronized playback control portion 324 invalidates the playback control command. For instance, when the synchronized playback control portion 324 in the slave mode receives the playback stop command which is an example of the specific playback control command, the slave mode is cancelled and the setting is changed to the normal mode. In addition, the content that is being played back is stopped. On the other hand, when the synchronized playback control portion 324 receives a playback control command (such as playback start, pause, rewind, forward, skip, and back) other than specific playback control command, the slave mode is maintained, and the playback control command is invalidated. Therefore, the playback control is not performed in correspondence with the playback control command.

Next, a description will be given of the normal playback control portion 326. When the playback device 30 is set to the normal mode, the normal playback control portion 326 performs a normal playback control processing which does not depend on other playback devices 30. The normal playback control portion 326 controls processing for receiving the content from the server device 20 through the LAN 10 by using the communication portion 310, and processing for playing back the content received from the server device 20 by using the playback portion (such as the D/A converter 350). More specifically, the normal playback control portion 326 specifies the content that is to be delivered to the server device 20 in accordance with the setting information that is set in advance or specified by the user, and requests starting or termination of transmission of the content. In addition, the normal playback control portion 326 receives, through the communication portion 310, the content transmitted from the server device 20. Moreover, the normal playback control portion 326 temporarily stores the content received from the server device 20 in the receiving buffer 344, and reads out the content stored in the receiving buffer 344 to transfer the content to the D/A converter 350 in which the content is converted from digital data to analog data. Then, the normal playback control portion 326 outputs the converted analog data as audio from the speaker 352.

In this case, when a playback control command (such as playback start, playback stop, pause, rewind, and forward) input by the user is received, the normal playback control portion 326 controls the content playback in response to the playback control command. For instance, when the playback stop button of the playback device 30 is pressed by the user and a playback stop command is received, the normal playback control portion 326 controls the D/A converter 350 and the like to stop the playback of the content that is currently in progress.

Next, a description will be given of the playback switching control portion 328. The playback switching control portion 328 controls a content playback switching processing among a plurality of the playback devices 30. In the content playback switching processing, information that pertains to a content playback operation which is currently in progress (that is, playback information) is exchanged among the plurality of the playback devices 30 that are connected to the network such as the LAN 10. Consequently, in this processing, the subject device that performs the content playback operation is switched among the playback devices 30. When a switching command is received through the playback switching processing while the content is being played back on a certain playback device 30 (a switching source playback device 30), the content that is currently being played back can be played back seamlessly by another playback device 30 (switching destination playback device 30) while taking over the playback mode, the elapsed playback time, and the like from the switching source playback device 30.

The playback switching processing is performed when the user performs a switching command operation on the input portion 330 of the playback device 30 and the playback device 30 receives the switching command. The user input operation for the switching command may be performed on the playback switching source playback device 30 (that is, the playback device 30 that is currently playing back the content) and may also be performed on the playback switching destination playback device 30 (that is, the playback device 30 that will continue the playback processing of the content that is currently being played back on another of the playback devices 30). In the former case, the content playback processing is switched to the playback switching destination playback device 30 from the playback switching source playback device 30 on which the switching command was input. (This is called a PUT of the content.) On the other hand, in the latter case, the content playback processing is switched from the playback switching source playback device 30 to the playback switching destination playback device 30 on which the switching command was input. (This is called a GET of the content.)

The playback device 30 (master terminal) set to the master mode controls the playback switching processing to control the content playback on the playback devices 30 that are set to the slave mode. On the other hand, the playback devices 30 (slave terminals) set to the slave mode control the content playback in response to the control command from the master terminal.

To perform the playback switching processing, when the playback switching control portion 328 of the playback device 30 set to the master mode receives the switching command, it reads out the setting information (ON/OFF setting of the playback switching function) set by the mode setting portion 322 from the setting information storage portion 348. Then, the playback switching control portion 328 determines whether or not to perform the playback switching processing based on the setting information. As a result, if the playback switching processing is performed, the playback switching control portion 328 determines switching destination/source playback device 30 (slave terminal) based on the information that indicates the switching destination/source playback device 30 included in the switching setting information that is set in advance or selectively input by the user. For example, when the switching command is received, the playback switching control portion 328 searches for and finds other currently-active playback devices 30 connected to the LAN 10. Then, based on the selective input or the like by the user, the switching destination or switching source playback device 30 is determined from the found playback devices 30.

There are two types of the switching command, a MOVE switching command (MOVE command) and a COPY switching command (COPY command). The MOVE switching command is a command that switches the content playback from the playback switching source playback device 30 to the playback switching destination playback device 30 and stops the content playback on the playback switching source playback device 30. The COPY switching command is a command that both plays back the content on the playback switching destination playback device 30 and continues the content playback on the playback switching source playback device 30.

Furthermore, the playback switching control portion 328 of the master terminal transmits and receives, with respect to the determined switching destination or switching source playback device 30 (slave terminal), various information including playback information that pertains to the playback operation of the content that is being played back, a transmission request for the playback information, a playback start command, a playback stop command, a playback start notification, and a playback stop notification. For instance, when the switching command is received by the switching source playback device 30, the playback switching control portion 328 creates playback information that pertains to the content being played back on the playback device 30, and transmits it to the switching destination playback device 30. When the switching command is received by the switching destination playback device 30, the playback switching control portion 328 creates a transmission request for the playback information that pertains to the content that is being played back on the switching source playback device 30, and transmits it to the switching source playback device 30. Correspondingly, the playback switching control portion 328 receives, from the switching source playback device 30, the playback information that pertains to the content that is being played back on the switching source playback device 30.

Next, the playback information will be explained. The playback information according to the present embodiment includes (1) the content attribute information, (2) playback mode information, (3) the elapsed playback time, and (4) server information.

(1) Content Attribute Information

The content attribute information is, for example, address information that indicates the location of the content (for example, the content URL in the home network), a content title, a content ID, and the like. Each of the playback devices 30 can identify the content by the content attribute information. The content attribute information is acquired when the content is received from the server device 20 and is stored in a content information storage portion 346. When the switching command is received, or when a playback information transmission request is received, the playback switching control portion 328 reads out from the content information storage portion 346 the attribute information for the content that is currently being played back on the playback switching source playback device 30 and appends it to the playback information.

(2) Playback Mode Information

The playback mode information is information that indicates the content playback mode on the playback switching source playback device 30. Each of the various types of playback modes described above can be set on the playback device 30. The playback mode includes the form of the playback for the content, such as whether or not it is repeated and the like. When the switching command is received, or when a playback information transmission request is received, the playback switching control portion 328 appends to the playback information, as the playback mode information, information (for example, an identification code that corresponds to the playback mode) that can specify the playback mode that is set on the playback switching source playback device 30.

The playback mode information includes, in addition to the information that indicates the form of the playback for the content, playback range information that indicates a range of the content that is the object of the playback. The playback range information is a range that indicates the content group that is the object of the playback. This group includes the content that is currently being played back on the playback device 30. For example, the playback range is set by the album, by the artist, by the genre, by the playlist, or the like. For example, in a case where the playback device 30 is playing back continuously a plurality of the content files within a certain album, the playback range information is information that indicates the album. In a case where the playback device 30 is playing back continuously all of the content that belongs to a certain genre (for example, rock, pop, reggae, or the like), the playback range information is information that indicates the genre. In a case where the playback device 30 is playing back continuously the content that belongs to a certain artist, the playback range information is information that indicates the artist. When the switching command is received, or when a playback information transmission request is received, the playback switching control portion 328 appends to the playback information, as the playback mode information, information that indicates the playback range that is set on the playback switching source playback device 30.

(3) Elapsed Playback Time

The elapsed playback time is the amount of time that has elapsed since the start of the playback of the content that is currently being played back. When the switching command is received, or when a playback information transmission request is received, the playback switching control portion 328 appends to the playback information, as the playback mode information, elapsed playback time information for the content that is currently being played back.

(4) Server Information

The server information is information that pertains to the server device 20 that is the transmission source for the content that is currently being played back, such as identification information for the server device 20, for example. The identification information for the server device 20 may be, for example, a Universally Unique Identifier (UUID), a Media Access Control (MAC) address, or the like that is uniquely assigned to each device. When the switching command is received, or when a playback information transmission request is received, the playback switching control portion 328 appends to the playback information the server information for the server device 20 that is the transmission source for the content that is currently being played back.

In addition, the playback switching control portion 328 of the switching destination playback device 30 controls the content playback on the playback device 30 based on various information transmitted to and received from other playback devices 30. More specifically, the playback switching control portion 328 identifies the server device 20 that transmitted the content that is being played back on the switching source playback device 30 based on the server information included in the playback information. Also, based on the content attribute information and the elapsed playback time included in the playback information, the playback switching control portion 328 identifies the content to be played back and a playback start position of the content. Furthermore, the playback switching control portion 328 transmits, to the identified server device 20 that transmitted the content, a transmission request for the identified content from the playback start position. Then, the playback switching control portion 328 receives data that begins from the elapsed playback time for the content from the server device 20 through the communication portion 310, and temporarily stores the content data in the receiving buffer 344. Subsequently, the playback switching control portion 328 controls the D/A converter 350 which is the playback portion to sequentially play back the content data read from the receiving buffer 344. For example, while playback of the content having a playback time duration of 5 minutes and 30 seconds is in progress, when the playback operation is switched between the playback devices 30 when the elapsed playback time has reached 3 minutes, the data of the content after 3 minutes is played back on the switching destination playback device 30.

In this case, the playback switching control portion 328 sets the same playback mode (repeat or no repeat, the unit of repetition, shuffle or no shuffle, the playback range for continuous playback, and the like) as that before the playback switching based on the playback mode information included in the playback information. Then, the playback switching control portion 328 plays back the content in accordance with the set playback mode. That is, in addition to the content that is switched during playback, the playback switching control portion 328 sequentially receives and plays back, in accordance with the set playback mode, a plurality of other content files that follow the aforementioned content within the playback range.

The input portion 330 is configured from an operation portion, an input control circuit, and the like. The operation portion is made up of an operation key, such as a touch panel, a button, a switch, a lever, a dial, or the like, or of a remote controller and an optical receiver portion for the remote controller, for example. In response to a user input operation on the operation portion, the input control circuit generates an input signal and outputs it to the control portion 320. By operating the input portion 330, the user of the playback device 30 can input various types of data into the playback device 30 and command the processing operations of the playback device 30. Examples of the commands that can be achieved by the user input operations include a selection command for selecting the server device 20 where the content is to be obtained from, a selection command for selecting from the content list the content to be played back, a playback control command controlling playback such as playing, pausing, fast forwarding, rewinding, adjusting the volume, and the like, a selection command for the playback mode, a synchronized playback command for selecting the playback control mode, a synchronized playback cancellation command, and a setting command for setting the playback switching function to ON and OFF, and the like.

The display portion 332 includes, for instance, a display device such as a liquid crystal display (LCD). The display portion 332 displays a content list and the content attribute information received from the server device 20, a playback status such as an elapsed playback time, and the like. The user can select the content data that he/she wants based on the displayed content list. Furthermore, the display portion 332 displays identification information of the partner playback devices 30 of synchronized playback, in relation to the synchronized playback function for synchronized playback among the playback devices 30. Moreover, the display portion 332 displays, in relation to the playback switching function for playback switching among the playback devices 30, the identification information of the playback devices 30 (a currently-active playback devices 30 that are connected to the LAN 10) which can be the switching destination/source playback device. As the identification information of the playback device 30, a UUID, a MAC address, a friendly name or a device name assigned to each playback device 30 by user input and the like can be used.

The buffer memory 340 is a storage portion including SDRAM, SRAM, DRAM, RDRAM, or the like. The buffer memory 340 temporarily stores (buffers) various data, and functions as the communication buffer 342 and the receiving buffer 344.

The communication buffer 342 is a buffer memory that temporarily stores communication data for smooth data transmission and receiving of the data during, for instance, communication between the playback device 30 and the server device 20.

The receiving buffer 344 is an example of a storage media that temporarily stores the content received from the server device 20 through the communication portion 310, and includes a ring buffer or the like. Uncompressed data of the content temporarily stored in the receiving buffer 344 is read by the synchronized playback control portion 324, the normal playback control portion 326, and the playback switching control portion 328 of the control portion 320 (each portion corresponds to the "playback control portion"), and is transferred to the D/A converter 350.

Note that in the present embodiment, the communication buffer 342 and the receiving buffer 344 are physically provided in the same buffer memory 340. Nevertheless, the present embodiment is not limited by this example, and the communication buffer 342 and the receiving buffer 344 can be provided in physically different memories. Furthermore, each of these buffers may also be physically separated as memories, and they may also be logically separated.

The flash memory 345 is an example of the storage portion including a nonvolatile memory. The data stored in the flash memory 345 is not lost even if the power of the playback device 30 is turned off. The flash memory 345 functions as, for instance, a content information storage portion 346 and a setting information storage portion 348. Moreover, the flash memory 345 stores identification information (such as a UUID, a MAC address, and a friendly name) of the playback device 30.

The content information storage portion 346 stores the content attribute information received from the server device 20. Furthermore, the setting information storage portion 348 stores various types of setting information including playback control mode setting information, playback mode setting information, setting information that indicates the ON/OFF state of the synchronized playback function, and setting information that indicates the ON/OFF state of the playback switching function.

Note that the storage medium provided in the playback device 30 is not restricted to the examples of the buffer memory 340 and the flash memory 345. The storage medium can also be any storage medium such as a magnetic disk including a flexible disk and a hard disk, an optical disk including HDD, CD, and DVD, as well as any types of a semiconductor memory.

The D/A converter 350 is an example of the D/A converting portion that converts the uncompressed content data read from the receiving buffer 344 into analog data. The D/A converter 350 converts the uncompressed data transferred from the receiving buffer 344 from a digital format to an analog format, and outputs an analog playback signal to the speaker 352. For example, the D/A converter 350 can convert the linear PCM uncompressed data into an analog playback signal by current summing. Then, the playback signal that is created through conversion into the analog format is output as audio from the speaker 352 which is an example of the audio output portion. Note that the D/A converter can be structured by hardware such as the D/A converter 350, but can also be structured by software. Furthermore, the audio output portion is not restricted to the example of the speaker 352, and can also use any type of audio output device, such as a headset and earphones, depending on the type of the playback device 30.

Next, referring to FIGS. 4 and 5, a detailed explanation will be given of an input operation of the synchronized playback command and the playback control command using the input portion 330 of the playback device 30. FIG. 4 is an explanatory figure of a specific example of an operation button provided on the playback device 30 according to the present embodiment. FIG. 5 is an explanatory figure of a specific example of an operation button provided on a remote controller 334 provided together with the playback device 30 according to the present embodiment.

In the example shown in FIG. 4, a main body of the playback device 30 is provided with a synchronized playback button 31 (party mode button) for inputting a synchronized playback command, playback control buttons 32 to 38 for inputting a content playback control command, and a power button 40 for turning on and off the power of the playback device 30. Provided as the playback control buttons are, for instance, a playback button 32 for playing back the content, a playback stop button 33 for stopping the content playback, a pause button 34 for pausing the content playback, a rewind button 35 for rewinding the content playback, a forward button 36 for forwarding the content playback, a skip button 36 for jumping (skipping) to the next content, and a back button 37 for jumping (returning) to the previous content.

When setting the playback device 30 to the synchronized playback mode, a user presses down the synchronized playback button 31 to input a synchronized playback command to the playback device 30. In this case, if the synchronized playback button 31 of the playback device 30 which is currently playing back the content is pressed, the playback device 30 is set to the master mode. On the other hand, if the synchronized playback button 31 of the playback device 30 which is currently stopping the playback of the content is pressed, the playback device 30 is set to the slave mode.

In the playback device 30 (master terminal) set to the master mode, all of the playback control buttons 32 to 38 are enabled. Therefore, the user can input the playback control command to the master terminal by pressing respective playback control buttons 32 to 38, and control (such as starting, stopping, forwarding, and rewinding) the playback of the content that is currently being played back in synchronization. Furthermore, the master terminal may transmit the playback control command which is identical to the playback control command that is input by the user to a partner slave terminal of the synchronized playback, so that the slave terminal can also perform the similar playback control on the content that is currently being played back in synchronization. Moreover, by pressing again the synchronized playback button 31 of the playback device 30 that is set to the master mode, the master mode of the playback device 30 is cancelled.

In the playback device 30 (slave terminal) set to the slave mode, for example, one or more specific playback control buttons of the multiple playback control buttons 32 to 38 and the power button 40 only may be enabled, while the rest of the playback control buttons and the synchronized playback button 31 may be disabled. For instance, only the playback stop button 33 can be enabled while the rest of the playback control buttons 34 to 38 can be disabled. In this case, the slave terminal is only allowed to stop the playback of the content which is currently being played back in synchronization. In this manner, by restricting effective playback control buttons of the slave terminal to specific buttons, the dependency of the slave terminal to the master terminal can be enhanced.

Moreover, when the specific enabled playback control button (such as the playback stop button 33) is pressed, a specific playback control command (such as a playback stop command) corresponding to the specific playback stop button is created, and the content playback control (such as playback stop) corresponding to the playback control command is performed. In addition, the slave mode of the playback device 30 can be cancelled to switch to the normal mode or the master mode. Accordingly, by simply pressing (one touch operation) the playback stop button 33, the user can cancel the slave mode of the playback device 30 and stop the content playback on the playback device 30. Note that the slave mode may be cancelled by pressing the synchronized playback button 31 of the playback device 30 that is set to the slave mode.

Next, specific examples of operations that use a remote controller 334 to input the playback operation switching commands will be explained with reference to FIG. 5. FIG. 5 is an explanatory figure that shows the remote controller 334 for operating the playback device 30 according to the embodiment and specific examples of operation buttons that are provided on the remote controller 334.

Figure 5A:
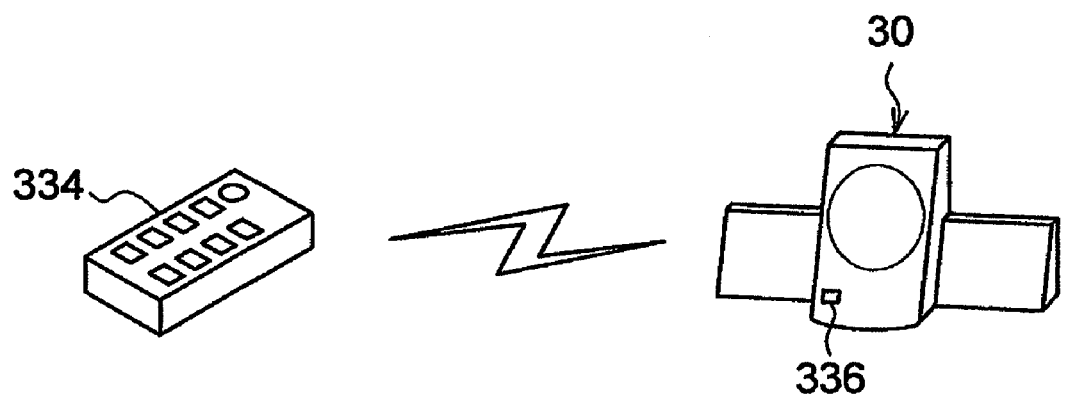
FIG. 5 is an explanatory figure that shows specific examples of operation buttons provided on a remote controller that is to the playback device according to the embodiment.

Referring to FIG. 5A, the synchronized playback command, the playback control command, and the like can be input to the playback device 30 by using the remote controller 334 that is provided separately from the playback device 30. In this case, in accordance with the input operation (pressing of the operation button) by the user, the remote controller 334 transmits, for instance, an infrared signal indicating the synchronized playback command, the playback control command, or the like to the main body of the playback device 30. Then, the infrared signal is received by a remote controller light receiver 336 provided on the main body of the playback device 30, whereby each command is input to the playback device 30.

Figure 5B:
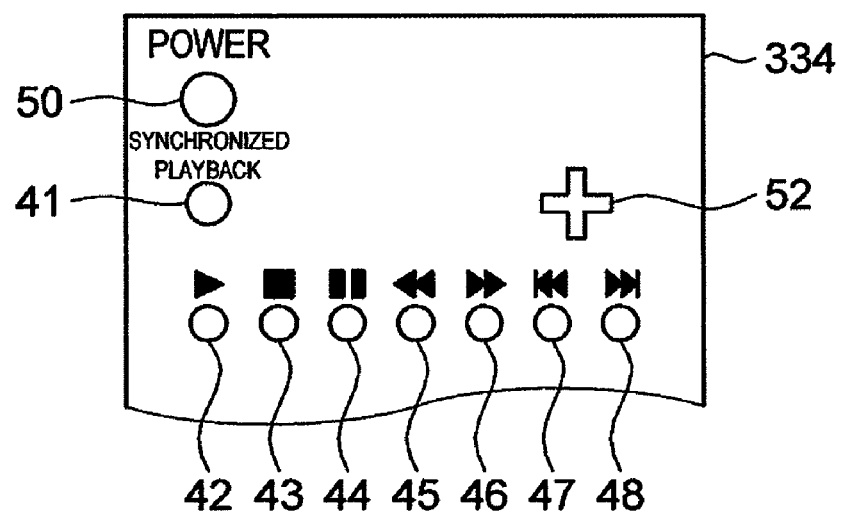

Now, referring to FIG. 5B, the remote controller 334 is provided with, in similar way as in the example of FIG. 4, a synchronized playback button 41 (party mode button), playback control buttons 42 to 48, a power button 50, and a selector button 52 for inputting a content selection command and a menu selection command. The playback control buttons that are provided are, for instance, a playback button 42, a playback stop button 43, a pause button 44, a rewind button 45, a forward button 46, a skip button 47, and a back button 48.

In a similar manner to described above, when the remote controller 334 is used as well, the synchronized playback button 31 can be pressed to input the synchronized playback command to the playback device 30 thereby setting the playback device 30 to the synchronized playback mode. In this case, the playback device 30 is set to the master mode if the content playback is in progress, and is set to the slave mode if the playback stopped. Furthermore, when the playback device 30 is set to the master mode, all of the playback control buttons 42 to 48 are enabled. However, if the playback device 30 is set to the slave mode, only a specific playback control button (such as the playback stop button 43) is enabled and the rest of the playback control buttons are disabled. Moreover, when the playback device 30 is set to the slave mode and when the specific playback control button is pressed, the playback control corresponding to the specific playback control button is performed, and the slave mode is cancelled.

The home network system 1 according to the present embodiment, as well as the server device 20 and the playback device 30 that are component elements of the home network system 1, have been explained with reference to FIGS. 1 to 5. The operation of the home network system 1 that is configured as described above will be explained below.

Overall System Operation

First, an overview of the content playback operation in the home network system 1 will be explained.

In a case where the content that is stored on the server device 20 is played back on the playback device 30, the playback device 30 first requests that the server device 20 transmit the content list. When the server device 20 transmits the content list, which is a list of the content that can be transmitted, to the playback device 30 in response to the transmission request, the playback device 30 displays the content list that was received from the server device 20 on the display portion 332. Next, when the user selects the desired content for playback from the content list by performing an input operation of a playback command, the playback device 30 issues a transmission request for the selected content to the server device 20. In response to the transmission request, the server device 20 expands (decodes) the compressed data for the content, converts it to the uncompressed data (for example, the linear PCM data) that is compatible with the playback device 30, then streams the uncompressed data to the playback device 30. The playback device 30 then plays back the streamed uncompressed data while receiving the uncompressed data. In the playback processing, the playback device 30, while storing the received uncompressed data temporarily in the receiving buffer 344, reads the uncompressed data out of the receiving buffer 344, performs the D/A conversion of the uncompressed data, generates the analog format playback signal, and outputs sound from the speaker 352.

Thus, in the present embodiment, the compressed content data that is stored on the server device 20 can be expanded with high accuracy, because the processing that decodes the compressed data into the uncompressed data is performed on the server device 20 by the decoder 236. Moreover, because the playback device 30 needs only to perform the D/A conversion of the uncompressed data that was expanded by the server device 20 and to output the analog data, the playback device 30 does not need to be provided with a decoder or the like to decode the compressed data, so the playback device 30 can be manufactured at a low cost.

Streaming Playback Operation

Next, the processing operations of the streaming transmission and the streaming playback of the content in the home network system 1 according to the present embodiment will be explained in general terms with reference to FIG. 6. Note that FIG. 6 is an explanatory figure that shows an overview of the streaming transmission process and the streaming playback process according to the present embodiment.

As shown in FIG. 6, the playback device 30 first transmits to the server device 20 the request to transmit the content that the user selected. The transmission request includes the address (for example, the URL) where the content is stored on the server device 20. When the content transmission request is received, the control portion 212 of the server device 20 sequentially reads out the compressed content data (the content may also be uncompressed data) from the storage device 230, starting at the beginning, and transfers the compressed data to the decoder 236. The read-out compressed data is expanded (decoded) into the uncompressed data (for example, the linear PCM data) by the decoder 236. Next, the server device 20 streams the decoded, uncompressed data to the playback device 30 through the communication portion 210 and the LAN 10. Note that in the present embodiment, TCP/IP, for example, is used as the communications protocol between the server device 20 and the playback device 30, but the present embodiment is not limited to this example, and it is also possible to communicate the data according to the User Datagram Protocol/Internet Protocol (UDP/IP) or the like, for example.

When the playback device 30 on the receiving side receives through the communication portion 310 the uncompressed data that was streamed from the server device 20 as described above, the playback device 30 first stores the received data temporarily in the receiving buffer 344. The playback device 30 then transfers to the D/A converter 350 the data that was temporarily stored in the receiving buffer 344, performs the D/A conversion to create the analog format playback signal, outputs the analog format playback signal to the speaker 352, and performs the audio output. This series of buffering, D/A conversion, and audio output processes in the playback device 30 is called the streaming playback.

During the streaming playback, the normal playback control portion 326 controls the receiving of the uncompressed data by the communication portion 310, the writing to the recognize buffer 344, and the transfer of the uncompressed data to the D/A converter 350 such that the music content or the like is continuously played back in the preferred manner.

Specifically, when the playback device 30 starts receiving the uncompressed data and the volume of the uncompressed data that is stored in the receiving buffer 344 reaches a specified data volume on which the D/A converter 350 can perform the D/A conversion processing without any interruption of the output, the control portion 320 performs control such that the uncompressed data is read out from the receiving buffer 344 and transferred to the D/A converter 350. It is thus possible at the start of the streaming playback to prevent any interruption of the D/A conversion output and the sound that is caused by data transmission to the D/A converter 350 at a point when a sufficient volume of the uncompressed data has not yet been stored in the receiving buffer 344.

Furthermore, when space becomes available in the receiving buffer 344 due to the transmission of the data to the D/A converter 350, the normal playback control portion 326 issues through the communication portion 310 a request for the server device 20 to transmit the next portion of the uncompressed data, receives the next portion of the uncompressed data, and buffers it in the receiving buffer 344. Therefore, when there is no space available in the receiving buffer 344, the playback device 30 waits without receiving the uncompressed data from the server device 20.

The streaming transmission of the uncompressed data from the server device 20 to the playback device 30 and the streaming playback processing of the uncompressed data in the playback device 30 are performed continuously as described above. This is possible not only in a case where only one track of the content is played back independently, but also a plurality of the content files that belong to a specified playback range, such as one album, for example, are played back in order according to the track number (a first track, a second track, . . . and mth track (tune)).

Synchronized Playback Method

Next, the processing for switching the playback operation among the plurality of playback devices 30 in the home network system 1 according to the present embodiment will be explained. In the explanation that follows, an example is described in which four of the playback devices 30 are connected through the LAN 10 to the same server device 20 in the home network system 1 that is configured within a user's home. The playback devices 30 are respectively installed in the living room, the bedroom, the kitchen and the bathroom.

(1) Starting the Synchronized Playback Mode (Party Mode)

Next, referring to FIG. 7, a description will be given of the overview of a playback control method when starting synchronized playback according to the present embodiment. The example illustrated in FIG. 7 is a case in which, when the content playback is performed by a playback device 30A in the living room where the user is, an attempt is made to also play back the same content at the same timing after the same elapsed playback time by a playback device 30B in a the bedroom and a playback device 30C in the kitchen. In this case, the playback device 30A in the living room which is operated by the user becomes the master terminal of the synchronized playback mode, and the remote playback devices 30B and 30C in the bedroom and the kitchen, respectively, become the slave terminals of the synchronized playback mode.

Referring to FIG. 7A, the playback device 30A in the living room plays back the content stored in the server device 20 while receiving the content (that is, streaming playback) (Step S110). In this state, when the user in the living room inputs a synchronized playback command to the playback device 30A in the living room to execute the synchronized playback mode (party mode) (Step S120), the playback device 30A in the living room is set to the master mode in response to the receiving of the synchronized playback command.

Subsequently, the playback device 30 (master terminal) in the living room which is set to the master mode simultaneously transmits the search information (search message) to search for other playback devices 30 that are going to join in the synchronized playback, to the other playback devices 30B and 30C connected to the playback device 30A in the living room through the LAN 10 (Step S130).

After receiving the search information from the playback device 30A in the living room and in the case that the playback device 30B in the bedroom and the playback device 30C in the kitchen are allowed to become the slave terminals of the synchronized playback, the playback devices 30B and 30C transmit to the playback device 30A in the living room, a joining response (response message) that indicates that the playback devices 30B and 30C are going to join in the synchronized playback with the playback device 30A in the living room (Step S140). Note that, any of the playback devices 30 that are not allowed to become a slave terminal of the synchronized playback do not transmit the joining response in reply to the search information.

Furthermore, the playback devices 30B and 30C that transmitted the joining response are set to the slave mode (Step S150), and become the slave terminals of the content playback operation that is controlled by the playback device 30A (master terminal) in the living room. In this case, the playback devices 30B and 30C that are set to the slave mode stop content playback if it is in progress.

Subsequently, as shown in FIG. 7B, the playback device 30A in the living room controls, in the following manner, the playback devices 30B and 30C in the bedroom and the kitchen which transmitted the joining response. Firstly, the playback device 30A in the living room transmits the content information (such as the URL of the content), which is the information that pertains to the content that is currently being played back on the playback device 30A, to the playback devices 30B and 30C in the bedroom and the kitchen (Step S160). Furthermore, the playback device 30A in the living room obtains an elapsed playback time for the content that is being played back (Step S170), and transmits, to the playback devices 30B and 30C in the bedroom and the kitchen, the synchronized playback start time obtained by adding the additional time to the obtained elapsed playback time (Step S180).

Thereafter, as shown in FIG. 7C, the playback device 30A in the living room transmits, to the playback devices 30B and 30C in the bedroom and the kitchen, a pause command that places the slave terminal in the paused state (Step S190). Then, in response to the receiving of the pause command, the playback devices 30B and 30C in the bedroom and the kitchen start receiving data that begins from the synchronized playback start time of the content from the server device 20 (Step S200).

Subsequently, the playback devices 30B and 30C in the bedroom and the kitchen temporarily store the data received from the sever device 20 in the receiving buffer 344. Once the data temporarily stored in the receiving buffer 344 reaches or exceeds a specified data volume, the playback preparation is completed and the playback devices 30B and 30C in the bedroom and the kitchen enter the paused state. The playback devices 30B and 30C in the paused state maintain a state in which the specified volume of the data is stored in the receiving buffer 344, and do not perform any further receiving operation of the data from the server device 20 or a playback operation of the stored content. After entering the paused state, the playback devices 30B and 30C transmit a playback preparation completion notification to the playback device 30A.

Then, the playback device 30A in the living room confirms that all the slave terminals (the playback devices 30B and 30C) are in the paused state based on whether or not the playback preparation completion notification has been received from the playback devices 30B and 30C (Step S210). After the confirmation is obtained, and once the elapsed playback time for the content being played back on the playback device 30A reaches the synchronized playback start time (Step S220), the playback device 30A in the living room transmits a playback start command to the playback devices 30B and 30C (Step S230).

Moreover, the playback devices 30B and 30C in the bedroom and the kitchen cancel the paused state upon receiving the playback start command from the playback device 30A in the living room, and start playing back the data that begins from the synchronized playback start time of the content which is temporarily stored in the receiving buffer 344 (Step S240). Consequently, the playback device 30A in the living room which is the master terminal and the playback devices 30B and 30C in the bedroom and the kitchen which are the slave terminals are able to start playing back the same content in synchronization.

Figure 8B:
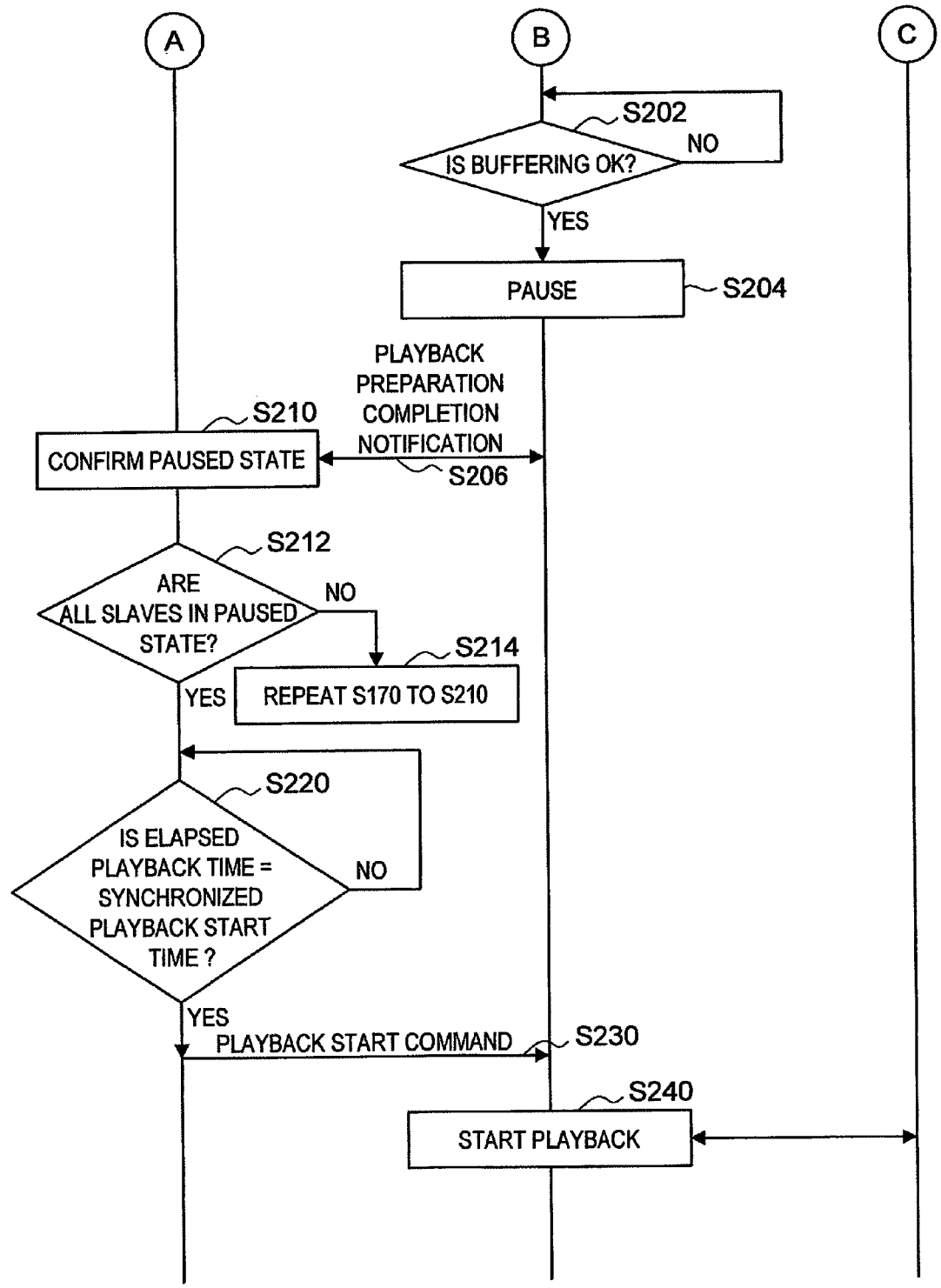
FIG. 8B is a flow chart that shows the playback control method that is performed when synchronized playback starts according to the present embodiment.

Next, referring to FIG. 8, the synchronized playback control method used in the case explained with reference to FIG. 7 will be described in detail. FIG. 8 is a flowchart of a playback control method that is performed at the start of the synchronized playback by a plurality of the playback devices 30 according to the present embodiment.

Referring to FIG. 8A, the playback device 30A in the living room plays back, while receiving the content from the server device 20 (Step S110). In this case, the playback device 30A in the living-room and the playback device 30B in the bedroom are both set to the normal mode, and a master-servant relationship related to the playback control does not exist. Note that, in processing described hereafter, the playback device 30A in the living room is continuously playing back the content, and the playback elapse time of the content increases with time.

In this state, to select the synchronized playback mode (party mode), when a user presses the synchronized playback button 31 or 41 (party mode button) of the playback device 30A in the living room to input a synchronized playback command, the playback device 30A in the living room receives the synchronized playback command (Step S120). Furthermore, in response to the receiving of the synchronized playback command, the playback device 30A in the living room sets the playback control mode thereof to the master mode of the synchronized playback mode (Step S122). Therefore, the playback device 30A in the living room becomes the master terminal of the synchronized playback.

Subsequently, in order to search for slave terminals, the playback device 30A in the living room searches for and finds other playback devices 30 that are currently active and connected to the LAN 10. Then, the playback device 30A simultaneously transmits, to the found playback devices 30, search information to search for the playback devices that are going to join in the synchronized playback (Step S130). In this simultaneous transmission of the search information, the information can be simultaneously sent to all of the slave terminals by, for instance, using UDP unicast transmission, or can be sent individually to each of the slave terminals by using TCP unicast transmission. Also, the search information includes, as the information that pertains to the transmission source playback device 30A (master terminal), the address information of the master terminal (such as an IP address), the identification address of the master terminal (such as a UUID or a MAC address specifically assigned per machine unit), and the like. In consequence, the playback device 30B which has received the search information can identify the master terminal of the synchronized playback, and obtain the address of the master terminal to which the playback device 30B transmits a response.

Then, after receiving the search information, the playback device 30B in the bedroom determines whether or not to allow itself to be placed in the slave mode of the synchronized playback mode (that is, to allow synchronized playback with the playback device 30A in the living room) based on the setting information pre-stored in the setting information storage portion 348 (Step S132). As a result, if the slave mode is not allowed, the playback device 30B in the bedroom ignores the search information and does not transmit a response to the playback device 30A in the living room (Step S134). On the other hand, if the slave mode is allowed, the playback device 30B in the bedroom transmits a joining response that indicates that the playback device 30B is going to join in the synchronized playback with the playback device 30A in the living room that transmitted the search information, based on the address information of the playback device 30A in the living room included in the search information (Step S140).

Furthermore, the playback device 30B in the bedroom sets the playback control mode of the playback device 30B to the slave mode of the synchronized playback mode (Step S150). Moreover, if content playback is in progress, the playback device 30B in the bedroom stops the playback of the content (Steps S152 and S154). In addition, in the playback device 30B that is set to the slave mode (slave terminal), the playback control operations (such as playback and rewinding operations) other than the specific operation for cancelling the synchronized playback mode are disabled. Therefore, the playback control operation of the content to be played back in synchronization by the master terminal and the slave terminals has to be performed exclusively on the master terminal.

On the other hand, when the joining response is received as a response to the search information from one or more other playback devices 30 including the playback device 30B in the bedroom, the playback device 30A in the living room selects the playback devices 30 that are to become slave terminals based on a predetermined synchronized playback zone (Step S142). That is, the playback device 30A in the living room which is the master terminal selects as the slave terminals, from one or more playback devices 30 that transmitted the joining response, the playback devices 30 which belong to the same zone as the playback device 30A.

Next, the zone selection mentioned above will be described in detail. A plurality of the playback devices 30 in the home network system 1 is grouped by a synchronized playback zone, and the group information is stored in each playback device 30. In this case, the synchronized playback zone refers to the range of the playback devices 30 that perform the synchronized playback. Then, the master terminal selects only the playback devices 30 that belong to the same zone as the master terminal as the slave terminals, so that the playback devices that belong to other zones are not selected. For instance, assume that the playback devices 30A and 30B in the living room and the bedroom are grouped together in the same zone, and the playback devices 30C and 30D in the kitchen and the bathroom are grouped together in another zone. In this case, when a joining response is received from the playback device 30B in the bedroom, the playback device 30A in the living room selects the playback device 30B as the slave terminal. However, even if the joining response is received from the playback devices 30C and 30D in the kitchen and the bathroom, the playback devices 30C and 30D are not selected as the slave terminals. Accordingly, by providing the synchronized playback zone and grouping the playback devices that perform playback in synchronization, a master terminal is set for each zone, thereby enabling the synchronized playback of different content by zone. Note that Step S142 can be omitted when the zone selection is not performed.

Subsequently, the playback device 30A in the living room registers the playback device 30B in the bedroom, which transmitted the joining response, in the slave registration list 349 as a slave terminal (Step S144). The joining response includes, as the information that pertains to the slave terminal, for instance, address information (such as an IP address) of the slave terminal and identification information (such as a UUID and a MAC address) of the master terminal. Accordingly, the master terminal that receives the joining response can identify the slave terminal that transmitted the joining response, and can also obtain the address of the slave terminal to transmit a control command. The playback device 30A in the living room which is the master terminal writes, in the slave registration list 349 for the slave registration, information that pertains to the playback device 30B in the bedroom which transmitted the joining request.

Thereafter, the playback device 30A in the living room transmits, to the playback device 30B in the bedroom, content information (such as the URL or the content address information) related to the content that is currently being played back on the playback device 30A (Step S160). Furthermore, at a selected timing after transmission of the content information, the playback device 30A in the living room obtains the elapsed playback time for the content that is being played back (Step S170). While playing back the content, the playback device 30A in the living room constantly measures the elapsed playback time, and thereby the elapsed playback time can always be obtained.

Then, the playback device 30A in the living room calculates the synchronized playback start time (for example, 3 minutes and 40 seconds) by adding the preset additional time (for example, 10 seconds) to the obtained elapsed playback time (for example, 3 minutes and 30 seconds). Subsequently, the playback device 30A in the living room transmits information that indicates the synchronized playback start time to the playback device 30B in the bedroom (Step S180). The synchronized playback start time is the time obtained by adding a specified extra time to the time required from receiving of content data by the playback devices 30B and 30C or the slave terminals from the server device 20 until enough data is stored in the receiving buffer 344 to complete the playback preparation.

In addition, the playback device 30A in the living room transmits, to the playback device 30B in the bedroom which is the slave terminal, a pause command to place the playback device 30B in the bedroom in the paused state (Step S190). Note that the pause command may be transmitted at the same time as the transmission of the content information (S160) or the transmission of the information that indicates the synchronized playback start time (S180). In addition, the pause command transmission processing (S190) can be omitted, and the slave terminal may determine receiving of the pause command in response to the receiving of the content information or the information that indicates the synchronized playback start time.

Based on the content information (such as the URL) and the synchronized playback start time received from the playback device 30A in the living room at Steps S160 and S180, the playback devices 30B and 30C in the bedroom and the kitchen request transmission of data that begins from the synchronized playback start time of the content that is being played back on the playback device 30A in the living room. In response to this, the server device 20 stream-transmits the data to the playback device 30B in the bedroom. Then, the playback device 30B in the bedroom starts receiving the data that begins from the synchronized playback start time of the content from the server device 20 (Step S200).

Subsequently, the playback device 30B in the bedroom temporarily stores (buffers) the data received from the server device 20 in the receiving buffer 344. Then, when the data temporarily stored in the receiving buffer 344 reaches or exceeds the specified volume necessary for suitable playback operation (Step S202), the playback device 30B in the bedroom completes the playback preparation, enters the paused state (Step S204), and interrupts the receiving operation and the buffering operation. After entering the paused state, the playback devices 30B and 30C transmit a playback preparation completion notification for the content to the playback device 30A in response to the receiving of a state reference signal from the playback device 30A in the living room (Step S206).

More specifically, after transmission of the pause command (S190), the playback device 30A in the living room which is the master terminal inquires about completion of the content playback preparation by transmitting repeatedly to the playback device 30B in the bedroom a state reference signal to confirm that the slave terminal is in the paused state. When buffering (playback preparation) of at least the specified volume of data in the receiving buffer 344 is completed, the playback device 30B in the bedroom (slave terminal) transmits the playback preparation completion notification to the playback device 30A in the living room as a response to the state reference signal (S206). The playback device 30A in the living room can confirm the completion of the playback preparation of the playback device 30B in the bedroom by receiving the playback preparation completion notification (Step S210).

Thereafter, the playback device 30A in the living room confirms if all the slave terminals are in the paused state based on whether or not the playback preparation completion notification is received from all the slave terminals (including the playback device 30B in the bedroom) that are registered in the slave registration list 349 (Step S212). As a result of this, if there is a slave terminal that has not completed the playback preparation within the synchronized playback start time set at Step S180 and that has not yet entered the paused state, the control at Steps S170 to S210 is repeatedly performed for any of the slave terminals that are not yet in the paused state. In this case, by resetting previously set additional time of the synchronized playback start time to an increased length of time, more time can be given to the slave terminals for playback preparation, thereby making fully sure that the slave terminals are placed in the paused state.

Thereafter, the playback device 30A in the living room continuously compares the current elapsed playback time (which increases over time) of the content being playing back thereby, and the synchronized playback start time (for instance, 3 minutes and 40 seconds) set at Step S180. Once the elapsed playback time for the content reaches the synchronized playback start time (Step S220), a playback start command is simultaneously transmitted to each of the slave terminals (including the playback device 30B in the bedroom) (Step S230). In the simultaneous transmission of the playback start command, for instance, it is preferable to transmit the command from the master terminal to all the slave terminals by using UDP multicast transmission, because time lag of the playback start time command can be inhibited. However, the present embodiment is not limited by this example, and TCP unicast transmission may also be used to transmit the command individually to each of the slave terminals from the master terminal.

Note that the transmission timing of the playback start command may be the point of time immediately before when the elapsed playback time reaches the synchronized playback start time (for example, a point of time that is earlier by just enough time to take in to consideration a command delay and the like). This point of time is also taken to be included within the concept of, "when the elapsed playback time for the content reaches the synchronized playback start time" as defined by he present invention.

Furthermore, when receiving the playback start command from the playback device 30A in the living room, the playback device 30B, 30C in the bedroom and the kitchen cancel the paused state and start playing back data that begins from the synchronized playback start time of the content in the receiving buffer 344 (Step S240). More specifically, at the timing when the playback start command is received, the playback device 30B in the bedroom reads the digital data, from the beginning, that starts from the synchronized playback start time of the content that is temporarily stored in the receiving buffer 344. Then, the playback device 30B transfers the data to the D/A converter 350 to convert it to analog data, and outputs the data as audio from the speaker 352.

In the manner described above, the content being played back on the playback device 30A in the living room (master terminal) can be played back on the playback device 30B in the bedroom (slave terminal) in synchronization. Note that, in this example, the playback device 30B in the bedroom is used as the slave terminal. Nevertheless, another playback device 30C in the kitchen can also perform the synchronized playback in the same manner.

In accordance with the synchronized playback control method, the playback device 30A in the living room (master terminal) set to the master mode controls the other playback devices 30B and 30C set to the slave mode to play back content in synchronization. In this case, the master terminal executes all the time management necessary for the synchronized playback (for instance, setting of the synchronized playback start time, and comparison of the elapsed playback time and the synchronized playback start time). The slave terminal thus only needs to receive the content from the server device 20 and perform the playback operation in response to a command (such as a pause command and a playback start command) issued by the master terminal. Therefore, the processing load on the slave terminals can be reduced. Consequently, with the synchronized playback control method according to the embodiment of the invention, synchronized playback can be achieved among a plurality of the playback devices 30 by a relatively simple control by the master terminal. Furthermore, this method is convenient for the user, because the synchronized playback by the playback devices 30A, 30B, and 30C can be achieved simply by an easy operation of the playback device 30A in the living room without operating the playback devices 30B and 30C in the bedroom and the kitchen.

(2) Joining the Synchronized Playback Mode while the Synchronized Playback is in Progress Next, referring to FIG. 9, a description will be given of the overview of a playback control method when a new playback device 30 joins during performance of the synchronized playback mode according to the embodiment of the invention. The example in FIG. 9 illustrates a case in which, as a result of starting the synchronized playback in the example in FIG. 7, when content is played back in synchronization by the playback device 30A in the living room (master terminal) and the playback devices 30B and 30C in the bedroom and the kitchen (slave terminals), the playback device 30D in the bathroom newly joins the synchronized playback mode as a slave terminal while the synchronized playback is in progress.

Referring to FIG. 9A, the playback devices 30A, 30B, and 30C in the living room, bedroom, and kitchen receive the same content from the server device 20 and at the same time play back the content in synchronization (Step S300). In this state, to make the playback device 30D in the bathroom join the synchronized playback mode, while the playback by the playback device 30D is stopped, a user in the bathroom presses the synchronized playback button of the playback device 30D in the bathroom to input the synchronized playback command (Step S310). Then, the playback device 30D in the bathroom is set to the slave mode in response to receiving of the synchronized playback command.

Subsequently, the playback device 30D in the bathroom transmits a request to join the synchronized playback (a joining request message) to the other playback devices 30A, 30B, and 30C connected to the playback device 30D in the bathroom through the LAN 10, thereby providing notification that the playback device 30D is set to the slave mode (Step S320). After receiving the joining request, the playback device 30A in the living room which is the master terminal registers the playback device 30D in the bathroom as a slave terminal of the synchronized playback (Step S330).

Then, referring to FIG. 9B, the playback device 30A in the living room (master terminal) performs control, which will be described hereafter and which is similar to that in the example in FIG. 7, for the playback device 30D in the bathroom (slave terminal) that transmitted the joining request. Firstly, the playback device 30A in the living room transmits, to the playback device 30D in the bathroom, information (such as the URL) of the content that is being played back in synchronization by the playback device 30A (Step S360). In addition, the playback device 30A obtains the elapsed playback time for the content that is being played back in synchronization (Step S370), and transmits, to the playback device 30D in the bathroom, the synchronized playback start time obtained by adding the additional time to the obtained elapsed playback time (Step S380).

Figure 9C:
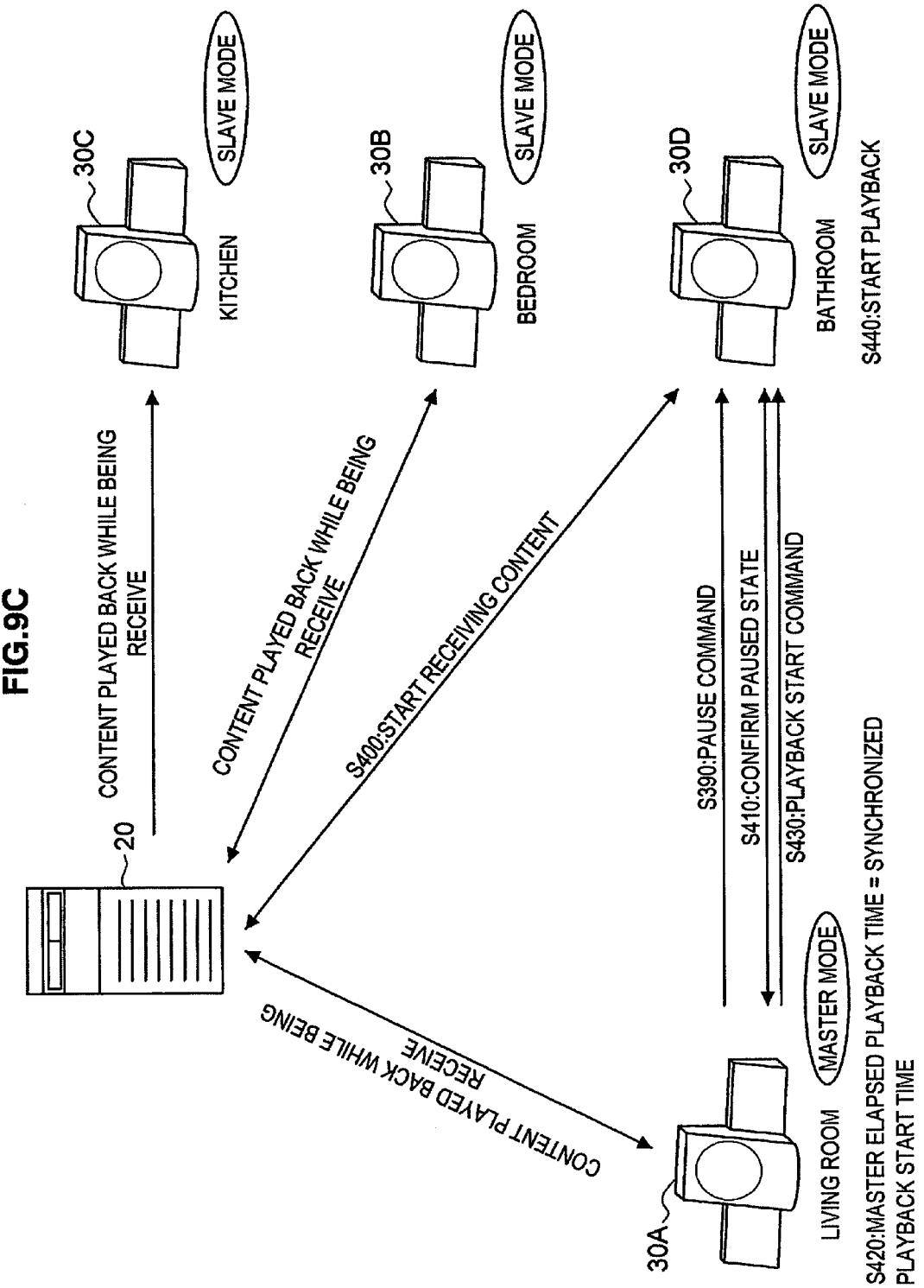
FIG. 9C is an explanatory figure that shows the playback control method that is used when the new playback device joins the playback devices that are already performing synchronized playback according to the present embodiment.

Moreover, as shown in FIG. 9C, the playback device 30A in the living room transmits a pause command to the playback device 30D in the bathroom (Step S390). Then, in response to the receiving of the pause command, the playback device 30D in the bathroom starts receiving data that begins from the synchronized playback start time of the content from the server device 20 (Step S400). The playback device 30A then temporarily stores the data received from the server device 20 in the receiving buffer 344. When the data temporarily stored in the receiving buffer 344 reaches or exceeds the specified volume, the playback preparation is completed and the paused state is entered. Thereafter, the playback device 30D in the bathroom transmits a playback preparation completion notification to the playback device 30A in the living room.

As a result of receiving the playback preparation completion notification from the playback device 30D in the bathroom, the playback device 30A in the living room can confirm that the playback device 30D in the bathroom is in the paused state (Step S410). After obtaining the conformation, when the elapsed playback time for the content that is being played back on the playback device 30A reaches the synchronized playback start time (Step S420), the playback device 30A in the living room transmits the playback start command to the playback device 30D in the bathroom (Step S430).

Further, upon receiving the playback start command from the playback device 30A in the living room, the playback device 30D in the bathroom cancels the paused state and starts receiving data that begins from the synchronized playback start time of the content that is temporarily stored in the receiving buffer 344 (Step S440). Consequently, the playback device 30D in the bathroom which is newly added to the synchronized playback mode can play back the same content in synchronization with the playback device 30A in the living room (master terminal) and the playback devices 30B and 30C in the bedroom and the kitchen (slave terminals) which have already been performing the synchronized playback.

Next, referring to FIG. 10, a further detailed description will be given of the synchronized playback control method in the case illustrated with reference to FIG. 9. FIG. 10 is a flowchart which illustrates the playback control method when the playback device according to the present embodiment newly joins the synchronized playback mode.

As shown in FIG. 10A, when synchronized playback of the content is in progress by the playback device 30A in the living room (master terminal) and the playback devices 30B and 30C in the bedroom and the kitchen (slave terminals), the playback device 30A in the living room plays back, while receiving the content from the server device 20 (Step S110). In this case, the playback device 30A in the living room is set to the master mode, and the playback devices 30B and 30C in the bedroom and the kitchen are set to the slave mode. Meanwhile, the playback device 30D in the bathroom is set to the normal mode and thus playback thereof is stopped (Step S302). Note that the playback device 30A in the living room continuously performs the content playback even while the processing described below is in progress, and the elapsed playback time for the content increases over time.

In this case, if a user presses the synchronized playback button 31 or 41 (party mode button) of the playback device 30D in the bathroom in order to make the playback device 30D in the bathroom that is in a playback stopped state join the synchronized playback mode (party mode), a synchronized playback command is input to and received by the playback device 30D in the bathroom (Step S310). Moreover, in response to receiving of the synchronized playback command, the playback device 30D in the bathroom sets the playback control mode thereof to the slave mode of the synchronized playback mode (Step S312). Accordingly, the playback device 30D is set to the slave mode upon receiving the synchronized playback command while the playback is stopped.

Subsequently, to notify the master terminal that the playback device 30D in the bathroom has become a slave terminal, the playback device 30D in the bathroom simultaneously transmits a joining request to request that the playback device 30D join in the synchronized playback to the one or more other playback devices 30 that are currently active and connected to the LAN 10 (Step S320). The simultaneous transmission may use, for instance, UDP multicast transmission.

Then, the playback device 30A in the living room additionally registers the playback device 30D in the bathroom that transmitted the joining request in the slave registration list 349 as the slave terminal (Step S330). The joining request includes, as information that pertains to the transmission source playback device 30D (slave terminal) including, for example, address information of the slave terminal (such as an IP address) and identification information of the slave terminal (such as a UUID and a MAC address). Accordingly, the master terminal which receives the joining response can identify the slave terminal that transmitted the joining request, and can also obtain the address of the slave terminal to send a control command. The playback device 30A in the living room which is the master terminal writes, in the slave registration list 349 for slave registration, information that pertains to the playback device 30D in the bathroom which transmitted the joining request.

Thereafter, the playback device 30A in the living room transmits, to the playback device 30D in the bathroom, the content information (such as the URL) related to content which is being played back in synchronization by the playback devices 30A, 30B, and 30C (Step S360). Then, the playback device 30A obtains the elapsed playback time for the content that is being played back, at a selected point of time after transmission of the content information (Step S370). Furthermore, the playback device 30A calculates the synchronized playback start time by adding the preset additional time to the obtained elapsed playback time, and transmits information that indicates the synchronized playback start time to the playback device 30D in the bathroom (Step S380). Subsequently, the playback device 30A transmits the pause command to the playback device 30D in the bathroom (Step S390). The playback device 30D in the bathroom receives the content information, the information that indicates the synchronized playback start time, and the pause information that are transmitted from the playback device 30A in the living room.

Then, in response to receiving of the pause command, the playback device 30D in the bathroom starts receiving, from the server device 20, data that begins from the synchronized playback start time of the content that is being played back on the playback device 30A in the living room based on the content information (such as the URL) and the synchronized playback start time received from the playback device 30A in the living room (Step S400).

Thereafter, as shown in FIG. 10B, the playback device 30D in the bathroom temporarily stores (buffers) data received from the server device 20 in the receiving buffer 344. Then, when the data temporarily stored in the receiving buffer 344 reaches or exceeds the specified volume required for a suitable playback operation (Step S402), the playback preparation is complete and the paused state is entered (Step S404). Subsequently, in response to the receiving of a state reference signal from the playback device 30A in the living room, the playback device 30D transmits a playback preparation completion notification for the content to the playback device 30A (Step S406). The playback device 30A in the living room can confirm the completion of playback preparation of the playback device 30D in the bathroom by receiving the playback preparation completion notification (Step S410).

After the confirmation, when the current elapsed playback time for the content that is being played back on the playback device 30A in the living room reaches the synchronized playback start time set at Step S380 (Step S420), the playback device 30A in the living room transmits the playback start command to the playback device 30D in the bathroom (Step S430). When the playback start command is received from the playback device 30A in the living room, the playback device 30D in the bathroom cancels the paused state and starts playing back the data that begins from the synchronized playback start time of the content in the receiving buffer 344 (Step S440).

Note that Steps S360 to S440 above are substantially equivalent to Steps S160 to S240 in FIG. 8, and therefore a detailed description thereof will be omitted. It should be noted that Steps S212 and S214 in FIG. 8 are omitted in the flowchart of FIG. 10.

In accordance with the playback control method above, while the synchronized playback is performed by the playback device 30A in the living room (master terminal) and the playback devices 30B and 30C in the bedroom and the kitchen (slave terminals), the playback device 30D in the bathroom (slave terminal) can join the synchronized playback while it is in progress. In this case, the new playback device 30D can join the synchronized playback while it is in progress in a seamless manner without interrupting playback of the content by the playback devices 30A, 30B, and 30C that are currently performing the synchronized playback.

(3) Content Switching Control During Synchronized Playback of a Plurality of Content Files Now, referring to FIG. 11, a description will be given of a playback control method when switching content in a case in which a plurality of content files are continuously played back in synchronization in accordance with the synchronized playback control method according to the present embodiment. The content switching method is applied to cases such as when continuously playing back a plurality of tracks in the same music album in the order of track number, or when continuously playing back a plurality of tracks in a playlist.

FIG. 11 is a flowchart which illustrates the playback control method for switching content while the content is played back in synchronization by the playback device 30A in the living room (master terminal) and the playback device 30B (slave terminal) in the bedroom.

Figure 11A:
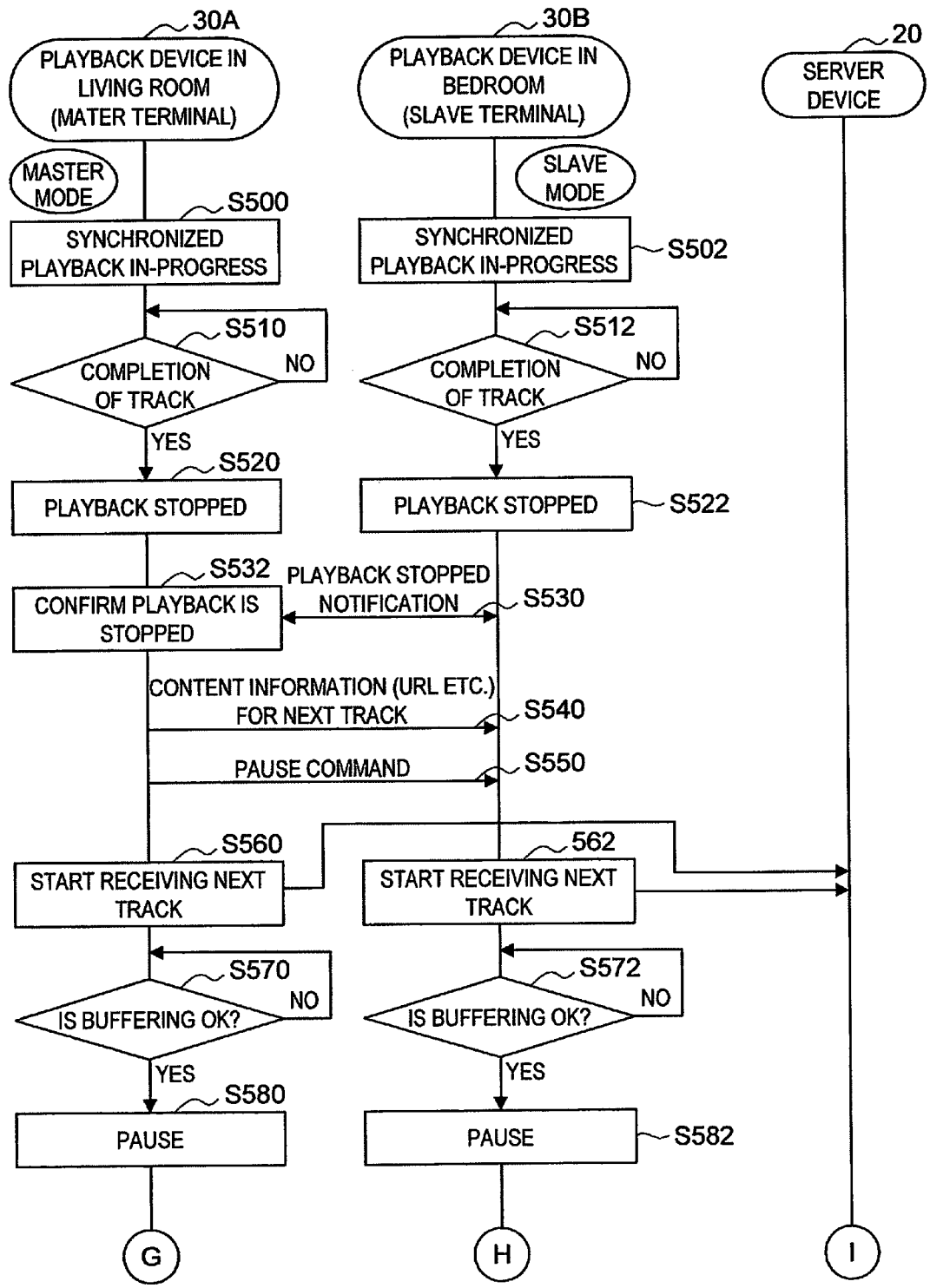
FIG. 11A is a flow chart that shows a playback control method that is used when content switching is performed during synchronized playback according to the present embodiment.

Referring to FIG. 11A, the playback device 30A in the living room (master terminal) and the playback device 30B (slave terminal) in the bedroom are playing back the same content (track) in synchronization (Steps S500 and S502). In this state, when completion of the content is detected (Step S510 and S512), the playback devices 30A and 30B stop the playback operation (Steps S520 and S522). That is, the slave terminal stops playback each time playback of one content file is completed.

The playback device 30A in the living room (master terminal), upon completion of the content playback thereby, confirms (Step S532) if all of the slave terminals have stopped playback based on whether or not the playback stop notification has been received from the slave terminals (Step S530). More specifically, the master terminal, upon completion of the content playback thereby, inquires whether or not the slave terminals have entered a playback stopped state by repeatedly transmitting a state reference signal to the slave terminals to confirm that the slave terminals have entered the playback stopped state. Upon stopping the playback (S522), the slave terminals transmit the playback stop notification to the master terminal as a response to the state reference signal (S530). The master terminal can confirm that playback of the slave terminals has stopped based on receipt of the playback stop notification from the slave terminals (S532).

Subsequently, the playback device 30A in the living room (master terminal) transmits, to each of the slave terminals including the playback device 30B in the bedroom, content information (such as the URL of the next track) related to the next content to be played back after the content the playback of which has been completed (Step S540). Consequently, the slave terminals can receive the next content from the server device 20 based on the next content information.

Furthermore, the playback device 30A in the living room (master terminal) transmits a pause command to the playback device 30B in the bedroom (slave terminal) to place the playback device 30B in the paused state (Step S550). Note that the pause command can be transmitted together with the content information transmission (S540). In addition, transmission processing of the pause command (S550) may be omitted so that the slave terminals can determine that the pause command is received in response to receiving of the content information.

Thereafter, the playback device 30A in the living room (master terminal) and the playback device 30B in the bedroom (slave terminal), respectively, request the server device 20 to transmit the next content, and start receiving from the server device 20 the next content data from the beginning of the track (Steps S570 and S572). Furthermore, each of the playback device 30A in the living room and the playback device 30B in the bedroom temporarily stores (buffers) the data received from the server device 20 in the receiving buffer 344. Once the data temporarily stored in the receiving buffer 344 reaches or exceeds the specified volume, and thus the playback preparation is completed (Steps S570 and S572), data receiving from the server device 20 is interrupted and the paused state is entered (Steps S580 and S582).

Next, as shown in FIG. 11B, based on whether or not the playback preparation completion notification has been received from the slave terminals, the playback device 30A in the living room (master terminal) confirms if the playback preparation is completed by all of the slave terminals (including the playback device 30B in the bedroom) (Steps S584 to S600). More specifically, once the paused state has been entered, the master terminal inquires about the completion of the content playback preparation by repeatedly transmitting the state reference signal to the slave terminals to confirm that the slave terminals have entered the paused state. The playback device 30B in the bedroom (slave terminal), upon completion of the playback preparation, transmits the playback preparation completion notification to the master terminal as a response to the state reference signal (S584). The master terminal can thus confirm the completion of the playback preparation of the slave terminals as a result of receiving the playback preparation completion notification (Step S590).

In consequence, the playback device 30A in the living room which is the master terminal pauses until all the slave terminals complete playback preparation. Upon completion of the playback preparation by all of the slave terminals (Step S600), the playback device 30A simultaneously transmits the playback start command to each of the slave terminals (including the playback device 30B in the bedroom) (Step S610), and also cancels the paused state of the playback device 30A to start playback of the next content that is buffered in the receiving buffer 344 (Step S620). Upon receiving the playback start command, the playback device 30B in the bedroom (slave terminal) cancels the paused state and starts playback of the next content that is buffered in the receiving buffer 344 (Step S622).

As described above, when switching the content that is played back in synchronization, the master terminal controls the playback start timing of the next content of the master terminal itself as well as the slave terminals. Accordingly, the playback time lag between the master terminal and the slave terminals can be adjusted for each content (that is, for each track).

(4) Adjustment of the Elapsed Playback Time of the Slave Terminal by the Master Terminal Next, referring to FIG. 12, a description will be given of a playback control method for adjusting the elapsed playback time of the slave terminal by the master terminal according to the present embodiment. FIG. 12 is a flowchart that illustrates the playback control method for adjusting an elapsed playback time lag of the slave terminal by the master terminal, when content is being played back in synchronization by the playback device 30A in the living room (master terminal) and the playback device 30B, 30C (slave terminal) in the bedroom and the kitchen as a result of starting the synchronized playback as in the example of FIG. 7.

Referring to FIG. 12A, when the same content (track) is played back in synchronization by the playback device 30A in the living room (master terminal) and the playback device 30B in the bedroom (slave terminal) (Steps S700 and S702), the master terminal obtains, on a regular basis or at a selected timing, the elapsed playback time for the content that is currently being played back on each of the slave terminals (Steps S710 and S712). More specifically, the playback device 30A in the living room which is the master terminal transmits, on a regular basis to the playback device 30B in the bedroom, a transmission request for the elapsed playback time for the content that is currently being played back on the playback device 30B in the bedroom which is the slave terminal (Step S710). In response to the transmission request, the playback device 30B in the bedroom transmits information that indicates the current elapsed playback time of the playback device 30B to the playback device 30A in the living room (Step S712). The playback device 30A in the living room receives information that indicates the current elapsed playback time of each of the slave terminals (hereafter called the 'elapsed playback time of the slave terminals') from respective slave terminals including the playback device 30B in the bedroom.

Note that, in the present embodiment, the slave terminals transmit the elapsed playback time of the slave terminals to the master terminal in response to the transmission request from the master terminal. Nevertheless, the present embodiment is not limited by this example, and for instance, the slave terminals may regularly obtain and transmit the elapsed playback time of the slave terminals to the master terminal even if no transmission request is sent from the master terminal.

Furthermore, the playback device 30A in the living room (master terminal) obtains and maintains an elapsed playback time for the current content in the master terminal (hereafter called the 'elapsed playback time of the master terminal') at the time of requesting transmission of the elapsed playback time to the slave terminals or receiving information that indicates the elapsed playback time of the slave terminals.

Then, the playback device 30A in the living room compares the elapsed playback time of the master terminal and the elapsed playback time of each of the slave terminals to determine if there is a specified time lag or more between the two (Step S720). As a result, if the time lag is less than the specified time, the processing returns to Step S710 to repeat Steps S710 to S720. On the other hand, if the time lag is equal to or exceeds the specified time, the playback device 30A in the living room transmits a playback stop command to any of the slave terminals that have the elapsed playback time lag (the playback device 30B in the bedroom in the example of the figure) (Step S730). Upon receiving the playback stop command, the playback device 30B in the bedroom stops playing back the content that is being played back in synchronization (Step S732).

Thereafter, based on whether or not the playback stop notification is received from the slave terminals (Step S734), the playback device 30A in the living room (master terminal) confirms if the playback device 30B in the bedroom (slave terminal) that has the elapsed playback time lag has stopped the playback (Step S736). More specifically, the master terminal inquires whether or not the slave terminals have been placed in the playback stopped state by repeatedly transmitting a state reference signal to the slave terminals to confirm that the slave terminals are in the playback stopped state. Once the playback is stopped (S732), the slave terminals transmit the playback stop notification to the master terminal in response to the state reference signal (S734). The master terminal can confirm that playback of the slave terminals has stopped as a result of receiving the playback stop notification from the slave terminals (S736).

Subsequently, the playback device 30A in the living room transmits, to the playback device 30B in the bedroom, content information (such as the URL) related to the content that is being played back on the playback device 30A (Step S760). Then, at a selected timing after transmission of the content information, the playback device 30A newly obtains the current elapsed playback time for the content that is being played back on the playback device 30A in the living room (Step S770). Furthermore, the playback device 30A calculates the synchronized playback start time by adding the preset additional time to the obtained elapsed playback time, and transmits information that indicates the synchronized playback start time to the playback device 30B in the bedroom (Step S780). Subsequently, the playback device 30A transmits a pause command to the playback device 30B in the bedroom (Step S790). The playback device 30B in the bedroom receives the content information, the information that indicates the synchronized playback start time, and the pause information that are transmitted from the playback device 30A in the living room. Note that Step S760 may be omitted when the playback device 30B in the bedroom stores the content information received in the past.

Then, in response to the receiving of the pause command, the playback device 30B in the bedroom starts receiving, from the server device 20, data that begins from the synchronized playback start time of content that is being played back on the playback device 30A in the living room, based on the content information (such as the URL) and the synchronized playback start time received from the playback device 30A in the living room.

Furthermore, as shown in FIG. 12B, the playback device 30B in the bedroom temporarily stores (buffers) the data received from the server device 20 in the receiving buffer 344. Once the data temporarily stored in the receiving buffer 344 reaches or exceeds a specified volume necessary for a suitable playback operation (Step S802), the playback preparation is completed and the paused state is entered (Step S804). Thereafter, in response to the receiving of the state reference signal from the playback device 30A in the living room, the playback device 30B transmits the playback preparation completion notification for the content to the playback device 30A (Step S806). The playback device 30A in the living room can confirm the completion of the playback preparation by the playback device 30B in the bedroom as a result of receiving the playback preparation completion notification (Step S810).

After the confirmation, when the current elapsed playback time for the content that is being played back on the playback device 30A reaches the synchronized playback start time set at Step S780 (Step S820), the playback device 30A in the living room transmits the playback start command to the playback device 30B in the bedroom (Step S830). Upon receiving the playback start command from the playback device 30A in the living room, the playback device 30B in the bedroom cancels the paused state and starts playing back data that begins from the synchronized playback start time of the content in the receiving buffer 344 (Step S840).

Note that Steps S760 to S840 above are substantially equivalent to Steps S160 to S240 in FIG. 8, and therefore a detailed description thereof will be omitted. It should be noted that Steps S212 and S214 in FIG. 8 are omitted in the flowchart of FIG. 12.

With the playback control method described above, while the synchronized playback is being performed by the playback device 30A in the living room (master terminal) and the playback device 30B in the bedroom (slave terminal), the master terminal can adjust the elapsed playback time lag of the slave terminals, for example, on a regular basis. Therefore, the same content can suitably played back in synchronization among a plurality of the playback devices 30.

Hereinabove, the content synchronized playback method used for synchronized playback by a plurality of the playback devices 30 in the home network system 1 according to the present embodiment has been described. In the embodiment, of the plurality of the playback devices 30 that perform streaming-playback while receiving content from the server device 20, the playback device 30A that has already been playing back the content is used as the master terminal. This master terminal executes all the time management necessary for the synchronized playback, and controls other playback devices 30 as the slave terminals. In consequence, the synchronized playback can be achieved easily.

The aforementioned method is significantly different from the synchronized playback method according to the related art in which the server device performs strict time management and delivers the same content to the plurality of playback terminal devices from the server device by using multicast transmission. In the present embodiment, even during synchronized playback, the server device 20 does not perform time management for synchronization or playback control of the respective playback devices 30, and simply transmits content individually to each playback device 30 in response to a transmission request from each playback device 30. Therefore, the unicast transmission can be utilized to deliver the content to each playback device 30 from the server device 20. Accordingly, in the present embodiment, in addition to an exclusive router that is compatible with multicast, a general router can be used as a router to wire-connect the server device 20 and the playback devices 30. This increases flexibility in terms of router type and performance. Furthermore, even when content is transferred through a wireless LAN or the like that is not compatible with a high-rate multicast transfer, correct synchronized playback operation can be achieved.

In addition, all time management is executed at the master terminal side, and the slave terminals simply need to operate in response to a command from the master terminal. Therefore, the functions and processing load of the slave terminals can be reduced. As described above, in the present embodiment, the synchronized playback can be achieved by a simpler method without having to execute time management on the slave terminal side. Therefore, this method is effective in a situation where strict time management is not required, such as, in particular, when music is played back in synchronization among terminals provided in different rooms at a house party.

Method for switching playback control authority between the master terminal and the slave terminal Next, a description will be given of a method for switching, among a plurality of the playback devices 30, the playback device 30 (master terminal) that possesses playback control authority to control the other playback devices 30 (a method for disentitling and entitling the playback control authority with respect to any of the playback devices 30).

With the synchronized playback control method described above, a user can perform a playback control operation on only the playback device 30 (master terminal) that is set to the master mode. The playback devices 30 (slave terminals) set to the slave mode provided in other rooms only operate in response to commands from the master terminal. Therefore, the playback control operation cannot be performed on the slave terminals.

However, if the playback device 30 that the user can use to perform the playback control is limited to the master terminal, when the user is in another room which is not provided with the master terminal, it is inconvenient because the user cannot perform synchronized playback operations such as playback track switching and synchronized playback stop. Therefore, it is desirable to provide, as in the present embodiment described below, a method for switching the slave terminal to the master terminal and, correspondingly, switching the original master terminal to the slave terminal. With this method, a selected slave terminal can be switched to the master terminal, thus allowing the user to perform the playback control operation without actually going to the place where the master terminal is located.

(1) Method for Switching Synchronized Playback Control Authority

Now, referring to FIG. 13, a description will be given of the overview of a method for operating a slave terminal during performance of the synchronized playback mode according to the embodiment, to withdraw the slave terminal from the synchronized playback mode (party mode). An example of FIG. 13 illustrates a case in which the playback device 30B in the bedroom is withdrawn from the synchronized playback mode when content A is being played back in synchronization by the playback device 30A in the living room (master terminal) and the playback devices 30B and 30C in the bedroom and the kitchen (slave terminals) as a result of starting the synchronized playback in the example of FIG. 7.

As shown in FIG. 13, the playback devices 30A, 30B, and 30C in the living room, the bedroom, and the kitchen play back in synchronization, while receiving the same content A from the server device 20 (Step S900).

In this case, the playback devices 30B and 30C in the bedroom and the kitchen are set to the slave mode. Therefore, operable keys (effective operation keys) are restricted to a power key (power buttons 40 and 50 in FIGS. 4 and 5) and a specific playback control operation key (such as the playback stop buttons 33 and 43 in FIGS. 4 and 5) for canceling the slave mode. That is, a power ON/OFF command for the playback stop buttons 33 and 43 as well as a playback control command (such as a playback stop command to the playback stop buttons 33 and 43) for a specific playback control key can be operated for the playback devices 30B and 30C in the bedroom and the kitchen (slave terminals) that are set to the slave mode. However, the playback control commands for the other playback control keys are inoperable.

In this state, when the user inputs a playback stop command by pressing the playback stop buttons 33 and 43 of the playback device 30B in the bedroom (Step S910), the playback device 30B in the bedroom cancels the slave mode in response to the receiving of the playback stop command, and changes to the normal mode. In addition, the playback device 30B performs processing corresponding to the playback stop command (that is, a playback stop processing of the content A that is being played back).

Subsequently, the playback device 30B in the bedroom transmits a slave mode cancellation notification to the playback device 30A in the living room which is the master terminal to notify the playback device 30A that the playback device 30B is withdrawing from the synchronized playback mode (Step S920). Then, in response to the receiving of the slave mode cancellation notification, the playback device 30A in the living room (master terminal) cancels the slave registration of the playback device 30B in the bedroom (Step S930).

Next, referring to FIG. 14, a description will be given of the overview of a method for switching, subsequent to the processing in FIG. 13, the master terminal that possesses the synchronized playback control authority from the playback device 30A in the living room to the playback device 30B in the bedroom.

Referring to FIG. 14, the playback device 30A in the living room (master terminal), which is continuously performing the synchronized playback mode, and the playback device 30C in the kitchen (slave terminal) play back in synchronization, while receiving the same content A from the server device 20 (Step S1000). Meanwhile, all the operation keys on the playback device 30B in the bedroom that is placed in the normal mode are effective. Therefore, in accordance with a content selection operation by the user, the content list can be obtained by re-connecting to the server device 20 as necessary, and then desired content can be played back independently. In this case, the playback device 30B in the bedroom plays back, while receiving content B from the server device 20. In this case, the content B differs from the content A that is currently being played back in synchronization (Step S1010).

In this state, when the user inputs a synchronized playback command by pressing the synchronized playback buttons 31 and 41 of the playback device 30B in the bedroom (Step S1020), the playback device 30B in the bedroom changes from the normal mode to the master mode of the synchronized playback mode in response to the receiving of the synchronized playback command. Consequently, the playback device 30B in the bedroom becomes the master terminal. Note that the synchronized playback command corresponds to 'the command to set the playback device 30B to the master mode'.

Subsequently, the playback device 30B in the bedroom simultaneously transmits search information (search message) to search for any other playback devices 30 that are going to join in the synchronized playback to the other playback devices 30A and 30C that are connected to the playback device 30B in the bedroom through the LAN 10 (Step S1030). The search information corresponds to 'information that indicates that the playback device 30B is set to the master mode'. By transmitting the search information, the other playback devices 30A and 30C can be informed that the playback device 30B is set to the master mode.

Upon receiving the search information from the playback device 30B in the bedroom, the playback device 30A in the living room (master terminal) and the playback device 30C in the kitchen (slave terminal), when allowed to become the slave terminals of the synchronized playback, transmit to the playback device 30B in the bedroom a joining response (response message) that indicates that the playback device 30A, 30C are going to join in the synchronized playback with the playback device 30B in the bedroom (Step S1040). Note that any of the playback device 30 that are not allowed to become a slave terminal of the synchronized playback do not transmit a joining response in reply to the search information. Note that, the joining response corresponds to 'information that indicates that the playback devices 30A and 30C are set to the slave mode'. By transmitting the joining response, the playback device 30B which is the master terminal can be informed that the playback devices 30A and 30C are set to the master mode.

Furthermore, the playback device 30A in the living room which transmitted the joining response is automatically switched from the master mode to the slave mode to become the slave terminal of the playback device 30B in the bedroom (Step S1050). On the other hand, the playback device 30C which transmitted the joining response and which was originally in the slave mode in which the playback device 30A in the living room serves as the master terminal, is changed to the slave mode in which the playback device 30B in the bedroom serves as the master terminal. Moreover, the playback devices 30B and 30C stop playback of the content A which is being played back in synchronization. Thereafter, the content B is played back in synchronization by using the playback device 30B in the bedroom as the master terminal and the playback device 30A in the living room and the playback device 30C in the kitchen as the slave terminals.

Figure 15:
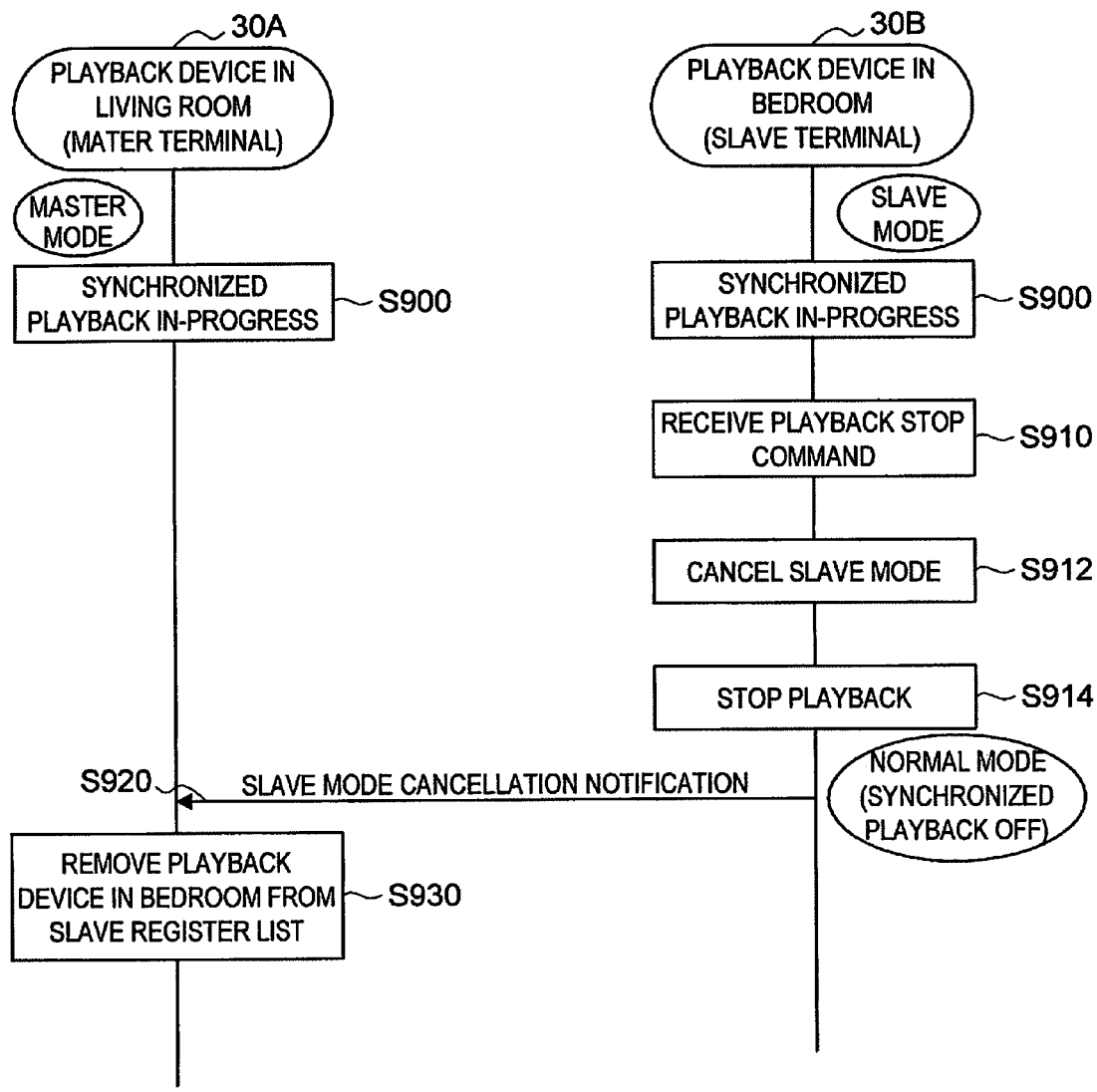
FIG. 15 is a flow chart that shows the playback control method that is used when the playback device withdraws from the slave mode according to the present embodiment.
Figure 16A:
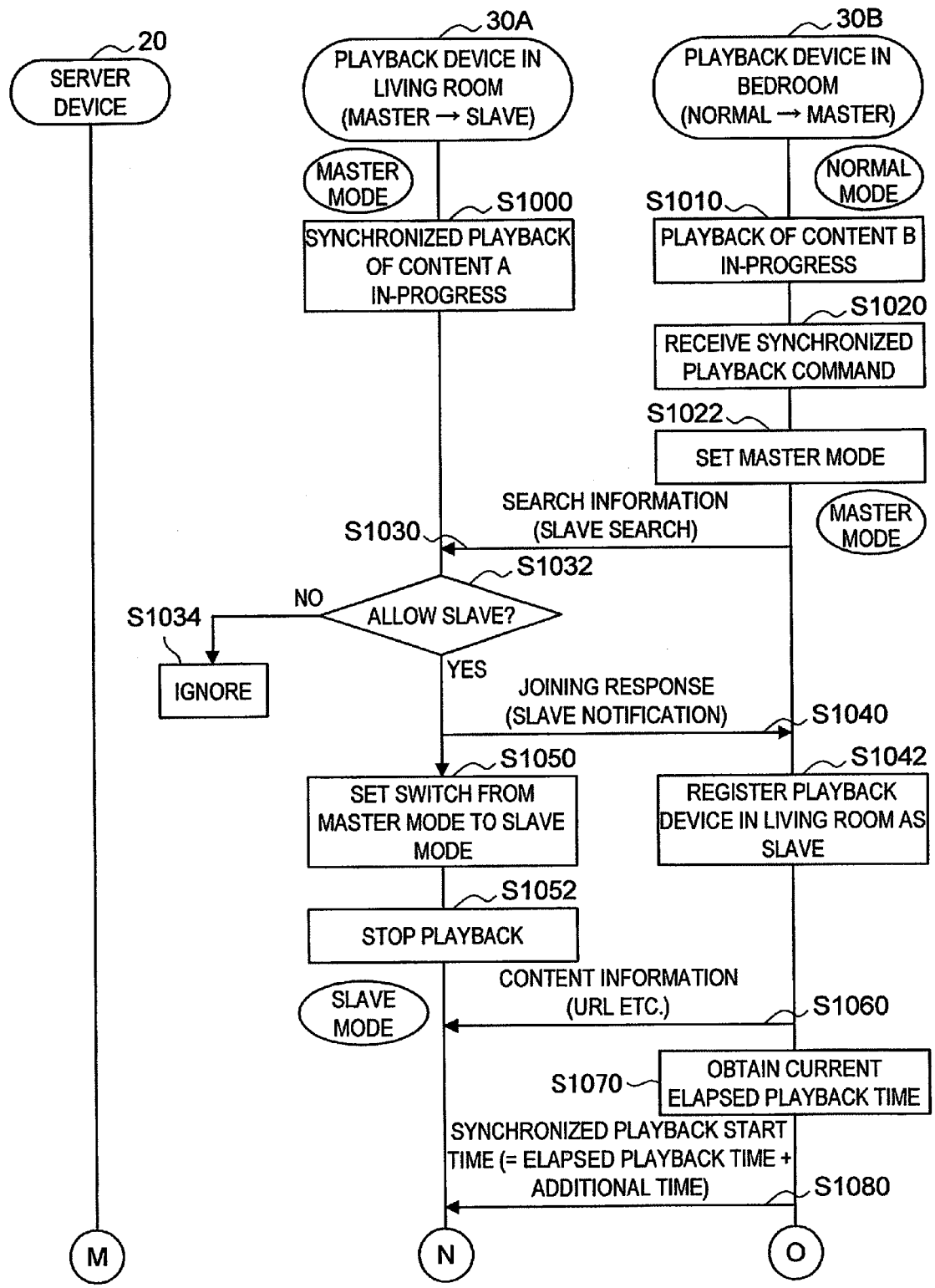
FIG. 16A is a flow chart that shows the playback control method that is used when switching the master terminal and the slave terminal according to the present embodiment.

Next, referring to FIGS. 15 and 16, a detailed description will be given of a playback control method for switching the synchronized playback control authority in the case shown in FIGS. 13 and 14. FIG. 15 is a flowchart which illustrates a playback control method that is used when a playback device 30 in accordance with the present embodiment withdraws from the slave mode. FIG. 16 is a flowchart which illustrates a playback control method for making the playback device 30 in accordance with the present embodiment a master terminal and switching the original master terminal to a slave terminal.

Referring to FIG. 15, the playback device 30A in the living room (master terminal) and the playback device 30B in the bedroom (slave terminal), while receiving the same content A from the server device 20, play back in synchronization the received content (Step S900). In this case, the playback device 30A in the living room is set to the master mode, and possesses synchronized playback control authority over other playback devices 30 (slave terminals). On the other hand, the playback device 30B in the bedroom is set to the slave mode, and serves as a slave terminal that has its playback controlled by the playback device 30A in the living room.

In this state, when the user inputs a playback stop command by pressing the playback stop buttons 33 and 43 of the playback device 30B in the bedroom, the playback device 30B in the bedroom receives the playback stop command as an effective command (Step S910). In this case, the playback stop buttons 33 and 43 are used as specific playback control buttons to withdraw the playback device 30B in the bedroom from the synchronized playback mode (party mode). Furthermore, in response to the receiving of the playback stop command, the playback device 30B in the bedroom cancels the slave mode of the synchronized playback mode, and sets the mode to the normal mode (Step S912). Moreover, the playback device 30B stops playback of the content A which is being played back in synchronization (Step S914). As described above, the playback stop buttons 33 and 43 of the playback device 30 in the slave mode include a function to input a playback stop command to stop content playback, and a function to input a cancel command to cancel the slave mode.

In addition, by canceling the slave mode of the playback device 30B in the bedroom and switching it to the normal mode, the playback control buttons (such as the playback buttons 32 and 42 and the pause buttons 34 and 44) other than the playback stop buttons 33 and 43 of the playback device 30B in the bedroom become effective. Also, when the slave mode is set, a display screen which shows that the slave mode is set is output to the display portion 332 of the playback device 30B in the bedroom. Meanwhile, when the slave mode is cancelled and the normal mode is set, the screen display accordingly changes to a normal display.

Thereafter, the playback device 30B in the bedroom transmits a slave mode cancellation notification to the playback device 30A in the living room which is the master terminal to provide notification that the playback device 30B has withdrawn from the synchronized playback mode (Step S920). Upon receiving the slave mode cancellation notification from the playback device 30B in the bedroom, the playback device 30A in the living room (master terminal) deletes information that pertains to the playback device 30B in the bedroom from the slave registration list 349 that is held by the playback device 30A to cancel the slave registration of the playback device 30B in the bedroom (Step S930).

Next, referring to FIG. 16, a description will be given of a playback control method for switching the playback control mode between the playback device 30A in the living room and the playback device 30B in the bedroom.

Referring to FIG. 16, the playback device 30A in the living room (master terminal) which is continuously performing the synchronized playback mode and the playback device 30C in the kitchen (slave terminal), play back in synchronization, while receiving the same content A from the server device 20 (Step S1000). On the other hand, the playback device 30B in the bedroom which has withdrawn from the slave mode and switched to the normal mode at Step S912 plays back, while receiving content B that differs from the content A that is currently being played back in synchronization (Step In this state, when the user inputs a synchronized playback command by pressing the synchronized playback button 31 or 41 (party mode button) of the playback device 30B in the bedroom to make it the master terminal, the playback device 30B in the bedroom receives the synchronized playback command (Step S1020). Furthermore, in response to the receiving of the synchronized playback command, the playback device 30B in the bedroom switches the playback control mode of the playback device 30B from the normal mode to the master mode of the synchronized playback mode (Step S1022). Consequently, the playback device 30B in the bedroom becomes the master terminal of the synchronized playback.

Thereafter, in order to search for slave terminals, the playback device 30B in the bedroom simultaneously transmits, to other playback devices 30 that are currently active and connected to the LAN 10, search information to search for any of the playback devices 30 that are allowed to be placed in the slave mode (Step S1030).

Subsequently, upon receiving the search information from the playback device 30B in the bedroom, the playback device 30A in the living room determines whether or not to allow itself to be placed in the slave mode of the synchronized playback mode (that is, whether or not to allow itself to become a slave terminal of the playback device 30B in the bedroom), based on the setting information that is pre-stored in the setting information storage portion 348 (Step S1032). As a result, if the slave mode is not allowed, the playback device 30A in the living room ignores the search information and does not transmit a response to the playback device 30B in the bedroom (Step S1034). On the other hand, if the slave mode is allowed, the playback device 30A in the living room transmits a joining response that indicates that the playback device 30A is going to join in the synchronized playback to the playback device 30B in the bedroom which transmitted the search information, based on address information of the playback device 30B in the bedroom included in the search information (Step S1040).

Furthermore, the playback device 30A in the living room switches the playback control mode thereof from the master mode to the slave mode (Step S1050). Moreover, the playback device 30A in the living room stops playback of the content A that is currently being played back (Step S1052).

Meanwhile, upon receiving the joining response in reply to the search information from one or more other playback devices 30 including the playback device 30A in the living room, the playback device 30B in the bedroom registers the playback device 30A in the living room that transmitted the joining response in the slave registration list 349 as a slave terminal (Step S1042).

Figure 16B:
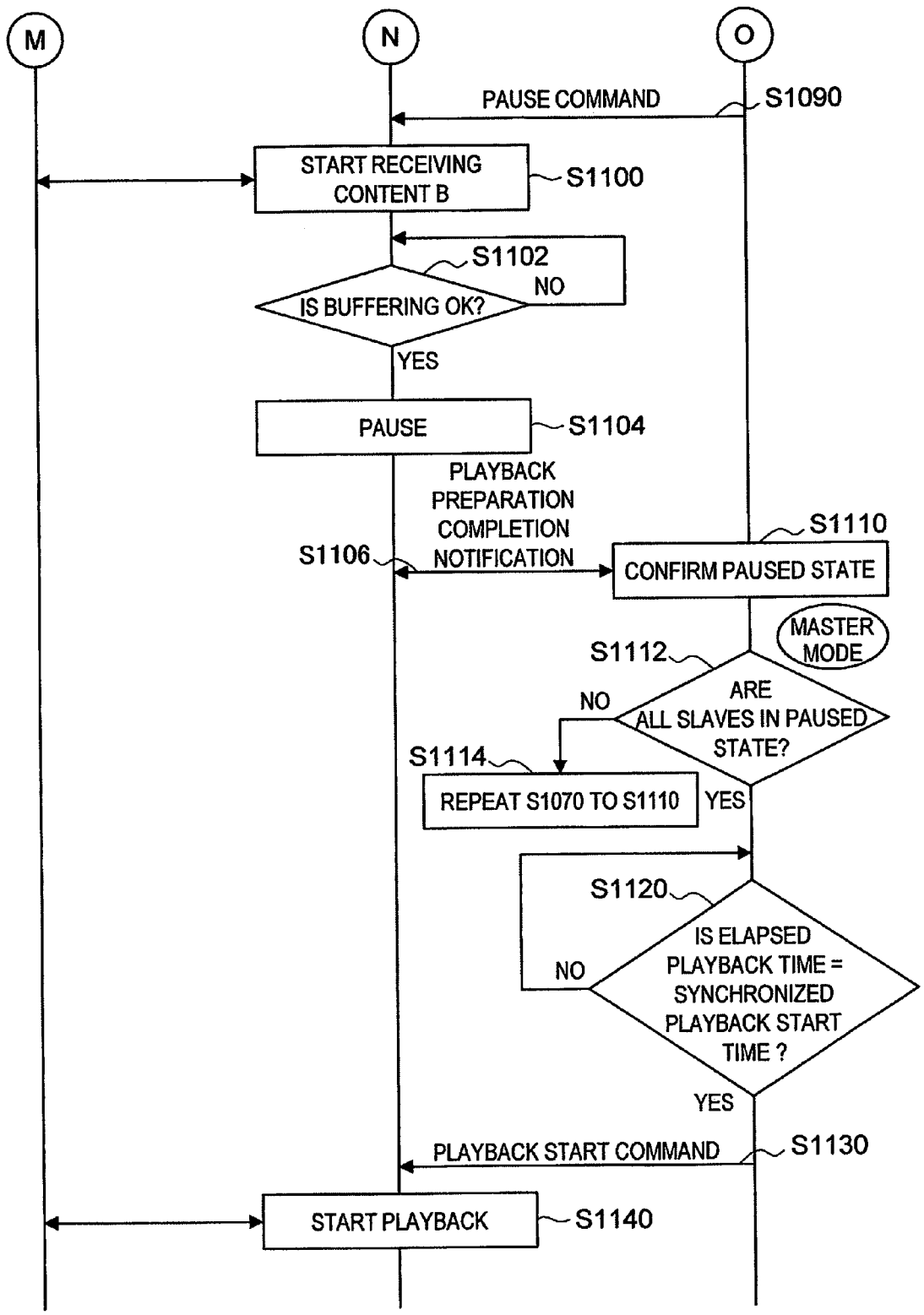
FIG. 16B is a flow chart that shows the playback control method that is used when switching the master terminal and the slave terminal according to the present embodiment.

Thereafter, the playback device 30B in the bedroom transmits, to the playback device 30A in the living room, content information that pertains to the content B that is currently being played back on the playback device 30B (for instance, the URL of the content B) (Step S1060). Furthermore, the playback device 30B in the bedroom obtains the elapsed playback time for the content that is being played back, at a selected point of time after the content transmission (Step S1070). Then, the playback device 30B in the bedroom calculates the synchronized playback start time by adding the preset additional time to the obtained elapsed playback time, and transmits information that indicates the synchronized playback start time to the playback device 30A in the living room (Step S1080). Subsequently, as shown in FIG. 16B, the playback device 30B transmits a pause command to the playback device 30A in the living room (Step S1090). The playback device 30A in the living room receives the content information, the information that indicates the synchronized playback start time, and the pause command that are transmitted from the playback device 30B in the bedroom.

Thereafter, in response to the receiving of the pause command, based on the content information (such as the URL) and the synchronized playback start time received from the playback device 30B in the bedroom, the playback device 30A in the living room starts receiving, from the server device 20, data that begins from the synchronized playback start time of the content B that is being played back on the playback device 30B in the bedroom (Step S100).

Then, the playback device 30A in the living room temporarily stores (buffers) in the receiving buffer 344 the data that begins from the synchronized playback start time of the content B which is received from the server device 20. When the data temporarily stored in the receiving buffer 344 reaches or exceeds the specified volume necessary for suitable playback operation (Step S1102), the playback preparation is completed and the paused state is entered (Step S1104). Subsequently, in response to the receiving of a state reference signal from the playback device 30B in the bedroom, the playback device 30A in the living room transmits the playback preparation completion notification for the content B to the playback device 30B in the bedroom (Step S1106). The playback device 30B in the bedroom can confirm that the playback preparation is completed by the playback device 30A in the living room as a result of receiving the playback preparation completion notification (Step S1110).

Then, the playback device 30B in the bedroom confirms if all of the slave terminals are in the paused state based on whether or not the playback preparation completion notification has been received from all of the slave terminals (including the playback device 30A in the living room) that are registered in the slave registration list 349 (Step S1112). As a result, if there is a slave terminal that has not completed the playback preparation within the synchronized playback start time that is set at Step S1080 and thus has not yet been placed in the paused state, the controls at Steps S1070 to S1110 are repeatedly performed for the slave terminal that is not yet in the paused state. In this case, by resetting the preset additional time of the synchronized playback start time to an increased length of time, more time can be given to the slave terminals for playback preparation, thereby making fully sure that the slave terminals are placed in the paused state.

After the confirmation above, when the current elapsed playback time for the content B that is being played back on the playback device 30B in the bedroom reaches the synchronized playback start time set at Step S1080 (Step S1120), the playback device 30B transmits a playback start command to the playback device 30A in the living room (Step S1130). The playback device 30A in the living room, upon receiving the playback start command from the playback device 30B in the bedroom, cancels the paused state and starts playback of the data that begins from the synchronized playback start time of the content B in the receiving buffer 344 (Step S1140).

Note that the aforementioned Steps S1060 to S1140 are substantially equivalent to Steps S160 to S240 in FIG. 8. Therefore, a detailed description thereof is omitted.

Hereinabove, the method for switching between the master terminal and the slave terminal in the synchronized playback control according to the present embodiment is described. With this method, by operating the playback stop buttons 33 and 43 of the playback device 30B in the bedroom which is set to the slave mode, the user can withdraw the playback device 30B in the bedroom from the synchronized playback mode in which the playback device 30A in the living room is the master terminal, and change the mode to the normal mode which is not subject to control by any other of the playback devices 30.

Furthermore, in the present embodiment, even if the playback device 30A has already been set to the master mode, when another playback device 30B is set to the master mode thereafter, the playback device 30B that was set to the master mode at a later timing becomes the master terminal whereas the original master terminal is switched to the slave terminal. In this manner, the playback device 30B in the bedroom becomes the master terminal and the playback device 30A in the living room is switched to the slave terminal. Consequently, seamless switching of the master terminal can be achieved while maintaining the party mode (synchronized playback mode).

(2) Method for Switching Playback Switching Control Authority

Hereinabove, the method for switching the synchronized playback control authority when performing synchronized playback by a plurality of the playback devices 30 is described. However, the method for switching playback control authority according to the embodiment of the present invention is not limited to the aforementioned example of the synchronized playback control authority, and is also applicable to other playback control authorities. Hereafter, for example, a description will be given of a method for switching playback switching control authority to switch content playback operation among playback devices 30.

As described above, in the content playback switching processing, playback information that pertains to content that is being played back is exchanged among a plurality of the playback devices 30 connected to a network such as the LAN 10, thereby switching, among the playback devices 30, the subject device that performs the content playback operation. With this playback switching processing, the content playback operation by one of the playback devices 30 (a switching source playback device 30) can be switched seamlessly to another playback device 30 (a switching destination playback device 30) while taking over the playback mode of the playback operation, the elapsed playback time, and the like.

Now, referring to FIG. 17, a description will be given of a content playback switching processing that is used for switching between the playback devices 30 in the home network system 1 according to the embodiment. FIG. 17 is a flowchart which illustrates a playback switching control method for switching between the playback devices 30 according to the embodiment. Note that the following description illustrates an example for switching a playback operation between the playback device 30A in the living room and the playback device 30B in the bedroom.

Referring to FIG. 17, the playback device 30A in the living room where the user is plays back while sequentially receiving a plurality of content files from the server device 20 (Step S1210). In this case, the playback operation of the playback device 30B in the bedroom is, for example, stopped (Step S1212).

In this state, when the user operates the input portion 330 of the playback device 30A in the living room to select the playback device 30B in the bedroom as a playback switching destination, and inputs a move switching command (for example, pressing the playback switching button), the playback device 30A in the living room receives the move switching command (Step S1220). Furthermore, upon receiving the move switching command, the playback device 30A in the living room sets the playback control mode thereof to the master mode of the playback switching mode (Step S1221). Consequently, the playback device 30A in the living room becomes a master terminal that possesses playback switching control authority over the other playback devices 30.

Subsequently, the playback device 30A in the living room determines the switching destination playback device 30 (Step S1222). In this determination processing, when the switching destination playback device 30 is selected by the user at the time of the switching command input at Step S1220, the switching destination playback device 30 is determined based on the user's selection.

On the other hand, when the switching destination playback device is not selected by the user at Step S1220, the playback device 30A in the living room searches for other playback devices 30 that are connected to the LAN 10 to identify the switchable playback devices. From the identified playback devices 30, the playback device 30A determines the switching destination playback device 30 based on the user's selection. For example, the playback device 30A in the living room searches for other currently-active playback devices 30 that are connected to the LAN 10, and displays the results in a list as candidates for switching destination playback devices. Then, when a user who has browse s the list selects one of the switching destination playback device 30 from the menu, the playback device 30A in the living room determines the switching destination playback device 30 in accordance with the user's selection.

The search for and determination of each playback device 30 on the LAN 10 is performed based on an identifier (such as a UUID and a MAC address) that is assigned specifically to each of the respective playback devices 30. In this case, when the playback device 30A in the living room transmits search information on the LAN 10, the playback device 30B in the bedroom which is connected to the LAN 10 sends back the identifier corresponding thereto to the playback device 30A in the living room as a response for the search information. Accordingly, the playback device 30A in the living room can recognize the playback device 30B in the bedroom which is connected to the LAN 10.

Furthermore, when displaying the list of the candidates for switching destination playback devices 30, a name (friendly name) of the playback device 30 which is associated with the identifier of the playback device 30 can be displayed. The friendly name can be set freely by the user and be registered in the setting information storage portion 348. For example, the friendly name that indicates the playback device 30B in the bedroom can be set to 'bedroom' or the like. Accordingly, the user can easily identify the candidates for switching destination playback devices 30. Note that the explanation below assumes that the playback device 30B in the bedroom is determined at Step S1222 as the switching destination playback device 30.

Moreover, the playback device 30A in the living room writes in the slave registration list 349 the information (such as an IP address and a UUID) related to the playback device 30B in the bedroom that is determined as the switching destination playback device 30, so as to register the playback device 30B in the bedroom as the slave terminal.

Subsequently, the playback device 30A in the living room creates and stores playback information that pertains to content that is currently being played back on the playback device 30A (Step S1224). More specifically, the playback device 30A reads currently-set playback mode information from the setting information storage portion 348. Also, the playback device 30A reads, from the content information storage portion 346, attribute information (such as the URL and the title) of content that is currently being played back on the playback device 30A. Furthermore, the playback device 30A obtains the elapsed playback time for the content that is currently being played back. Then, the playback information including the playback mode information and the attribute information and elapsed playback time for the content are stored in a RAM or the like.

In addition, the playback device 30A in the living room stops playback of the content that is being played back, for instance, immediately after the playback information is stored at Step S1224 (Step S1230). Note that the playback stop processing at Step S1230 can be performed at a selected timing such as after playback information transmission (S1240) or after a playback confirmation processing (S1254) which will be explained later.

Thereafter, the playback device 30A in the living room transmits the created playback information to the playback device 30B in the bedroom which is the switching destination playback device. Then, the playback device 30B in the bedroom receives the playback information (Step S1240). Moreover, in response to the receiving of the playback information, the playback device 30B in the bedroom sets the playback control mode thereof to the slave mode of the playback switching mode (Step S1241). Consequently, the playback device 30B in the bedroom becomes a slave terminal that has its playback controlled by the playback device 30A in the living room which is the master terminal.

Subsequently, based on playback mode information included in the received playback information, the playback device 30B in the bedroom sets the playback mode thereof to the same playback mode (repeat or no repeat, the unit of repetition, shuffle or no shuffle, the playback range for continuous playback, and the like) as the switching source playback device 30A (Step S1242).

Furthermore, based on server information included in the playback information, the playback device 30B in the bedroom identifies the server device 20 that transmitted the content that had been played back on the switching source playback device 30A. Then, the playback device 30B accesses the server device 20 (Step S1244). More specifically, if a plurality of the server devices 20 exist on the LAN 10, for instance, the playback switching control portion 328 of the playback device 30B, upon receiving of the playback information, compares the identity of the server device 20 that corresponds to the server information (such as a UUID) included in the playback information and the server device 20 that is currently connected to the playback device 30B. If the identity is not confirmed, the playback switching control portion 328 controls the playback device 30B to re-access and reconnect to the server device 20 that corresponds to the server information.

Thereafter, based on playback range information included in the playback mode information, the playback device 30B in the bedroom obtains from the server device 20 a list of the content attribute information (including the URL and the title of each content) by, for example, genre, artist, album and the like (Step S1246). By obtaining the list, the playback device 30B in the bedroom can sequentially receive and play back a plurality of the content files from the server device 20 in the same playback mode as that of the playback device 30A in the living room. More specifically, when the mode is the playback mode in which content of a certain genre is continuously played back, the playback device 30B in the bedroom firstly obtains a list of artists that belong to the relevant genre from the server device 20. Then, the playback device 30B selects one artist from the list, and obtains an album list of the artist (for example, including an album title and information of number of tracks in the album). Thereafter, the playback device 30B selects one album from the list, and further obtains a list of tracks in the album (including the URL and a track title of each piece of content). Furthermore, the playback device 30B selects one track from the list, and then requests the server device 20 for transmission of content of the track.

Subsequently, the playback device 30A in the living room transmits a playback start command to the playback device 30B in the bedroom (Step S1248). Note that the transmission timing of the playback start command is not restricted to the timing at Step S1252, and for example, can be a selected timing between the playback information transmission processing (S1240) and the list acquisition processing (S1246). Also, instead of transmitting the playback start command from the playback device 30A to the playback device 30B, the function of the playback start command can be substituted with the playback information transmission processing (S1240).

Then, in response to the receiving of the playback start command, the playback device 30B in the bedroom receives and starts playing back content from the server device 20 (Step S1250). More specifically, the playback device 30B in the bedroom identifies content to be played back and its playback start position on the basis of the content attribute information and elapsed playback time included in the playback information. Thereafter, the playback device 30B requests the server device 20 to transmit the identified content from the playback start position. In response to the transmission request, the server device 20 stream-transmits data that begins from the elapsed playback time for the content. Then, the playback device 30A in the living room receives from the server device 20 the data that begins from the elapsed playback time for the content, and temporarily stores the data in the receiving buffer 344. Furthermore, the playback device 30A D/A-converts the content read from the receiving buffer 344 by the D/A converter 350 into analog playback signals, and outputs them from the speaker 352.

Moreover, after the start of content playback, in addition to the content that is being played back on the playback device 30A, content (such as other content in the album) that follows the current content is sequentially played back in accordance with the playback mode set at S1242.

Then, after the start of the content playback, the playback device 30B in the bedroom transmits a playback start notification to the playback device 30A in the living room (Step S1252). The playback device 30A in the living room confirms that playback has been started by the switching destination playback device 30B by receiving the playback start notification (Step S1254).

As described above, in accordance with the playback switching method shown in FIG. 17, simply by performing an easy operation on the playback device 30A in the living room, a user can seamlessly switch the content playback operation from the playback device 30A in the living room to the playback device 30B in the bedroom, without operating the playback device 30B in the bedroom.

Next, referring to FIG. 18, a description will be given of a playback control method for switching, after the processing in FIG. 17, the master terminal that possesses the playback switching control authority from the playback device 30A in the living room to the playback device 30B in the bedroom.

Referring to FIG. 18A, since the playback device 30A in the living room (master terminal) switched the playback operation to the playback device 30B in the bedroom in the processing in FIG. 17, the playback device 30A is stopped (Step S1300). On the other hand, the playback device 30B in the bedroom (slave terminal), while sequentially receiving a plurality of content files from the server device 20, is playing back the received content (Step S1302). In this case, the playback device 30A in the living room is set to the master mode, and possesses playback switching control authority over the other playback devices 30 (slave terminals). Meanwhile, the playback device 30B in the bedroom is set to the slave mode, and thus is a slave terminal that is controlled by the playback device 30A in the living room.

In this state, when the user inputs a playback stop command by pressing the playback stop buttons 33 and 43 of the playback device 30B in the bedroom as specific playback control buttons to remove the playback device 30B in the bedroom from the playback switching mode, the playback device 30B in the bedroom receives the playback stop command as an effective command (Step S1310). Furthermore, in response to the receiving of the playback stop command, the playback device 30B in the bedroom cancels the slave mode and sets the mode thereof to the normal mode (Step S1320). Moreover, the playback device 30B stops playback of the content which has been taken over from the playback device 30A in the living room and which is currently being played back (Step S1330). As described above, the playback stop buttons 33 and 43 of the playback device 30 in the slave mode have a function to input the playback stop command to stop the content playback as well as a function to input a cancel command to cancel the slave mode. In addition, by cancelling the slave mode of the playback device 30B in the bedroom to switch over to the normal mode, the playback control buttons (such as the playback buttons 32 and 42 and the pause buttons 34 and 44) other than the playback stop buttons 33 and 43 of the playback device 30B in the bedroom become effective.

Subsequently, the playback device 30B in the bedroom transmits a slave mode cancellation notification to the playback device 30A in the living room which is the master terminal in order to notify that the playback device 30B has been removed from the playback switching mode (Step S1340). Once the slave mode cancellation notification is received from the playback device 30B in the bedroom, the playback device 30A in the living room (master terminal) deletes information that pertains to the playback device 30B in the bedroom from the slave registration list 349 that is held by the playback device 30A. Consequently, the slave registration of the playback device 30B in the bedroom is cancelled (Step S1350).

Then, in order to listen to desired content with the playback device 30B in the bedroom, the user inputs a content selection command and a playback start command by operating a playback control button or the like of the playback device 30B in the bedroom. Then, the playback device 30B in the bedroom receives the content selection command and the playback start command (Step S1360). Thereafter, the playback device 30B in the bedroom requests the server device 20 to transmit the selected content, and receives and plays back the content from the server device 20 (Step S1370).

Figure 18B:
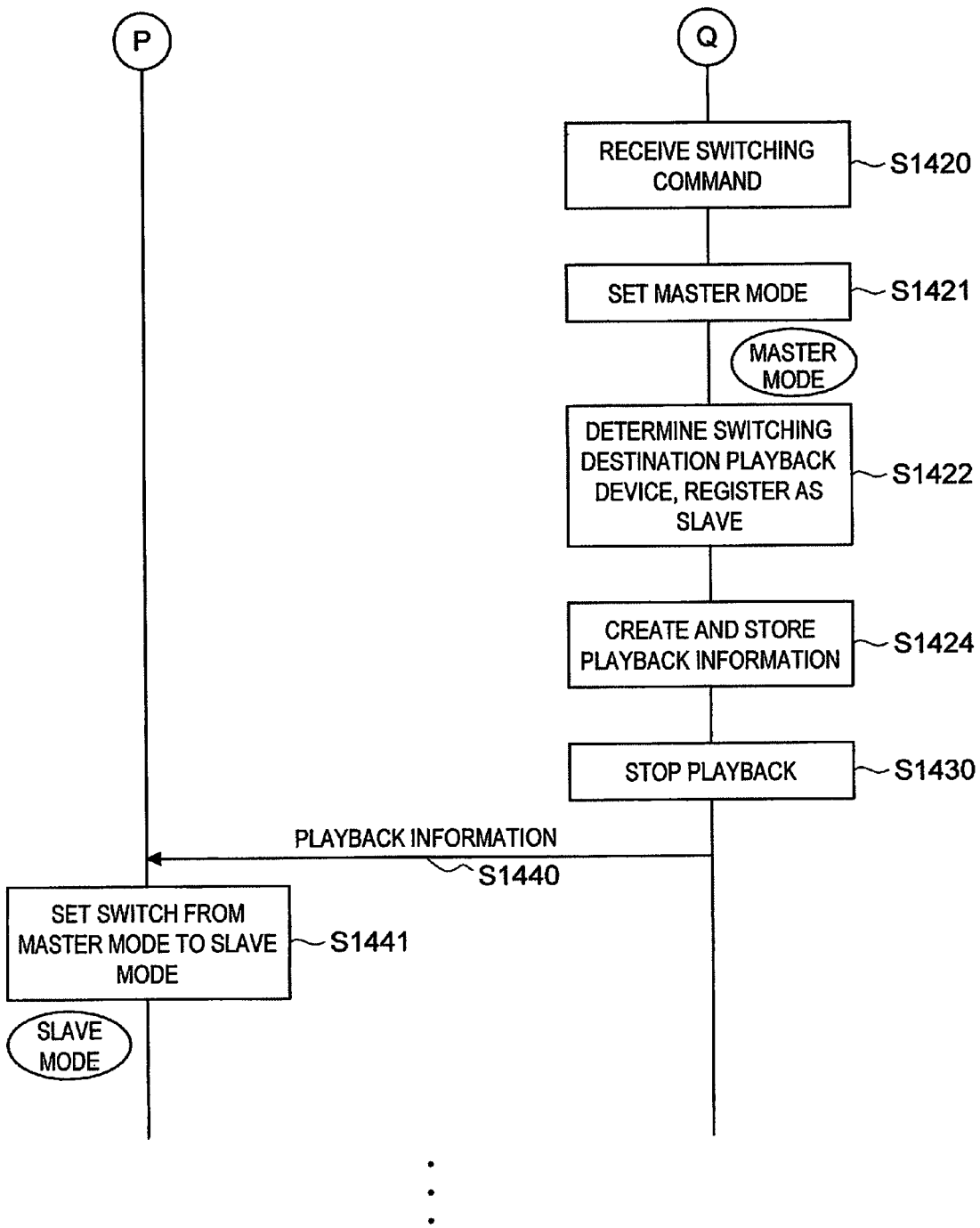
FIG. 18B is a flow chart that shows the playback control method that is used when switching the master terminal and the slave terminal according to the present embodiment.

In this state, as shown in FIG. 18B, when the user inputs a switching command by pressing a switching button of the playback device 30B in the bedroom so as to switch the content playback operation by the playback device 30B in the bedroom to another playback device 30, the playback device 30B in the bedroom receives the switching command (Step S1420). Furthermore, in response to the receiving of the switching command, the playback device 30B in the bedroom switches the playback control mode thereof from the normal mode to the master mode of the playback switching mode (Step S1421). Consequently, the playback device 30B in the bedroom becomes the master terminal that performs the playback switching control.

Subsequently, in a similar manner as in the processing at Step S1222, the playback device 30B in the bedroom determines a switching destination playback device 30 (Step S1422). In this case, it is assumed that the playback device 30A in the living room is determined as the switching destination playback device 30. Furthermore, the playback device 30B in the bedroom writes, in the slave registration list 349, information that pertains to the playback device 30A in the living room which is determined as the switching destination playback device 30. By this processing, the playback device 30B in the bedroom is registered as the slave terminal.

Thereafter, the playback device 30B in the bedroom creates and stores playback information that pertains to the content that is currently being played back on the playback device 30B (Step S1424), and stops playback of the content that is being played back (Step S1430). Then, the playback device 30B transmits the created playback information to the playback device 30A in the living room which is the switching destination playback device 30 (Step S1440).

Upon receiving the playback information from the playback device 30B in the bedroom, the playback device 30A in the living room switches the playback control mode thereof from the master mode to the slave mode (Step S1441). Thereafter, processing similar to that at Steps S1242 to S1252 in FIG. 17 is performed, and the content that has been played back on the playback device 30B in the bedroom is played back on the playback device 30A in the living room.

In accordance with the method for switching the master terminal and the slave terminal in the playback switching control as described above, the playback device 30B in the bedroom which is the slave terminal is switched to the master terminal. Correspondingly, the playback device 30A in the living room is switched from the master terminal to the slave terminal. Consequently, the master terminal can be seamlessly switched while maintaining the content playback operation.

Hereinabove, a description is given of the playback control method for switching the master terminal and the slave terminal by disentitling or entitling the playback control authority among a plurality of playback devices 30 according to the present embodiment. In accordance with the embodiment, an operation key (such as the playback stop button) for inputting a specific playback control command is operated on the playback device 30 that is set to the slave mode. With this operation, the playback control corresponding to the operation key can be performed by the playback device 30, and the slave mode can be cancelled. Furthermore, an operation input such as the synchronized playback command and the playback switching command is input to the playback device 30, thereby setting the playback device 30 to the master mode. As a result of this, other playback devices 30 that were originally set to the master mode can be automatically set to the slave mode.

Therefore, a user can operate the playback device which is the slave terminal to switch it to the master terminal. In accordance with this, the original master terminal can be automatically switched to the slave terminal. Therefore, it is convenient for the user since the switching between the master terminal and the slave terminal as well as performance of the content playback control (such as playback stop and switching of content to be played back) can be easily performed by operating a slave terminal nearby without going to the place where the master terminal is located.

Furthermore, the user can easily cancel the slave mode of the playback device 30 with a one-touch operation such as operating a specific playback control operation key, and can also perform the playback control corresponding to the operation key.

Furthermore, the synchronized playback processing, the playback switching processing, and master terminal-slave terminal switching processing can be achieved by directly transmitting and receiving control signals and specific information among the multiple playback devices 30 that are connected to the LAN 10 without involving the server device 20. Therefore, there is no need to use a special server for each processing. In consequence, without requiring the special server, each processing operation described above can be performed among the playback devices 30 by a simple operation. Moreover, the server device 20 is not restricted to a specific type made by a specific manufacturer, and maybe a general server.

It should be understood by those skilled in the art that various modifications, combinations, sub-combinations and alterations may occur depending on design requirements and other factors insofar as they are within the scope of the appended claims or the equivalents thereof.

For example, in the embodiment described above, an example was explained in which the server devices 20 as home servers and the playback devices 30 are connected through the LAN 10 for the home network in a home, but the present invention is not limited by this example. For example, the present invention can be used in a case where the server devices 20 and the plurality of the playback devices 30 are mutually connected such that one of wired and wireless communication is possible through a private network other than the home network (for example, a LAN that connects a plurality of devices that are used within a limited, small-scale group (a company, friends, or the like)), a public circuit network such as the Internet, a telephone circuit network, a satellite communications network, or the like, a wireless communications route, or the like.

Furthermore, in the embodiment described above, the server device 20 decodes the compressed content data that is stored on the server device 20 and transmits the uncompressed data to the playback device 30, but the present invention is not limited by this example. For example, the compressed content data that is stored on the server device 20 may also be transmitted to the playback device 30 in its existing form. The playback device 30 may also be provided with a decoder such that the expansion and D/A conversion of the compressed content data that is transmitted from the server device 20 may be done on the playback device 30.

Furthermore, in the embodiment above, the slave mode of the slave terminal is cancelled by inputting the playback stop command (operating the playback stop buttons 33 and 43) as a specific playback control command among a plurality of playback control commands. However, the embodiment of the present invention is not restricted to this example. Accordingly, for instance, the slave mode of the playback device 30 can be cancelled by operating an operation key to input a selected playback control command such as a content playback start command, a pause command, a forward command, a rewind command, and a skip command.

As an example of a specific playback control command for canceling the slave mode, a description will be given of a case in which a playback start command is used. For example, when the user presses the playback buttons 32 and 42 of one of the playback device 30 that is set to the slave mode, the playback device 30 cancels the slave mode and stops playback of content that is being played back in synchronization.

Accordingly, playback of another piece of content which had been played back previously by the playback device 30 in the normal mode can be started.

As another example, the user presses the playback buttons 32 and 42 of the given playback device 30 that is set to the slave mode. Correspondingly, the playback device 30 cancels the slave mode and stops the content that is being played back. In addition, the playback device 30 can set itself to the master mode and notify this to other playback devices 30. Moreover, the playback device 30 may transmit a synchronized playback command to other playback devices 30.

What is claimed is:

1. A content playback system comprising first and second playback devices that are capable of receiving and playing back content data from a server device and are connected by at least a wired connection or a wireless connection, wherein:
   the first playback device comprises:
      a first communication portion to communicate data with the server device and the second playback device;
      a first memory to store content data received from the server device through the first communication portion;
      a first playback portion to play back the content data that is stored in the first memory; and
      a first synchronized playback control portion to synchronize playback of the first playback device with the second playback device, wherein synchronizing playback of the first playback device with the second playback device comprises:
         in response to receiving a synchronized playback command from a user, transmitting to the second playback device, through the first communication portion, information that pertains to the content data being played back by the first playback portion;
         obtaining an elapsed playback time for the content data being played back by the first playback portion at the time of receiving the synchronized playback command;
         calculating a synchronized playback start time by adding a predetermined additional time to the elapsed playback time;
         transmitting the synchronized playback start time to the second playback device through the first communication portion;
         receiving a playback preparation completion notification from the second playback device through the first communication portion; and
         in response to an elapsed playback time for the content data being played back by the first playback portion reaching the synchronized playback start time, transmitting a playback start command to the second playback device through the first communication portion, wherein the playback start command is configured to prompt the second playback device to play back the content data as soon as the playback start command is received, at substantially the same timing at which the first playback device plays back the content data, without requiring the second playback device to measure time prior to beginning playback;
   and
   the second playback device comprises:
      a second communication portion to communicate data with the server device and the first playback device;

a second memory to store content data received from the server device through the second communication portion;

a second playback portion to play back the content data that is stored in the second memory; and a second synchronized playback control portion to synchronize playback of the second playback device with the first playback device, wherein synchronizing playback of the second playback device with the first playback device comprises:

receiving the information and the synchronized playback start time from the first playback device through the second communication portion;

receiving the content data beginning from the synchronized playback start time from the server device and buffering the content data in the second memory;

in response to the content data buffered in the second memory reaching or exceeding a specified amount, transmitting the playback preparation completion notification to the first playback device through the second communication portion; and as soon as the playback start command is received from the first playback device through the second communication portion, using the second playback portion to start playback of the content data already buffered in the second memory beginning from the synchronized playback start time, at substantially the same timing at which the first playback device plays back the content data, without requiring the second playback device to measure time prior to beginning playback.

2. A first playback device comprising:

a communication portion to communicate data with a server device and at least one other playback device;

a memory to store content data received from the server device through the communication portion;

a playback portion to play back the content data that is stored in the memory; and a synchronized playback control portion to synchronize playback of the first playback device with a second playback device, wherein synchronizing playback of the first playback device with the second playback device comprises:

in response to receiving a synchronized playback command from a user, transmitting to the second playback device, through the communication portion, information that pertains to the content data being played back by the playback portion;

obtaining an elapsed playback time for the content data being played back by the playback portion at the time of receiving the synchronized playback command;

calculating a synchronized playback start time by adding a predetermined additional time to the elapsed playback time;

transmitting the synchronized playback start time to the second playback device through the communication portion;

receiving, from the second playback device through the communication portion, a playback preparation completion notification indicating that the second playback device has buffered a specified amount of the content data; and in response to an elapsed playback time for the content data being played back by the playback portion reaching the synchronized playback start time, transmitting a playback start command to the second playback device through the communication portion, wherein the playback start command is configured to prompt the second playback device to play back the buffered content data as soon as the playback start command is received, at substantially the same timing at which the first playback device plays back the content data, without requiring the second playback device to measure time prior to beginning playback.

3. The first playback device according to claim 2, wherein transmitting the information comprises:

in response to receiving the synchronized playback command, transmitting, through the communication portion to at least one other playback device, search information to search for the second playback device to join in synchronized playback; and in response to receiving, from the second playback device through the communication portion, a joining response that indicates that the second playback device will join in synchronized playback, transmitting the information through the communication portion to the second playback device.

4. The first playback device according to claim 2, wherein synchronizing playback of the first playback device with the second playback device further comprises:

in response to receiving a joining request from a third playback device through the communication portion while the first playback device and the second playback device are playing back content data at substantially the same timing, transmitting to the third playback device, through the communication portion, information that pertains to the content data that is being played back and information that indicates a second synchronized playback start time obtained by adding the predetermined additional time to an elapsed playback time for the content data being played back at the time of receiving the joining request;

receiving a playback preparation completion notification from the third playback device through the communication portion; and in response to an elapsed playback time for the content data being played back reaching the second synchronized playback start time, transmitting the playback start command to the third playback device through the communication portion.

5. The first playback device according to claim 2, wherein synchronizing playback of the first playback device with the second playback device further comprises:

transmitting to the second playback device, through the communication portion, information that pertains to next content data;

receiving the next content data through the communication portion from the server device and storing the next content data in the memory;

in response to receiving a next playback preparation completion notification from the second playback device through the communication portion, transmitting a second playback start command for the next content data to the second playback device through the communication portion; and prompting the playback portion to begin playing back the next content data that is stored in the memory.

6. The first playback device according to claim 2, wherein synchronizing playback of the first playback device with the second playback device further comprises:

requesting, while the first playback device and the second playback device are playing back content data at substantially the same timing, an elapsed playback time for the content data from the second playback device;

receiving from the second playback device, through the communication portion, information that indicates the elapsed playback time for the content data being played back by the second playback device;

comparing the elapsed playback time from the second playback device with an elapsed playback time for the content data being played back by the first playback device;

if the elapsed playback time from the second playback device differs from the elapsed playback time at the first playback device by a predetermined time or more, transmitting a playback stop command to the second playback device through the communication portion;

transmitting to the second playback device, through the communication portion, fourth information that indicates a new synchronized playback start time obtained by adding the predetermined additional time to an elapsed playback time for the content data being played back by the first playback device at the time of transmitting the playback stop command;

receiving a second playback preparation completion notification from the second playback device through the communication portion; and in response to an elapsed playback time for the content data being played back by the first playback device reaching the new synchronized playback start time, transmitting a second playback start command to the second playback device through the communication portion.

7. The first playback device according to claim 2, further comprising:
a mode setting portion that sets, in response to receiving the synchronized playback command, a playback control mode of the first playback device to a master mode in which the first playback device controls content data playback in the second playback device.

8. A first playback device comprising:
a communication portion that communicates data with a server device and at least one other playback device;
a memory that stores content data received from the server device through the communication portion;
a playback portion that plays back the content data that is stored in the memory; and
a synchronized playback control portion that synchronizes playback of the first playback device with a second playback device, wherein synchronizing playback of the first playback device with the second playback device comprises:
receiving, from the second playback device through the communication portion, first information that pertains to content data being played back by the second playback device and second information that indicates a synchronized playback start time representing a predetermined additional time added to an elapsed playback time at the second playback device;
based at least on the first and second information, receiving the content data beginning from the synchronized playback start time from the server device and buffering the content data in the memory;
in response to the content data buffered in the memory reaching or exceeding a specified amount, transmitting a playback preparation completion notification to the second playback device through the communication portion; and
as soon as a playback start command is received from the second playback device, prompting the playback portion to start playback of the content data already buffered in the memory beginning from the synchronized playback start time, at substantially the same timing at which the second playback device plays back the content data, without requiring the first playback device to measure time prior to beginning playback.

9. The first playback device according to claim 8, wherein synchronizing playback of the first playback device with the second playback device further comprises:
receiving search information from the second playback device through the communication portion;
determining whether to allow synchronized playback with the second playback device based at least on setting information that is set in advance; and
if synchronized playback is allowed, transmitting to the second playback device, through the communication portion, a joining response that indicates that the first playback device will join in synchronized playback with the second playback device.

10. The first playback device according to claim 8, wherein synchronizing playback of the first playback device with the second playback device further comprises:
in response to receiving a synchronized playback command while playback by the first playback device is stopped, and while the second playback device and a third playback device are playing back the content data at substantially the same timing, transmitting a joining request to the second and third playback devices through the communication portion.

11. The first playback device according to claim 8, wherein synchronizing playback of the first playback device with the second playback device further comprises:
receiving from the second playback device, through the communication portion, third information that pertains to next content data;
receiving the next content data from the server device through the communication portion and storing the next content data in the memory;
in response to the next content data stored in the memory reaching or exceeding a specified amount, transmitting a next playback preparation completion notification to the second playback device through the communication portion; and
in response to receiving a playback start command from the second playback device, prompting the playback portion to begin playing back the next content data that is stored in the memory.

12. The first playback device according to claim 8, wherein synchronizing playback of the first playback device with the second playback device further comprises:
in response to receiving a request from the second playback device while the first playback device and the second playback device are playing back the content data at substantially the same timing, transmitting to the second playback device, through the communication portion, third information that indicates an elapsed time for the content data being played back by the first playback device;
receiving a playback stop command from the second playback device through the communication portion;
stopping playback of the content data upon receiving the playback stop command;
receiving from the second playback device, through the communication portion, fourth information that indicates a new synchronized playback start time;

receiving the content data beginning from the new synchronized playback start time from the server device through the communication portion and storing the content data in the memory;

in response to the content data stored in the memory reaching or exceeding a specified amount, transmitting a second playback preparation completion notification to the second playback device through the communication portion; and in response to receiving a second playback start command from the second playback device through the communication portion, prompting the playback portion to begin playing back the content data stored in the memory beginning from the new synchronized playback start time.

13. The first playback device according to claim 9, further comprising:

a mode setting portion that sets, when synchronized playback is allowed, a playback control mode of the first playback device to a slave mode in which content data playback is controlled by the second playback device.

14. A playback control method for a first playback device that plays back content data received from a server device in synchronization with at least one other playback device, the method comprising:

playing back content data received from the server device;

in response to receiving a synchronized playback command from a user while playing back the content data, transmitting to a second playback device information that pertains to the content data being played back;

obtaining an elapsed playback time for the content data being played back at the time of receiving the synchronized play back command;

calculating a synchronized playback start time by adding a predetermined additional time to the elapsed playback time;

transmitting the synchronized playback start time to the second playback device;

receiving, from the second playback device, a playback preparation completion notification indicating that the second playback device has buffered a specified amount of the content data; and in response to an elapsed playback time for the content data being played back reaching the synchronized playback start time, transmitting a playback start command to the second playback device, wherein the playback start command is configured to prompt the second playback device to play back the buffered content data as soon as the playback start command is received, at substantially the same timing at which the first playback device plays back the content data, without requiring the second playback device to measure time prior to beginning playback.

15. The playback control method according to claim 14, wherein transmitting the information comprises:

in response to receiving the synchronized playback command, transmitting to at least one other playback device search information searching for the second playback device to join in synchronized playback; and in response to receiving, from the second playback device, a joining response that indicates that the second playback device will join in synchronized playback, transmitting the information to the second playback device.

16. The playback control method according to claim 14, further comprising:

in response to receiving a joining request from a third playback device while the first playback device and the second playback device are playing back content data at substantially the same timing, transmitting to the third playback device information that pertains to the content data that is being played back and information that indicates a second synchronized playback start time obtained by adding the predetermined additional time to an elapsed playback time for the content data being played back at the time of receiving the joining request;

receiving a playback preparation completion notification from the third playback device; and in response to an elapsed playback time for the content data being played back reaching the second synchronized playback start time, transmitting the playback start command to the third playback device.

17. The playback control method according to claim 14, further comprising:

transmitting to the second playback device information that pertains to next content data;

receiving the next content data from the server device and storing the next content data in a memory;

in response to receiving a next playback preparation completion notification from the second playback device, transmitting the playback start command for the next content data to the second playback device; and starting playback of the next content data that is stored in the memory.

18. The playback control method according to claim 14, further comprising:

requesting, while the first playback device and the second playback device are playing back content data at substantially the same timing, an elapsed playback time for the content data from the second playback device;

receiving from the second playback device information that indicates the elapsed playback time for the content data being played back by the second playback device;

comparing the elapsed playback time from the second playback device with an elapsed playback time for the content data being played back by the first playback device;

if the elapsed playback time from the second playback device differs from the elapsed playback time at the first playback device by a predetermined time or more, transmitting a playback stop command to the second playback device;

transmitting to the second playback device information that indicates a second synchronized playback start time obtained by adding the predetermined additional time to an elapsed playback time for the content data being played back by the first playback device at the time of transmitting the playback stop command;

receiving a second playback preparation completion notification from the second playback device; and in response to an elapsed time for the content data being played back by the first playback device reaching the second synchronized playback start time, transmitting a second playback start command to the second playback device.

19. The playback control method according to claim 14, further comprising:

setting, in response to receiving the synchronized playback command, a playback control mode of the first playback device to a master mode in which the first playback device controls content data playback in the second playback device.

20. A playback control method for a first playback device that plays back content data received from a server device in synchronization with at least one other playback device, the method comprising:
- receiving, from a second playback device, first information that pertains to content data being played back by the second playback device and second information that indicates a synchronized playback start time representing a predetermined additional time added to an elapsed playback time at the second playback device;
- based at least on the first and second information, receiving the content data beginning from the synchronized playback start time from the server device and buffering the content data in a memory;
- in response to the content data buffered in the memory reaching or exceeding a specified amount, transmitting to the second playback device a playback preparation completion notification; and
- as soon as a playback start command is received from the second playback device, starting playback of the content data already buffered in the memory beginning from the synchronized playback start time, at substantially the same timing at which the second playback device plays back the content data, without requiring the first playback device to measure time prior to beginning playback.

21. The playback control method according to claim 20, further comprising:
- receiving search information from the second playback device;
- determining whether to allow synchronized playback with the second playback device based at least on setting information that is set in advance; and
- if synchronized playback is allowed, transmitting to the second playback device a joining response that indicates that the first playback device will join in synchronized playback with the second playback device.

22. The playback control method according to claim 20, further comprising:
- in response to receiving a synchronized playback command while playback by the first playback device is stopped, and while the second playback device and a third playback device are playing back content data at substantially the same timing, transmitting a joining request to the second and third playback devices.

23. The playback control method according to claim 20, further comprising:
- receiving, from the second playback device, third information that pertains to next content data;
- receiving the next content data from the server device and storing the next content data in the memory;
- in response to the next content data stored in the memory reaching or exceeding a specified amount, transmitting to the second playback device a next playback preparation completion notification; and
- in response to receiving a next playback start command from the second playback device, starting playback of the next content data that is stored in the memory.

24. The playback control method according to claim 20, further comprising:
- in response to receiving a request from the second playback device while the first playback device and the second playback device are playing back content data at substantially the same timing, transmitting to the second device third information that indicates an elapsed playback time for the content data being played back by the first playback device;
- receiving a playback stop command from the second playback device;
- stopping playback of the content data in response to receiving the playback stop command;
- receiving, from the second playback device, fourth information that indicates a new synchronized playback start time;
- receiving the content data beginning from the new synchronized playback start time from the server device and storing the content data in the memory;
- in response to the content data stored in the memory reaching or exceeding a specified amount, transmitting a second playback preparation completion notification to the second playback device; and
- in response to receiving a second playback start command from the second playback device, starting playback of the content data stored in the memory beginning from the new synchronized playback start time.

25. The playback control method according to claim 21, further comprising:
- setting, when synchronized playback is allowed, a playback control mode of the first playback device to a slave mode in which content data playback is controlled by the second playback device.

* * * * *